US011741503B2

(12) United States Patent
Fernando et al.

(10) Patent No.: US 11,741,503 B2
(45) Date of Patent: Aug. 29, 2023

(54) MULTI-MODE POINT-OF-SALE DEVICE

(71) Applicant: Elo Touch Solutions, Inc., Milpitas, CA (US)

(72) Inventors: Ranil Ignatius Fernando, Sunnyvale, CA (US); Kenneth North, San Carlos, CA (US); Jeffrey Haller, Redwood City, CA (US); Chatura Chamika Dissanayake, Milpitas, CA (US); Mohammad Fareeduddin, Sunnyvale, CA (US); Susan Swei, San Carlos, CA (US); Ragini Rajendra Prasad, Fremont, CA (US)

(73) Assignee: ELO TOUCH SOLUTIONS, INC., Knoxville, TN (US)

( * ) Notice: Subject to any disclaimer, the term of this patent is extended or adjusted under 35 U.S.C. 154(b) by 206 days.

(21) Appl. No.: 16/895,728

(22) Filed: Jun. 8, 2020

(65) Prior Publication Data
US 2020/0302481 A1 Sep. 24, 2020

Related U.S. Application Data

(63) Continuation of application No. 15/606,918, filed on May 26, 2017, now Pat. No. 10,679,254, which is a
(Continued)

(51) Int. Cl.
*G06Q 30/02* (2023.01)
*G06Q 30/0251* (2023.01)
(Continued)

(52) U.S. Cl.
CPC ......... *G06Q 30/0268* (2013.01); *G06Q 20/02* (2013.01); *G06Q 20/04* (2013.01);
(Continued)

(58) Field of Classification Search
CPC ........ G06Q 10/10; G06Q 30/02; G06Q 30/06; G06Q 10/02; G06Q 20/32; G07F 9/026;
(Continued)

(56) References Cited

U.S. PATENT DOCUMENTS

| 5,708,422 A | 1/1998 | Blonder et al. |
| 5,970,146 A | 10/1999 | McCall et al. |

(Continued)

FOREIGN PATENT DOCUMENTS

| CN | 101873771 A | 10/2010 |
| CN | 102034324 A | 4/2011 |

(Continued)

OTHER PUBLICATIONS

International Preliminary Report on Patentability directed to related International Application No. PCT/US2015/010473, dated Jul. 21, 2016; 11 pages.
(Continued)

*Primary Examiner* — Olusegun Goyea
(74) *Attorney, Agent, or Firm* — Sterne, Kessler, Goldstein & Fox P.L.L.C.

(57) ABSTRACT

In an embodiment, a point of sale (POS) device is provided. The POS device includes a memory and at least one processor. The processor is configured to perform an authorized set of functions established by an external management module. The authorized set of functions include purchase transaction processing of inventory identified as available to the POS device by the external management module.

20 Claims, 35 Drawing Sheets

Related U.S. Application Data continuation of application No. 14/152,643, filed on Jan. 10, 2014, now Pat. No. 9,665,861.

(51) Int. Cl.
*G06Q 20/20* (2012.01)
*G06Q 20/02* (2012.01)
*G06Q 20/04* (2012.01)
G06Q 30/00 (2023.01)
G06Q 30/01 (2023.01)
G06Q 20/00 (2012.01)

(52) U.S. Cl.
CPC ........... *G06Q 20/20* (2013.01); *G06Q 20/202* (2013.01); *G06Q 20/203* (2013.01); *G06Q 20/00* (2013.01); *G06Q 30/00* (2013.01); *G06Q 30/01* (2013.01); *G06Q 30/02* (2013.01)

(58) Field of Classification Search
CPC ...... G07F 9/002; G07F 9/0235; G07F 3/0436; G07F 13/385
USPC .......... 705/5, 14.23; 345/173, 177; 700/232; 235/379, 385
See application file for complete search history.

(56) References Cited

U.S. PATENT DOCUMENTS

| | | | |
|---|---|---|---|
| 7,242,967 B2 | 7/2007 | Yamakawa et al. | |
| 7,818,815 B2 * | 10/2010 | Kamiya | H04L 63/102 726/30 |
| 7,970,650 B2 | 6/2011 | Tokorotani | |
| 8,259,153 B1 * | 9/2012 | Campbell, III | G06Q 30/02 348/14.03 |
| D688,673 S | 8/2013 | Haller | |
| 8,576,202 B2 * | 11/2013 | Tanaka | G06F 3/0436 345/177 |
| 8,740,073 B2 | 6/2014 | Shankar et al. | |
| 8,856,033 B2 | 10/2014 | Hicks et al. | |
| 9,033,228 B2 | 5/2015 | Govindarajan | |
| 9,665,861 B2 | 5/2017 | Fernando et al. | |
| 10,679,254 B2 | 6/2020 | Fernando et al. | |
| 2002/0017564 A1 | 2/2002 | Larson et al. | |
| 2002/0159088 A1 | 10/2002 | Yamakawa et al. | |
| 2003/0089767 A1 * | 5/2003 | Kiyomatsu | G06Q 20/342 235/379 |
| 2003/0115103 A1 | 6/2003 | Mason | |
| 2004/0249748 A1 | 12/2004 | Schultz et al. | |
| 2005/0014639 A1 | 5/2005 | Zimmer | |
| 2006/0242087 A1 | 10/2006 | Naehr et al. | |
| 2007/0241184 A1 | 10/2007 | Lum | |
| 2008/0255890 A1 * | 10/2008 | Hilliard | G06Q 10/02 705/26.1 |
| 2009/0192908 A1 | 7/2009 | Takei | |
| 2009/0198582 A1 | 8/2009 | Tokorotani | |
| 2009/0250515 A1 | 10/2009 | Todd et al. | |
| 2009/0307021 A1 | 12/2009 | Hamilton, II et al. | |
| 2010/0042525 A1 | 2/2010 | Cai et al. | |
| 2010/0057871 A1 * | 3/2010 | Kaplan | G07F 9/026 709/219 |
| 2010/0262504 A1 | 10/2010 | Tamura | |
| 2010/0268792 A1 * | 10/2010 | Butler | G06Q 30/02 715/810 |
| 2011/0060637 A1 | 3/2011 | Sakai et al. | |
| 2011/0202350 A1 * | 8/2011 | Barnes | H04M 7/006 704/270.1 |
| 2011/0259672 A1 | 10/2011 | Kuo | |
| 2011/0307318 A1 | 12/2011 | LaPorte et al. | |
| 2011/0320293 A1 | 12/2011 | Khan | |
| 2011/0321173 A1 | 12/2011 | Weston et al. | |
| 2012/0109367 A1 * | 5/2012 | Fabian | G06Q 30/06 235/375 |
| 2012/0185547 A1 | 7/2012 | Hugg et al. | |
| 2012/0224200 A1 * | 9/2012 | Nihashi | G07G 1/0018 358/1.12 |
| 2012/0268398 A1 | 10/2012 | Kato | |
| 2013/0002878 A1 | 1/2013 | Oishi | |
| 2013/0043271 A1 * | 2/2013 | South | G07F 9/0235 221/199 |
| 2013/0080277 A1 | 3/2013 | Evans | |
| 2013/0103187 A1 * | 4/2013 | Canter | G07F 9/001 700/232 |
| 2013/0103190 A1 * | 4/2013 | Carapelli | G07F 9/026 700/237 |
| 2013/0153656 A1 | 6/2013 | Skiles | |
| 2013/0155595 A1 | 6/2013 | Herring et al. | |
| 2013/0185206 A1 | 7/2013 | Leggett et al. | |
| 2013/0235420 A1 | 9/2013 | Nihashi | |
| 2013/0238456 A1 | 9/2013 | Soysa et al. | |
| 2013/0254288 A1 | 9/2013 | Harrison | |
| 2013/0254431 A1 * | 9/2013 | Kuroiwa | G06F 21/31 710/14 |
| 2013/0278122 A1 | 10/2013 | Edwards et al. | |
| 2013/0285937 A1 * | 10/2013 | Billings | H04N 21/4621 345/173 |
| 2013/0339253 A1 | 12/2013 | Sincai | |
| 2014/0019651 A1 * | 1/2014 | Ben-Harosh | G06F 13/385 710/63 |
| 2014/0027510 A1 * | 1/2014 | Assouline | G16H 40/20 235/385 |
| 2014/0028541 A1 | 1/2014 | Truong et al. | |
| 2014/0052554 A1 | 2/2014 | Abraham | |
| 2014/0089174 A1 * | 3/2014 | Carapelli | G07G 1/0009 705/39 |
| 2014/0172577 A1 | 6/2014 | Rephlo | |
| 2014/0200979 A1 * | 7/2014 | Mizumura | G06Q 10/10 705/14.23 |
| 2014/0214640 A1 | 7/2014 | Mallikarjunan et al. | |
| 2014/0351832 A1 * | 11/2014 | Cho | H04L 67/141 719/328 |
| 2015/0001291 A1 | 1/2015 | Govindarajan et al. | |
| 2015/0149311 A1 | 5/2015 | Ward et al. | |
| 2015/0199667 A1 | 7/2015 | Fernando et al. | |
| 2015/0199668 A1 | 7/2015 | Fernando et al. | |
| 2015/0199882 A1 | 7/2015 | Fernando et al. | |
| 2016/0005020 A1 | 1/2016 | Fernando et al. | |
| 2016/0020906 A1 * | 1/2016 | Nolte | G07F 7/1016 705/71 |
| 2017/0262892 A1 | 9/2017 | Fernando et al. | |

FOREIGN PATENT DOCUMENTS

| | | |
|---|---|---|
| CN | 102110335 A | 6/2011 |
| CN | 102147878 A | 8/2011 |
| CN | 102147947 A | 8/2011 |
| WO | WO 01/65427 A1 | 9/2001 |

OTHER PUBLICATIONS

International Search Report and Written Opinion from PCT/2015/010473, dated Jun. 17, 2015; 16 pages.
Microsoft Corporation, "Securing Your Windows Embedded POS Ready 7 Device," Windows Embedded (2011).
IBM, "Retail-hardened store solutions from IBM" (2010).
European Search Report directed to related European Patent Application No. 18160139.4, dated May 7, 2018; 2 pages.
Supplementary European Search Report directed to related European Patent Application No. 15735116.4, dated Aug. 16, 2017; 2 pages.

* cited by examiner

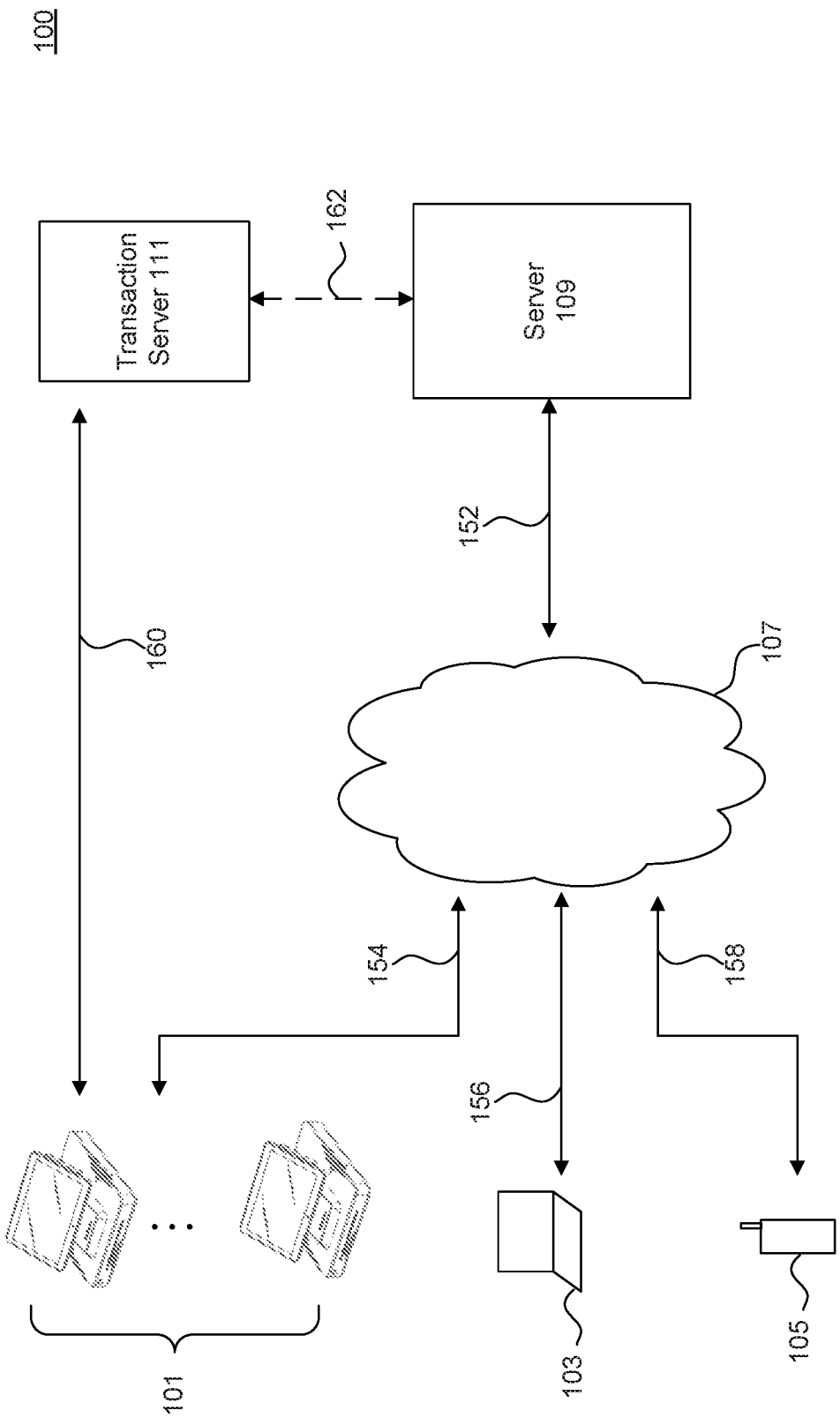

MULTI-MODE POINT-OF-SALE DEVICE

CROSS REFERENCE TO RELATED APPLICATIONS

This application is a continuation of U.S. Nonprovisional patent application Ser. No. 15/606,918, filed May 26, 2017, titled "MULTI-MODE POINT-OF-SALE DEVICE" and issued as U.S. Pat. No. 10,679,254, which is a continuation of U.S. Nonprovisional patent application Ser. No. 14/152,643, filed Jan. 10, 2014, titled "MULTI-MODE POINT-OF-SALE DEVICE" and issued as U.S. Pat. No. 9,665,861, the contents of which are hereby incorporated herein by reference in their entirety.

BACKGROUND

Background

Point-of-sale devices, such as cash registers, rely on physically connecting several different components to provide sufficient connectivity and functionality for customer transaction needs. For example, in recent years it has become popular to connect various peripherals to tablet computers to enable point-of-sale transactions with the tablet computers. This arrangement requires a user to purchase not only the tablet computer and related software, but also several peripherals, such as magnetic stripe terminals, barcode scanners, network connectivity, cash drawers, receipt printers, etc., at significant additional cost and inconvenience. This arrangement also requires the user to configure the tablet computer and/or the peripherals for use with each other, often a time-consuming, frustrating and difficult task, particularly for users without a technical background. Older, more self-contained cash registers did not offer the types of functionality, connectivity, software, interface components, etc. necessary in the commercial environment existing today and into the future.

BRIEF DESCRIPTION OF THE DRAWINGS

The accompanying drawings are incorporated herein and form a part of the specification.

FIG. 1 illustrates a block diagram of a cloud-based point-of-sale system, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 2A:
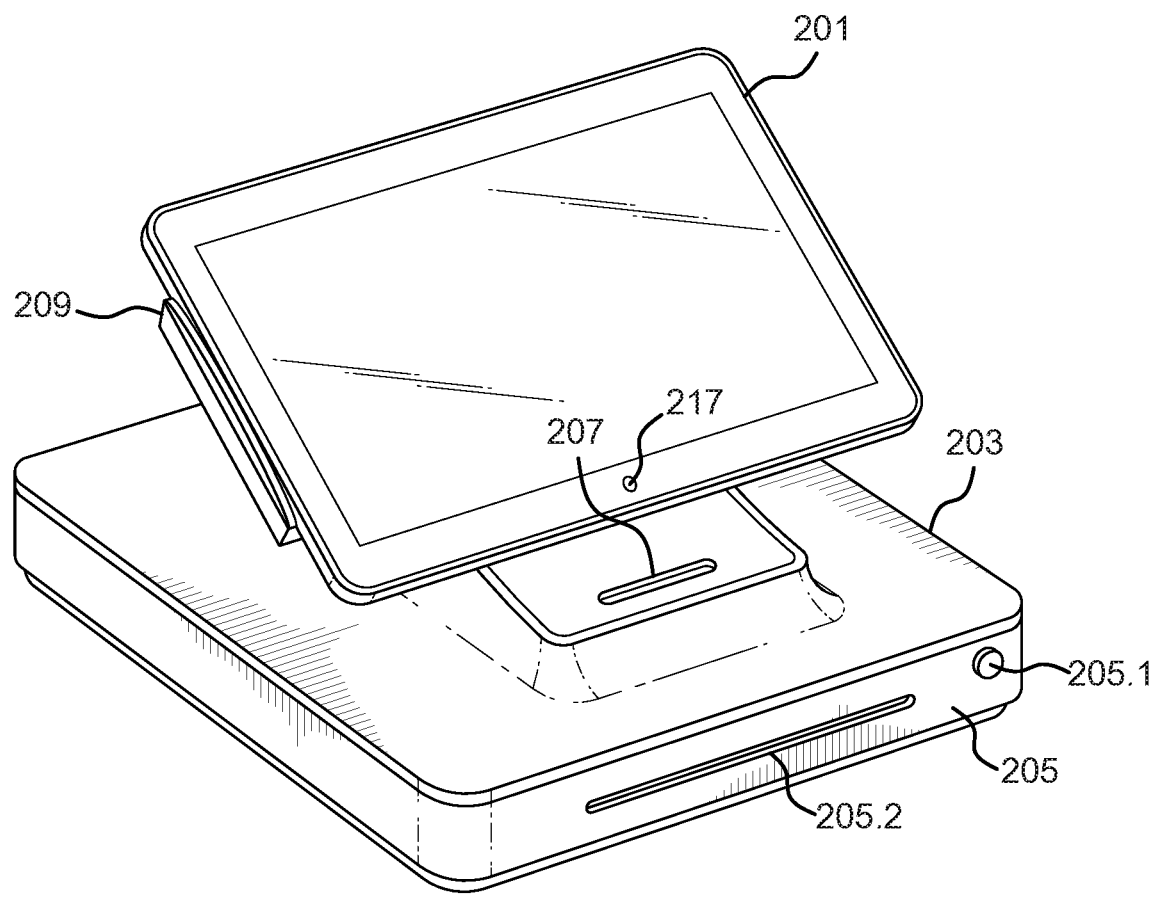
FIG. 2A illustrates a front view of a multi-mode point-of-sale device, according to an example embodiment.

Provided herein are apparatus, system, method, computer program product embodiments, and/or combinations and sub-combinations thereof, for integrating a plurality of different features into a point-of-sale (POS) device within a greater cloud-based system. In an embodiment, the POS device is a single, self-contained device. In an embodiment, the POS device is a plug-and-play device. Other features of embodiments of the POS device are described below.

The following disclosure describes features of the POS device. Section I generally describes hardware/structural features associated with the POS device. Section II generally describes software features associated with the POS device. Section III generally security features associated with the POS device. Section IV generally describes an example computer system, in which embodiments of portions thereof can be implemented. Section V is a conclusion section.

1. HARDWARE/STRUCTURAL FEATURES

FIG. 1 illustrates an exemplary environment 100 in which a POS device may operate within a cloud-based environment, according to an example embodiment. Example environment 100 is provided for purposes of illustration and is not limiting of embodiments of the present disclosure.

As shown in FIG. 1, example environment 100 includes one or more POS devices 101, a computing device 103, a mobile device 105, a network 107, a back-end server 109, and a transaction server 111. Although only one of each is shown in the example of FIG. 1, there may be multiple computing devices 103, mobile devices 105, networks 107, back-end servers 109, and/or transaction servers 111.

In an embodiment, the one or more POS devices 101 may be integrated, self-contained registers, as will be discussed in more detail below with respect to several of the figures. The one or more POS devices 101 may be located, for example and without limitation, at a merchant premises of an organization such as a brick-and-mortar establishment, temporary location, or online inventory with a physical point-of-sale presence, or any other location where a merchant account may be established with a payment processing company. As referred to herein, for exemplary and explanation purposes, a "merchant" refers to a user of the POS device 101. The merchant can conduct, for example, commercial transactions with one or more customers using the POS device 101. These commercial transactions, along with other types of transactions using the POS device 101, are described in more detail below. As will be appreciated by those skilled in the relevant art(s), an organization may utilize only one POS device 101 or may utilize multiple POS devices 101, based on the specific needs of the organization. Reference will be made herein to a single POS device 101 for simplicity of discussion. Details of an exemplary POS device 101 will be discussed in more detail below with respect to at least FIGS. 2A through 9. Generally speaking, the POS device 101 may be configured to perform product scanning, transaction completion, and other commercial point-of-sale tasks, existing now and developed in the future, within a single integrated register device.

In operation, the POS device 101 may connect to the back-end server 109 via connections 152 and 154. In an embodiment, the back-end server 109 may connect to a network 107 via the connection 152 and the POS device 101 may connect to the network 107 via the connection 154. In one example, the network 107 may be the Internet. The network 107 may alternatively be an intranet, such as a local area network (LAN). The POS device 101 may communicate with the back-end server 109 using a variety of different communications protocols and wired and/or wireless communication media (e.g., a Wi-Fi connection using Wi-Fi Protected Access II (WPA2) security protocol), as will be appreciated by those skilled in the relevant art(s). The POS device 101's system may be populated (e.g., provided with data, software, updates, etc.) from the back-end server 109. For example, in an embodiment, the POS device 101 receives inventory via the network 107 and connections 152/154 when a user, such as a user of the computing device 103, instructs the back-end server 109 to populate the POS device 101. Alternatively, the POS device 101 may, on its own initiative, periodically query the back-end server 109 for inventory updates.

The back-end server 109 may be, for example, a web server or a plurality of web servers operating in cooperation with each other. In an embodiment, the back-end server 109 may include a database used to store and enable management of inventory for the organization's premises at which the POS device 101 is located. Details with respect to exemplary components of the back-end server 109 will be discussed in more detail below with respect to FIG. 10. In an embodiment, the back-end server 109 may manage the inventory for a plurality of different organizations, for example as a plurality of different accounts, one being associated with each different organization. As will be appreciated, for each organization there may be one or multiple merchant premises associated with a single account managed by the back-end server 109.

Inventory may be managed, updated, etc., by the computing device 103 and/or the mobile device 105. In an embodiment, the computing device 103 may be a personal computing device, such as a desktop computer, a laptop computer, a tablet computer, a mobile phone, or a personal digital assistant, just to name a few examples, or any combination of the above. A user of the computing device 103 may access the back-end server 109 via network 107, for example by connecting to the network 107 via the connection 156 and then to the back-end server 109 via the connection 152. The computing device 103 may communicate with the back-end server 109 using a variety of different communications protocols and wired and/or wireless communication media (e.g. a Wi-Fi connection using Wi-Fi Protected Access II (WPA2) security protocol) as will be appreciated by those skilled in the relevant art(s). In an embodiment, the computing device 103 may access the back-end server 109 via a web interface, for example by logging into a website and entering appropriate user/password information. Management of the inventory may include organizing inventory into categories, adding records for additional inventory, adding or changing images of products in the inventory, updating or adding prices for the inventory, and/or adding or changing information about the supplier(s) of the inventory.

Inventory may also be managed, updated, etc., by the mobile device 105. The mobile device 105 may be, for example, a mobile phone, a smartphone, a personal media player, a tablet computer, a laptop computer, or similar device that may connect to the network 107 using different hardware and media, for example Wi-Fi or a cellular network. As will be appreciated by those skilled in the relevant art(s), the functions discussed herein as being performed by the mobile device 105 may alternatively or additionally be performed by the computing device 103 and vice versa because, in embodiments, there may be a functional overlap between the two types of devices 103 and 105 (e.g., a computing device may also be considered a mobile device, and vice versa).

For example, the mobile device 105 may capture an image of a product that is or will be included in the inventory which is then added to the inventory managed and/or stored by the back-end server 109. The image may reach the back-end server 109 via network 107. As another example, the mobile device 105 may receive sales summaries of transactions that have occurred at the POS device 101, such as sales and returns processed by the POS device 101. The reports may additionally or alternatively include other types of real-time business statistics. The mobile device 105 may also be used to manage employees of the merchant premises, for example for scheduling and security concerns.

In an embodiment, the POS device 101 may additionally communicate with a transaction server 111 operated by a financial institution for transaction processing/approval. For example, when a customer enters payment information, such as credit card information via one or more input devices as discussed below, the transaction information may be communicated to the transaction server 111 for approval or denial via a connection 160. Connection 160 may be a direct or indirect link via any one or more wired and/or wireless modes of telecommunication and, although not shown in FIG. 1, may include the network 107. In an embodiment, the POS device 101 may communicate directly with the transaction server 111. In alternative embodiments, the POS device 101 may communicate indirectly with the transaction server 111 via the network 107 and/or the back-end server 109, for example via wired and/or wireless connection 162. The transaction server 111 may be associated with one or more financial institutions.

As shown, FIG. 1 shows an exemplary environment 100 in which the POS device 101 may operate within a cloud-based POS system. In an embodiment, the cloud-based POS system is a distributed network of computing devices (e.g., POS device 101, computing device 103, mobile device 105 and server 109) used in the execution of commercial transactions such as, for example, the sale and inventory management of goods. In an embodiment, the cloud-based services and integrated hardware of the POS device 101 enable the POS device 101 to be a plug-and-play device— e.g., a user may plug in the POS device 101 using a single wired and/or wireless plug and begin operation of the POS device 101 without requiring any additional external peripherals. In an embodiment, because the POS device 101 contains all needed components and does not require any external peripherals, there is little or even no need for the user to configure the POS device 101 prior to use. In fact, the POS device 101 is operable once it is plugged in and turned on. Further, in an embodiment, the POS device 101 may be configured to turn on automatically upon plugin. Accordingly, in an embodiment, the POS device 101 is an integrated, unified device containing within a single assembly all hardware components needed to perform the operations described herein, where the POS device 101 is pre-configured such that user configuration is not needed for operation of the POS device 101.

FIG. 2A illustrates a front view of a multi-mode POS device, such as the POS device 101 of FIG. 1, according to an example embodiment. For simplicity of discussion, reference to the multi-mode POS device in the following figures will be with respect to POS device 101 of FIG. 1, although it should be understood that a given POS device 101 may include any subset of features shown in these figures. In the following discussion, a front view is one from the perspective of a primary user that faces the POS device 101. As one example, the primary user may be a store clerk at a merchant premises of an organization.

POS device 101 may include a primary display, such as a touchscreen display 201, a base 203, a cash drawer 205, a receipt printer slot 207, a magnetic stripe reader (MSR) 209, and a camera 217. In an embodiment, the touch screen display 201 may be a projected capacitive touch (PCAP) touch screen display. In a PCAP touch screen display, touches may be sensed through a protective layer in front of a display. The touch screen may have one or multiple layers of conductive material, such as columns and rows forming a grid pattern of electrodes. The protective layer is located over the layer(s) of conductive material, and may be made of glass or plastic. Because of this additional layer, PCAP touch screens may be resistant to impacts, scratches, moisture, heat, cold, and harsh cleaning fluids. The electrodes create a uniform electrostatic field when voltage is applied, and changes in capacitance are measured when a conductive object is in contact with the touch screen, for example by touching the protective layer. A PCAP touch screen may be a self-capacitance or a mutual-capacitance touch screen. Self-capacitance touch screens measure the rows and columns of electrodes, not their intersections, which results in stronger signals but an inability to reliably interpret touches on different parts of the screen at a time. In mutual-capacitance touch screens, the electrodes are spatially separated in two layers and the intersections of each electrode are uniquely addressable so that multiple simultaneous touches are detectable and reliably interpreted. These and other features of PCAP displays will be apparent to those skilled in the relevant art(s), and embodiments of touch screen display 201 may include any combination of such features.

In an alternative embodiment, the touch screen display 201 may be a surface acoustic wave (SAW) touch screen display. A SAW touch screen display may rely upon ultrasonic waves. The ultrasonic waves are transmitted across a surface of the touch screen, portions of which waves are absorbed when an object touches the screen. The position of the touch is detected based on how the waves are changed by the touch, for example by measuring signal attenuation of the portion of the wave where the touch occurred and calculating when that attenuated portion is detected. SAW touch screen displays have high transparency because they do not require electrode layers beneath the surface that can affect the displayed image. These and other features of SAW displays will be apparent to those skilled in the relevant art(s), and embodiments of the touch screen display 201 may include any combination of such features.

As will be appreciated by those skilled in the relevant art(s), PCAP and SAW touch screen displays are just two examples of the touch screen display 201 and embodiments of the present disclosure are not limited to these examples. Instead, the touch screen display 201 may employ any touch screen technology, existing now or developed in the future.

In an embodiment, the touch screen display 201 may be capable of two touches with 2 mm accuracy, although embodiments are not limited to this example. As will be appreciated by those skilled in the relevant art(s), other types of touchscreens may be utilized to accomplish the input functionality. The touch screen display 201 may have a variety of sizes. In an embodiment, the touch screen display 201 may have a diagonal size of 13.3 inches with a 1920× 1080 displayed image resolution, although other sizes and/or resolutions are possible as well. The display of the touchscreen display 201 may be any type such as but not limited to liquid crystal display (LCD), organic light emitting diode (OLED) display, electroluminescent display, electrophoretic display (EPD), etc. without departing from the scope of the present disclosure.

The touch screen display 201 is mounted on a display head (shown as mount 219 in FIG. 2B) that enables the touch screen display 201 to pivot between two positions, as shown in more detail in FIG. 7 and discussed in the corresponding text below. For example, in a first position, the touch screen display 201 faces the primary user of the POS device 101 (e.g., a merchant) and in a second position the touch screen display 201 faces a secondary user, for example a customer at the merchant premises of the organization. For example, in referring to FIG. 2A, the touch screen display is in the first position. As will be discussed in more detail below, the content of the display on the touch screen display 201 changes based on a detection of whether the screen is facing the primary or secondary user (e.g., the merchant or the customer, respectively).

In an embodiment, the camera 217 of FIG. 2A may be located in a bezel area surrounding the touchscreen display 201, for example below the touch screen display 201 (when in the first position facing the primary user, as shown in FIG. 2A). In an embodiment, the camera 217 may utilize a CMOS sensor. As will be appreciated, when the touch screen display 201 is moved to the second position facing the secondary user, the camera 217 would then be located above the touch screen display 201 from the perspective of the secondary user. As will be further appreciated by those skilled in the relevant art(s), the camera 217 may be located at other positions around the touch screen display 201 or elsewhere integrated with the POS device 101. The camera 217 may be used for scanning 2-D bar codes as well as for security. For example, in an embodiment the POS device 101 may capture an image of the merchant user facing the touch screen display 201 during login and/or logout of the POS device 101. This captured image may then be stored and forwarded to a designated recipient for verification and security.

The MSR 209 may also be located along an edge of the touch screen display 201. For example, in FIG. 2A, the MSR 209 is depicted as being located along a left side of the touch screen display 201 when in the first position. As will be appreciated by those skilled in the relevant art(s), the MSR 209 may be located along a different side of the touch screen display 201 or elsewhere integrated with the POS device 101. The MSR 209 may be capable of reading at least 3 magnetic tracks. The MSR 209 may additionally be configurable to change the type of encryption it uses for direct processing, for example to the Verifone encryption standard or another encryption standard/protocol after a firmware update. The MSR 209 may include tokenization capability and device/host authentication. Instead of the MSR 209 being a magnetic stripe reader, the MSR 209 may be a Europay, MasterCard and Visa (EMV) standard-compatible reader designed to cooperate with integrated circuit payment cards (commonly referred to as chip cards). In an embodiment, the POS device 101 may include as part of the MSR 209 both hardware for a magnetic stripe reader and an EMV-compatible reader, or just hardware for one of the two.

The base 203 of POS device 101 houses at least a subset of the integrated components, for example the cash drawer 205 and receipt printer slot 207 (and receipt printer, not shown in FIG. 2A). The cash drawer 205 may include a key lock 205.1 and a slot 205.2, for example for receiving checks. The cash drawer will be discussed in more detail with respect to FIGS. 5 and 6 below.

The receipt printer slot 207 shown in the base 203 allows receipts to be accessed by the primary user (e.g. merchant). The base 203 houses an integrated receipt printer, for example a line type thermal printer. In an embodiment, the printer may use 58 mm wide paper with a paper roll diameter of 80 mm that rolls automatically. As will be appreciated by those skilled in the relevant art(s), other dimensions are possible as well. In addition, the receipt printer may be operable in USB or serial modes. When in USB mode, the receipt printer may be configured to be able to decode a drawer release signal for the cash drawer 205. The cash drawer is connected to a main processing unit, such as processor 401 of FIG. 4 discussed below, directly and not through the printer allowing more software choices to control the cash drawer such as knowing if it is open or closed.

Figure 2B:
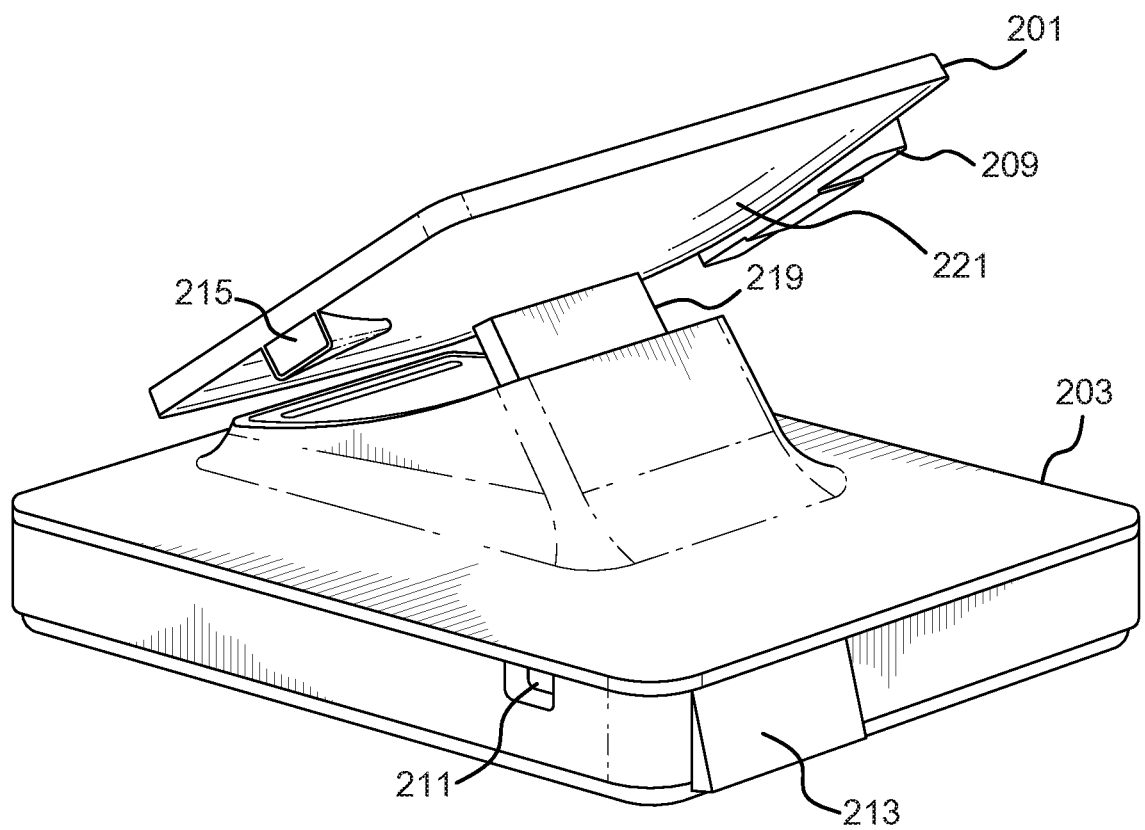
FIG. 2B illustrates a rear view of a multi-mode point-of-sale device, according to an example embodiment.

FIG. 2B illustrates a rear view of a multi-mode point-of-sale device, such as the POS device 101 of FIG. 1, according to an example embodiment. In the following discussion, a rear view is shown from the perspective of a secondary user that faces the POS device 101. As one example, the secondary user may be a customer at the merchant premises of the organization. In FIG. 2B, the touch screen 201 is in the first or primary position (facing the primary user of the POS device 101). As will be shown in FIG. 7 below, the touch screen display 201 may pivot to a secondary position that faces the secondary user.

In the example of FIG. 2B, in addition to the MSR 209, base 203, and touch screen display 201 discussed above with respect to FIG. 2A, a barcode scanner 215, customer-facing display 213, data interface 211, and the mount 219 are also visible around touch screen 201.

The barcode scanner 215 may be located along an edge of the touch screen display 201. For example, in FIG. 2B the barcode scanner 215 is located at the side of the touch screen display 201 opposite the MSR 209. As will be appreciated by those skilled in the relevant art(s), the barcode scanner 215 may be located along a different side of the touch screen display 201 or elsewhere integrated with the POS device 101. The barcode scanner 215 may incorporate a proximity detector to activate a laser used for the barcode scanning. The barcode scanner 215 may be able to perform, in an embodiment, 270 scans per second. As will be appreciated by those skilled in the relevant art(s), other scanning speeds may be used.

The customer-facing display 213 may be located in the base 203 of the POS device 101, shown in FIG. 2B as located at the rear of the base 203. In an embodiment, the customer-facing display 213 may display white letters against a black background, for example using a display that displays 16 characters in each of two lines of the display with a film compensated super-twisted nematic (FSTN) Negative Transmissive Liquid Crystal Display (LCD). The customer-facing display 213 may be used, for example, to show, in real time, the item that has been currently scanned (for example by a clerk operating the barcode scanner 215 or camera 217 of the POS device 101) to the customer.

The data interface 211 may be located along a side of the base 203. For example, FIG. 2B depicts the data interface 211 as located along the right side of the base 203 when viewed from the perspective of the primary user, although the data interface 211 may be located elsewhere integrated with the POS device 101. In an embodiment, the data interface 211 may be one or more USB ports, such as USB 2.0 or USB 3.0. As will be appreciated by those skilled in the relevant art(s), other interfaces may be used in addition to or instead of the USB ports, such as serial ports, firewire ports, etc.

The touch screen display 201 is located within housing 221. The housing 221 is mounted upon the mount 219, which is in turn connected to the base 203 so that the mount 219 is still permitted a range of motion. The mount 219 may pivot between the first and second positions to enable either the primary or the secondary user, respectively, to be able to directly interact with the touch screen display 201. In an embodiment, the mount 219 may pivot between the two positions with little friction. The mount 219 may additionally include a geared cam action to slow the motion of the housing 221 as it pivots so as to avoid hard contact between the mount 219 and the base 203 (e.g. a dampener), for example when the primary or secondary user applies excessive force to begin pivoting. To this end, the mount 219 may use a notched keyway to gently lock the mount 219 in each of the two positions. An operating system of the POS device 101 causes what is displayed on the touch screen display 201 to change based on a detection of whether the screen is facing the primary or secondary user.

Figure 3:
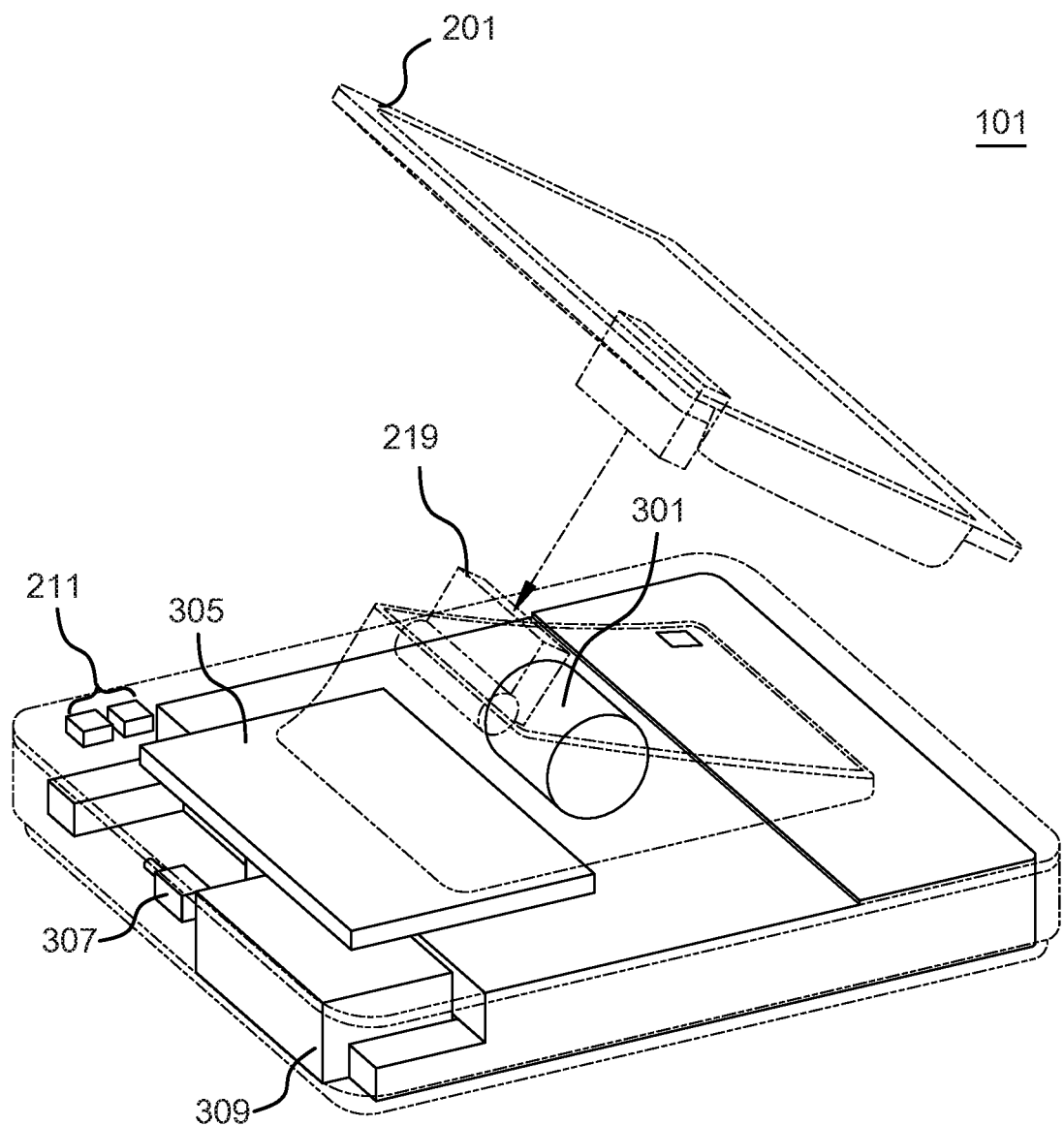
FIG. 3 illustrates internal components of a multi-mode point-of-sale device, according to an example embodiment.

FIG. 3 illustrates internal components of a multi-mode point-of-sale device, such as the POS device 101 of FIG. 1, according to an example embodiment. For sake of simplicity of discussion, only those elements that have not been introduced already in the above figures will be discussed.

Printer roll 301 is a roll of paper or other suitable material that is used for the receipt printer discussed above with respect to the receipt printer slot 207 shown in the base 203, which allows receipts to be accessed by the primary user.

The transfer board 305 may be, for example, a printed circuit board with a general purpose input/output (GPIO). In an embodiment, the transfer board 305 may interface USB port(s), a customer facing display, and other inputs/outputs as discussed by way of example in FIG. 4 below. The transfer board 305 may be located in the base 203 of the POS device 101 and connect to a main system board, such as a motherboard, located elsewhere in the POS device 101 or integrated with the transfer board 305. In an embodiment, the main system board contains a processor, memory, storage, and other elements and may be physically located in close proximity to the touch screen display 201, for example just below the touch screen display 201 in the housing 221. In an alternative embodiment, the main system board may be located within the base 203 and connect to the touch screen display 201 via appropriate signal connections, as will be appreciated by those skilled in the relevant art(s).

In an embodiment, solenoid 307 controls the opening of the cash drawer 205. The solenoid may be electrically driven to release the cash drawer upon a command from a processor of the POS device 101. In addition, there may be a mechanical fail-safe release switch that may be located near the solenoid 307. As will be appreciated by those skilled in the relevant art(s), any type of mechanical or electrical mechanism may be used to control opening and closing of the cash drawer 205.

Power supply 309 supplies power to the integrated components of the POS device 101. In an embodiment, the power supply 309 may be an internal supply having a range of 100 to 240 V (alternating current) at 50 to 60 Hz. In an embodiment, the power supply may output different voltages, such as 3.3V, 1.5V, 5V, and/or 8V. Other voltage levels may additionally or alternatively be output from the power supply 309, or by other circuitry or hardware connected to the power supply 309, as will be appreciated by those skilled in the relevant art(s). A power indicator, such as an LED, may show different statuses of the system based on color. In an example, the LED may be white to show that the system is powering on from an off state or waking from a sleep state. The LED may emit an amber color when the system is entering sleep state, and may emit red when the system is powering down.

Figure 4:
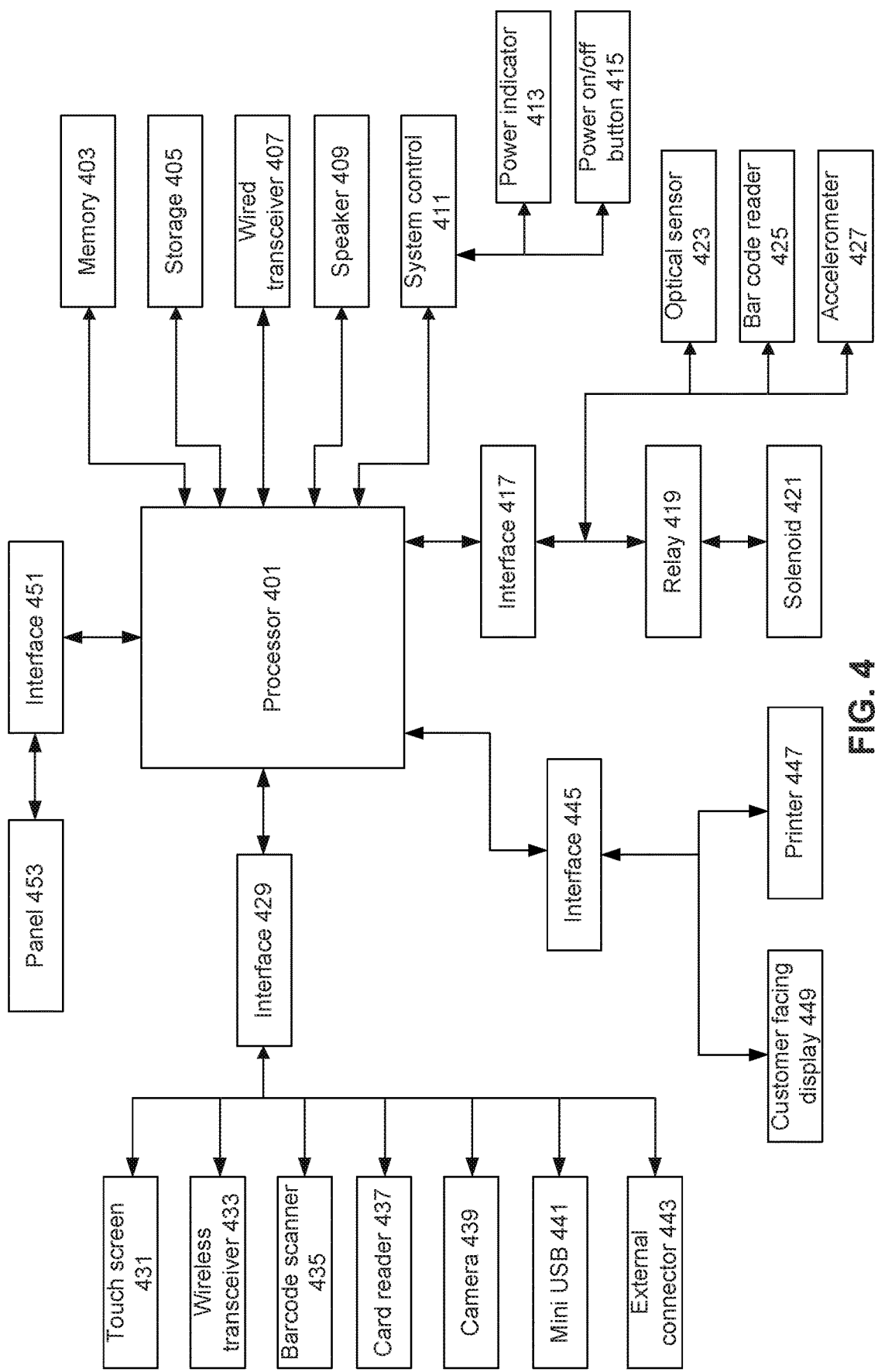
FIG. 4 illustrates a block diagram of internal components of a multi-mode point-of-sale device, according to an example embodiment.

FIG. 4 illustrates a block diagram of internal components of a multi-mode point-of-sale device, some of which may be integrated, for example, on one or more printed circuit boards or substrates, according to an example embodiment. Select elements of FIG. 4 correspond to, control, access, process, and/or interact with elements described above with respect to FIGS. 2A, 2B, and 3, as will be appreciated by those skilled in the relevant art(s) based on the teachings contained herein.

The internal components include processor 401, which may include one or more processing cores. Further, the processor 401 may be a collection of processors operating in cooperation for given computing tasks. In an embodiment, the processor may utilize an ARM architecture, although other processor architectures, types, speeds, and configurations are possible as will be appreciated by those skilled in the relevant art(s). The processor 401 controls operation of the POS device 101, including the software used to operate the POS device 101 as well as the internal and integrated components. In an embodiment, a thermostat may be located in close proximity to the processor 401 to sense the temperature of the processor 401.

The internal components also include memory 403 and storage 405. In an embodiment, memory 403 may be random access memory (RAM) in any density, for example but not limited to 1 GB. Storage 405 may be any kind of persistent storage, for example flash memory (NAND or NOR). As will be appreciated by those skilled in the relevant art(s), other types of longer-term storage may be used instead or in addition.

The POS device 101 may include one or more communications transceivers, such as a wired transceiver 407 and/or a wireless transceiver 433. The wired transceiver 407 may be an Ethernet port for connection to a LAN. The wireless transceiver 433 may be a Wi-Fi transceiver that is compliant with IEEE 802.11 standards, such as b/g/n/ac. As will be appreciated by those skilled in the relevant art(s), other standards may be used to same effect. In addition to or as part of one of the above transceivers, the POS device 101 may also incorporate a near field communications (NFC) device, such as a NFC communicator, NFC initiator, or NFC target. The NFC device may operate in active or passive communication modes, depending upon the NFC device's configuration. In an embodiment, the NFC device may be located in an area of the bezel surrounding the touch screen display 201, though other locations are possible. Communications may be secured according to one or more security and/or encryption protocols, for example Secure Sockets Layer (SSL) to name just one example.

The internal components can also include a speaker 409. The speaker 409 may provide audible system feedback to users, such as the primary and/or secondary users of the POS device 101. The speaker 409 may have one channel and have 1 watt of power. As will be appreciated by those skilled in the relevant art(s), more speakers and/or channels are possible as well.

System control 411 provides an interface for power on/off button 415 and power indicator 413. The power on/off button 415 may control whether the POS device 101 is on or off. The power on/off button 415 may be one or a plurality of buttons each dedicated to a different aspect—e.g., there may be a dedicated power button to control power to the transfer board 305 and a dedicated power button to control power to the touch screen display 201. In an embodiment, the power on/off button 415 may be configured to turn on and off, respectively, the back light of the touch screen display 201 while leaving power supplied to other components of the POS device 101. The processor 401 may, via system control 411, control the power indicator 413, which may be one or more LEDs that operate as discussed above with respect to power supply 309.

The processor 401 may interact with, and control in certain embodiments, several components via interface 417. In an embodiment, interface 417 is a GPIO interface. For example, the processor 401 may control operation of optical sensor 423, bar code reader trigger 425, and accelerometer 427.

The accelerometer 427 is located in close proximity to the touch screen display 201. In this manner, whenever the touch screen display 201 is pivoted from one position to the other, such as the position associated with the primary to the position associated with the secondary user (or vice versa), the accelerometer 427 may move with the touch screen display 201 and therefore senses the motion and/or change in position. In an embodiment, the accelerometer 427 may have an activation angle of +/−15 degrees from horizontal and an activation angle tolerance of +/−5 degrees. Further, the accelerometer 427 may have an effective activation angle range of +/−10 to 20 degrees, with a hysteresis angle of at least +/−20 degrees. As will be appreciated by those skilled in the relevant art(s), other angles/ranges are possible as well.

The processor 401 also controls the relay 419 and solenoid 421 via the GPIO interface 417. The solenoid 421 may be driven by the relay 419 to control the latch/release of the cash drawer 205, as well as provision of a push to open the cash drawer 205. The GPIO interface 417 may also control the backlight of the touch screen display 201, for example to turn off the backlight after a predetermined period of inactivity so as to extend the operating life of the touch screen display 201. Similarly the GPIO interface 417 may be used to disable any USB external ports for security.

The processor 401 also controls customer facing display 449 and receipt printer 447 via interface 445. Interface 445, in an embodiment, is a set of serial interfaces, such as RS232, 422, or 485. Other types of interfaces, such as USB, are possible as will be appreciated by those skilled in the relevant art(s). The customer facing display 449 may be the type of customer-facing display 213 discussed above with respect to FIG. 2B. The receipt printer 447 may be as described above with respect to FIG. 2A.

The processor 401 also controls the touch screen 431, the wireless transceiver 433, the barcode scanner 435, a card reader 437, a camera 439, a mini USB connection 441, and an external connector 443 (e.g., an external USB port) via interface 429. In an embodiment, the interface 429 may be a USB interface, although other types are possible as will be appreciated by those skilled in the relevant art(s). The touch screen 431 may be the touch screen display 201 discussed in the previous figures. In an embodiment, the processor 401 may provide high level commands and data to the touch screen 431 in cooperation with a dedicated controller for the touch screen 431 (not illustrated in FIG. 4) that provides low-level commands used for operation. The barcode scanner 435 and the camera 439 may be the barcode scanner 215 and camera 217, respectively, discussed in the figures above.

The processor 401 may also control the panel 453, for example a panel interface driving a displayed image resolution for the touch screen display 201 of 1920×1080, via the interface 451. Other resolutions are possible as is understood by those skilled in the relevant art(s). The interface 451 may include an embedded DisplayPort interface for the panel 453 and a back light driver.

FIG. 4 diagrammatically shows different hardware elements that have been integrated together into the single POS device 101, according to an embodiment. The POS device 101 may be designed and manufactured to be in compliance with one or more security standards, for example the Payment Card Industry (PCI) data security standard or any other applicable standard/protocol/specification for added security. The peripheral device may connect via USB or mini USB, such as in embodiments where the data interface 211 in FIG. 2B is a USB interface or the mini USB 441, though other types of interfaces would work as well. Various security features of the POS device 101 are described in further detail below.

Figure 5:
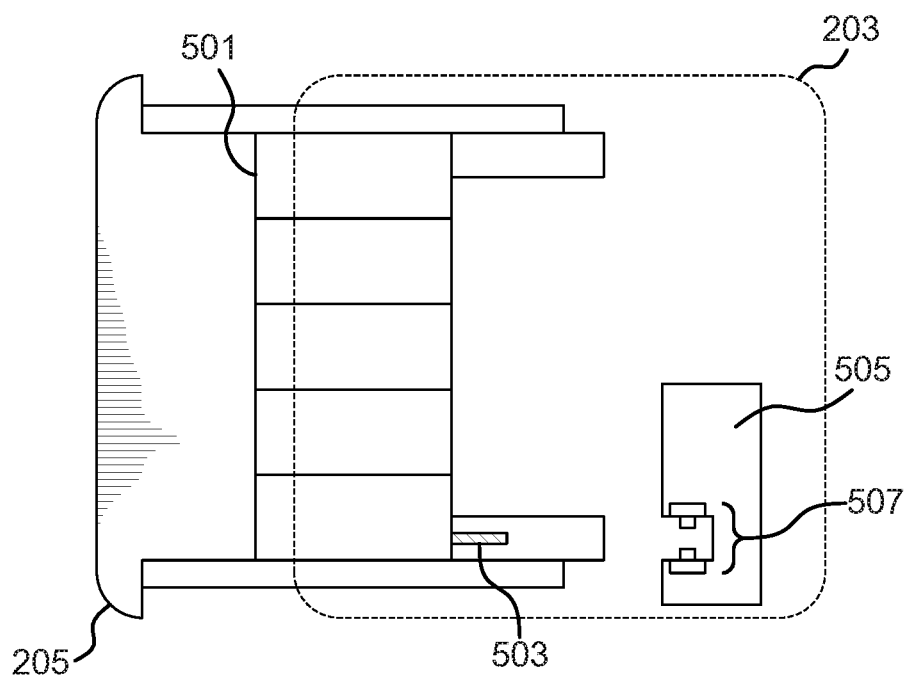
FIG. 5 illustrates an internal configuration of a closed-drawer detection mechanism, according to an example embodiment.

FIG. 5 illustrates an internal configuration of a closed-drawer detection mechanism that may be used with the cash drawer 205 of FIG. 2A, according to an example embodiment. The cash drawer 205 may include dividers 501, for example to divide up the cash drawer 205 into four compartments for paper currency and five trays for coin currency. Other combinations of compartments and trays are possible as well. In an embodiment, the cash drawer 205 is designed according to a smaller form factor than conventional cash drawers, e.g. ⅔ the size of a conventional cash drawer. Other sizes and dimensions are possible as will be recognized by those skilled in the relevant art(s).

The cash drawer 205 also includes a ridge 503, such as a rib of plastic extending above the drawer leads. An optical pair 507 is mounted on a circuit board 505, which in an embodiment may be part of the transfer board 305. In an embodiment, the optical pair 507 includes an LED source, for example infrared, and a photo transistor. As shown in FIG. 5, the LED source may be the upper device of the optical pair 507 and the photo transistor may be the lower device of the optical pair 507.

The cash drawer 205 is depicted in the example of FIG. 5 in an open position with respect to the base 203. In this configuration, the system of the POS device 101 knows that the cash drawer 205 is open because the ridge 503 is moved out of the optical path between the elements of the optical pair 507, such that the light emitted from the LED source reaches the photo detector.

Figure 6:
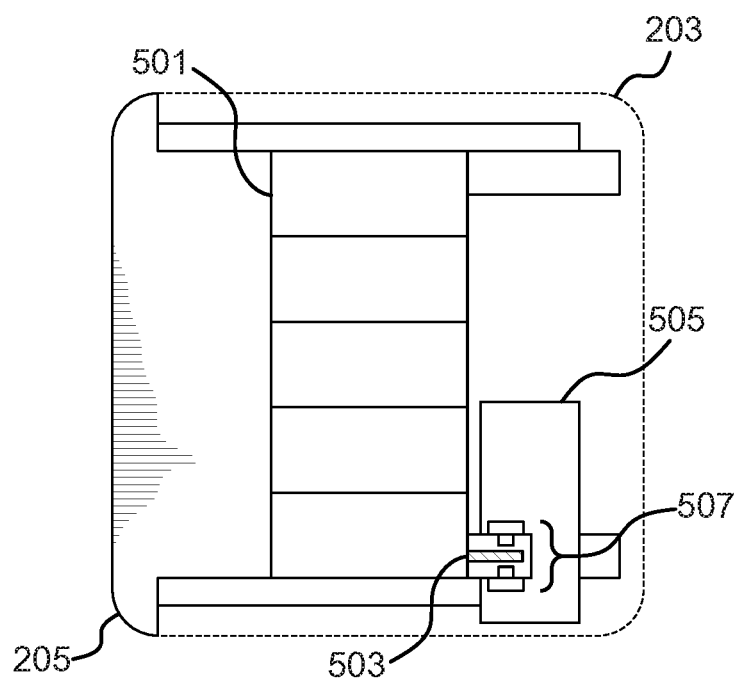
FIG. 6 illustrates an internal configuration of a closed-drawer detection mechanism, according to an example embodiment.

FIG. 6 illustrates an internal configuration of the closed-drawer detection mechanism discussed with respect to FIG. 5 that may be used with the cash drawer 205, according to an example embodiment. In FIG. 6, the cash drawer 205 is moved to a closed position with respect to the base 203. In this position, the ridge 503 has been placed in a position along the cash drawer 205 such that the ridge 503 interrupts the optical path between the optical pair 507. The system of the POS device 101 receives a signal in this situation indicating that the light from the LED source is not detected at the photo transistor. The system determines from this that the cash drawer 205 is now closed. For example, the signal level may be "high" (e.g., logic level high) when the optical path is not interrupted, which is interpreted as the cash drawer 205 being in an open position. Alternatively, the signal level may be set to "low" (e.g., logic level low) when the optical path is not interrupted, with the system interpreting the cash drawer 205 open condition based on the alternative low signal.

Figure 7:
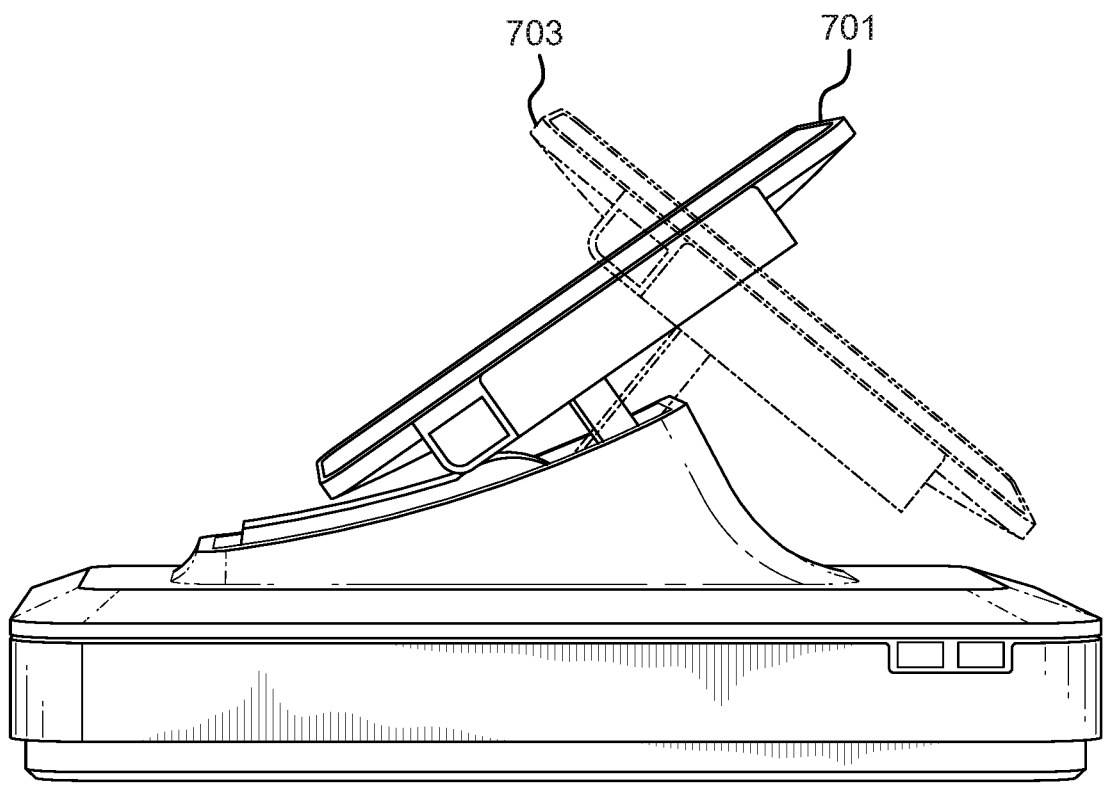
FIG. 7 illustrates different configuration modes of a multi-mode point-of-sale device, according to an example embodiment.

FIG. 7 illustrates different configuration modes of a multi-mode point-of-sale device, such as the POS device 101 of FIG. 1, according to an example embodiment. FIG. 7 illustrates the touch screen display 201, located on mount 219, being in one of two positions 701 or 703. In an embodiment, the position 701 corresponds to the first or primary position where the touch screen display 201 faces the primary user of the POS device 101 (e.g., merchant) and the position 703 corresponds to the second or secondary position where the touch screen display 201 faces the secondary user (e.g., customer).

Figure 8:
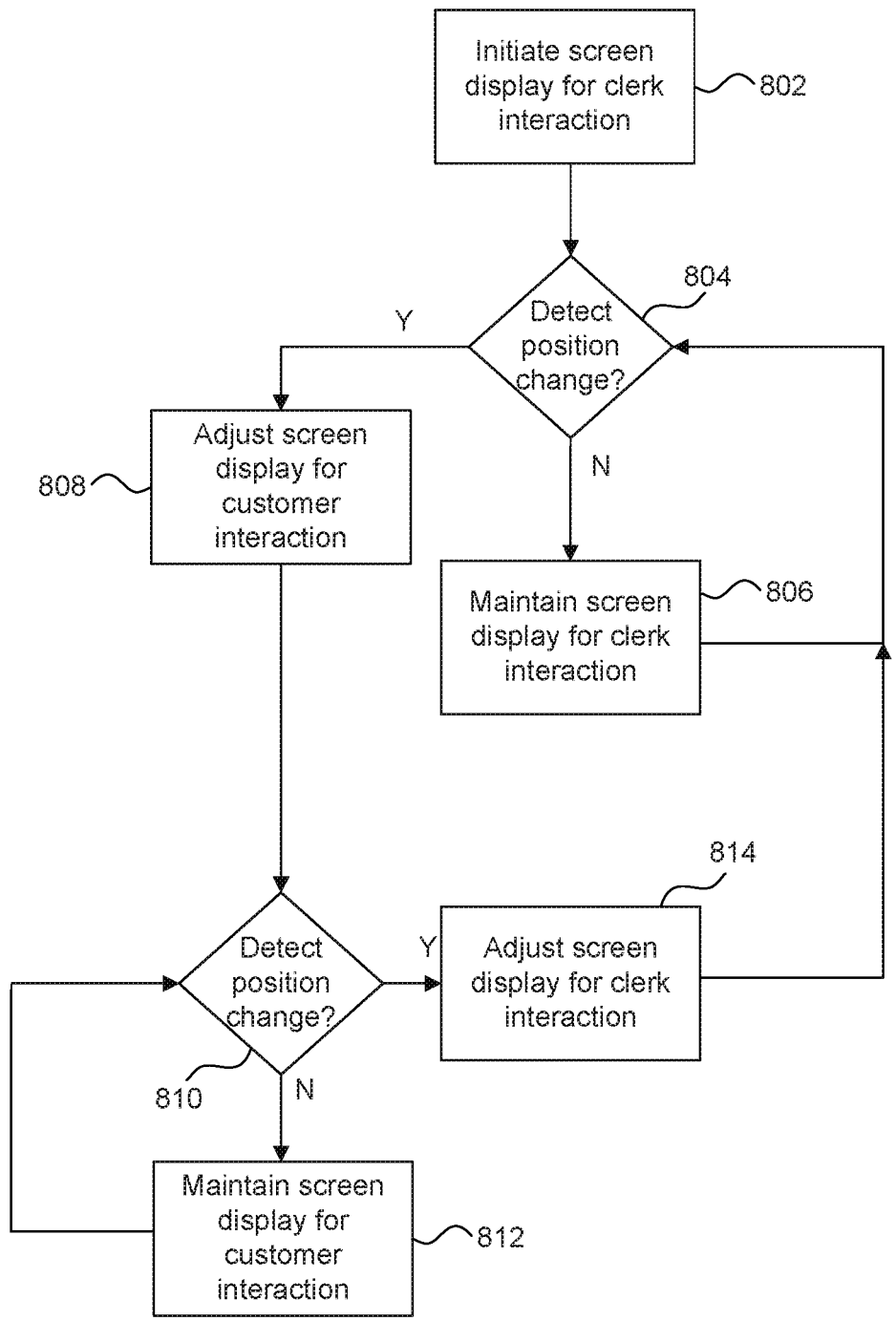
FIG. 8 illustrates a flowchart illustrating a process for switching between a first interface and a second interface of a multi-mode point-of-sale device, according to an example embodiment.

The operation that occurs when the touch screen display 201 pivots between the primary and secondary positions is described with respect to FIG. 8, which is a flowchart illustrating a process 800 for switching between a first interface and a second interface of a multi-mode point-of-sale device, such as the POS device 101 of FIG. 1, according to an example embodiment.

At step 802, the touch screen display 201 is initiated with the first interface positioned and configured for interaction with the primary user, such as a merchant or store clerk. This occurs, for example, upon system startup when the touch screen display 201 is in its resting position in the first position, such as position 701 of FIG. 7. The first interface may include, for example, one or more graphic user interfaces (GUIs) used to display and/or enter product information, price, payment information for a transaction, and/or enable other tasks actions associated with the transaction.

At step 804, the system (for example processor 401) determines whether a position change of the touch screen display 201 to the second position has been detected. Detection of position changes may be provided by the accelerometer 427 discussed above with respect to FIG. 4. If a position change has not been detected at step 804, the process 800 proceeds to step 806, in which the system maintains the first interface to enable clerk interaction with the system and periodically checks (or through an interrupt approach) at step 804 whether a change has been detected, for example a few times each second. Alternatively, the system may continuously check whether a position change has been detected.

If a position change is detected at step 804, then the process 800 proceeds to step 808. At step 808, in response to detecting the position change from the first position 701 to the second position 703, the system changes from the first interface to displaying the second interface on the touch screen display 201. The second interface may include, for example, one or more GUIs for a customer to view, access, select and/or enter payment information to complete a transaction, and/or enable other tasks or actions associated with the transaction. In addition or alternatively, the second interface may include advertising information, as discussed in more detail below.

After the system has changed what is output on the touch screen display 201 to the second interface, at step 810 the system (for example processor 401) then again checks whether a position change of the touch screen display 201 back to the first position facing the merchant or clerk has been detected. If a position change back to the first position has not been detected at step 810, then the process 800 proceeds to step 812, in which the system maintains the second interface to enable customer interaction with the system. The system may periodically check (or use an interrupt approach) at step 810 whether a change has been detected, for example a few times each second. Alternatively, the system may continuously check whether a position change has been detected.

If a position change from the second position has been detected at step 810, then the process 800 proceeds to step 814. At step 814, in response to detecting the position change from the second position 703 to the first position 701, the system changes from the second interface to the first interface on the touch screen display 201. The process 800 then proceeds back to step 804 to check if or when a position change again occurs. The process 800 ends when the system is powered down.

Figure 9:
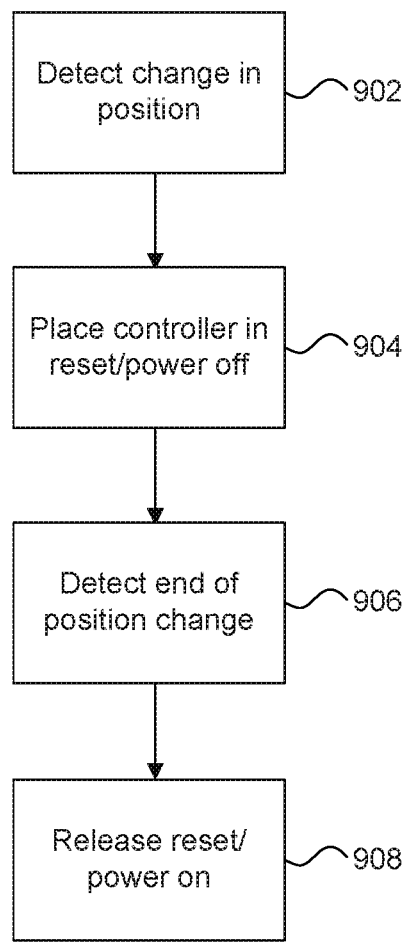
FIG. 9 illustrates a flowchart illustrating a process for maintaining touch performance of a touch screen, according to an example embodiment.

In some situations, the touch screen display 201 may take a noticeable period of time for the scanning baseline of the touch screen display 201 to update when the display is tilted, such as pivoting between positions 701 and 703 as discussed above with respect to FIG. 7. For example, this may occur when a SAW touch screen is used as the touch screen display 201. FIG. 9 is a flowchart illustrating a process 900 for maintaining touch performance of a touch screen, such as touch screen display 201, according to an example embodiment that addresses this.

According to the process 900, the POS device 101 has the ability to reset or power cycle the controller that controls the touch screen display, such as the processor 401 that controls the touch screen display 201. In an embodiment, the operating system has access to a reset pin of the controller. Alternatively or in addition, the operating system has control of a power supply to the controller to be able to power cycle the controller.

At step 902, a sensor detects a change in position, such as a tilt, of the touch screen display. For example, the accelerometer 427 of FIG. 4 detects a pivot of the touch screen display 201 in the housing 221. In an alternative embodiment, a rotary encoder may be constructed with the mount 219 to detect changes in position of the housing 221. As will be appreciated by those skilled in the relevant art(s), the change in position may be detected in other ways.

Once a change in position has been detected, at step 904 the system then either places the controller into reset by assertion of the proper signal on the reset pin, or powers off the controller while the touch screen is in motion. During this time, touch capability is disabled for the touch screen.

At step 906, the sensor detects that the change in position has stopped, for example the touch screen display 201 has stopped its pivot.

At step 908, the system releases the reset signal to the controller. Alternatively, in embodiments where the system controls the power instead of use of a reset, the system powers the controller back on. When the controller comes out of reset and/or powers back on, it begins a process of relearning a baseline for the touch screen and touch is again enabled. In this manner, the system is able to accelerate re-learning of the scanning baseline to maintain predictability of touch performance after a change in position. Although process 900 has been discussed with respect to embodiments where the touch screen uses SAW technology, process 900 may similarly be used with other touch screen technologies that rely on a baseline for touch operation.

Figure 10:
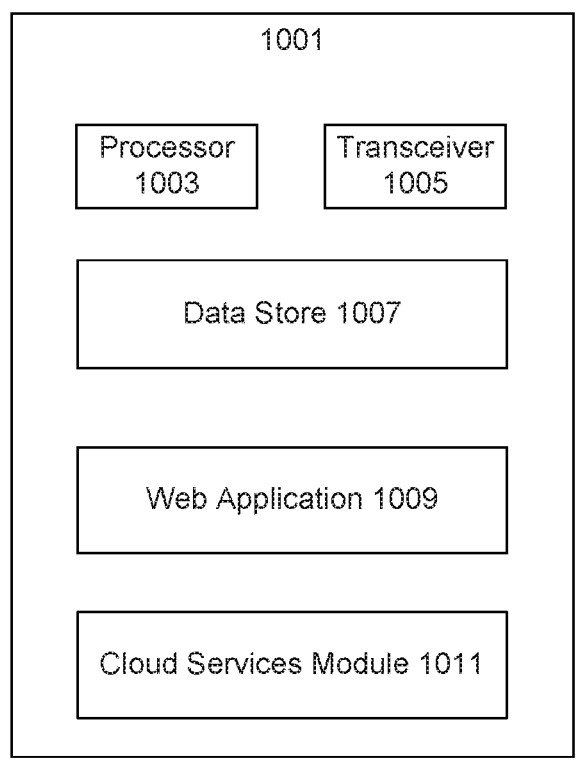
FIG. 10 illustrates a block diagram of a server system, according to an example embodiment.

FIG. 10 is a block diagram of a server system, for example the back-end server 109 or the transaction server 111, according to an example embodiment. The server 1001 may include one or more processors 1003. The one or more processors 1003 may each include one or more processing cores, capable of performing parallel and/or sequential operations. Server 1001 may also include a transceiver 1005, for example an Ethernet connection, Wi-Fi connection, or other connection capable of enabling the server 1001 to transmit and receive data to/from external sources, such as any one or more of the POS device 101, computing device 103, mobile device 105, and transaction server 111 of FIG. 1. The server 1001 may include a data store 1007, for example a hard drive, flash drive, or other types of memory as will be understood by persons skilled in the relevant art(s).

The server 1001 may host web applications via web application module 1009. In an embodiment, a user of the cloud-based point-of-sale system of the present disclosure may manage their inventory and perform other functions by accessing their account(s) via a web site provided or managed by the web application module 1009. The server 1001 may also include a cloud services module 1011 used for data analytics, inventory management, and employee management among other examples. In an embodiment, the cloud services module 1011 may be a database with associated data analysis software.

An exemplary embodiment of server 1001 will be discussed in further detail below with respect to FIG. 36. As will be appreciated by those skilled in the relevant art(s), the different functions of server 1001 depicted in FIG. 10 may be performed wholly within the server 1001, or alternatively may be performed by a plurality of different servers or other types of computing devices operating in cooperation within a geographic vicinity of each other or at geographically different locations.

2. SOFTWARE FEATURES

Figure 11:
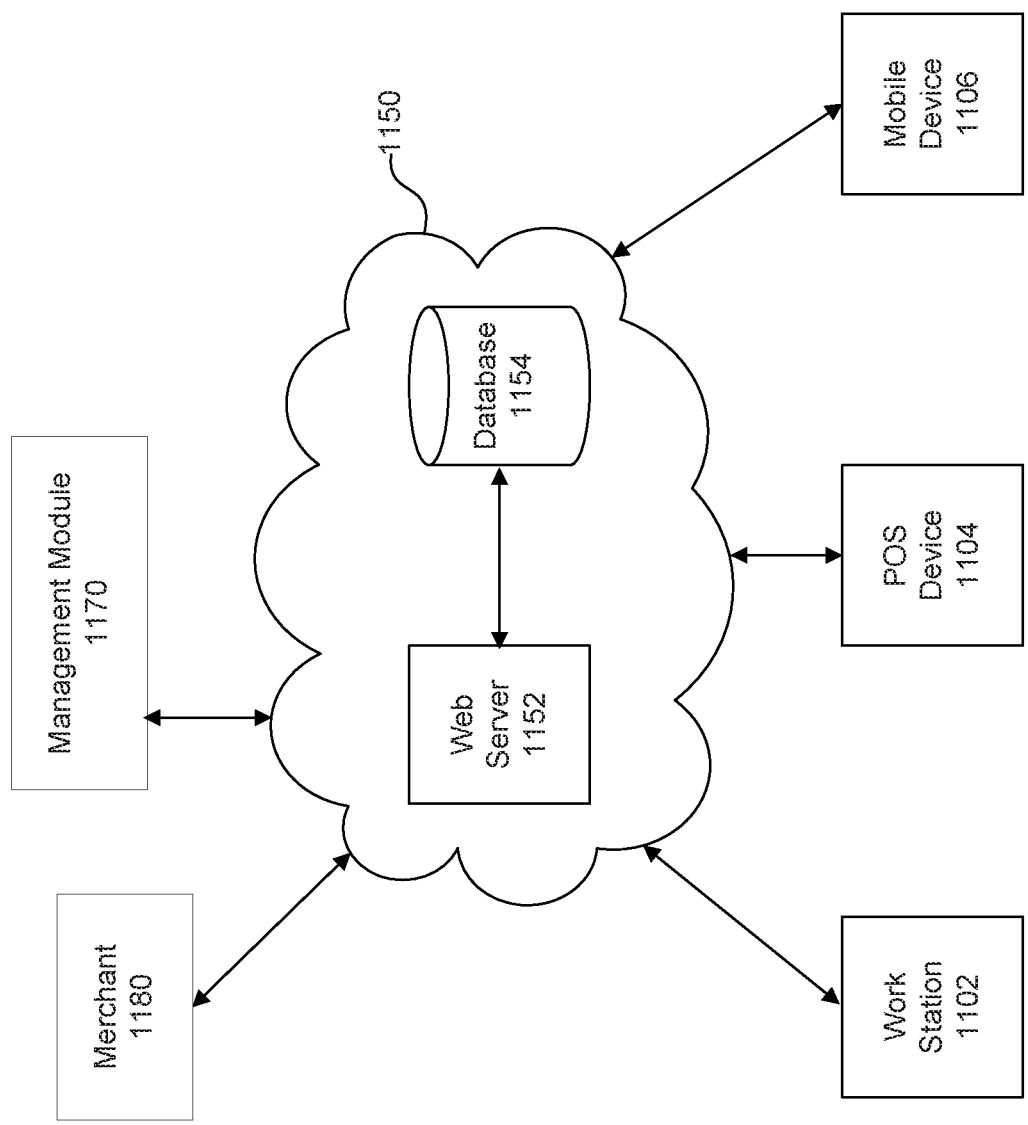
FIG. 11 illustrates a diagram of an exemplary system architecture, according to an embodiment.

FIG. 11 shows an alternative system architecture view 1100 according to an embodiment, showing a workstation 1102, a point of sale (POS) device 1104, and a mobile device 1106. It is noted that FIG. 11 is an alternative embodiment of FIG. 1, and in embodiments, similarly named elements shown in FIGS. 1 and 11 may include any combination of the features, functionality and structure described herein.

Workstation 1102, POS device 1104, and a mobile device 1106 interact with cloud 1150. As will be appreciated, a cloud can include (or connect) a number of different servers and databases. For example, in the example of FIG. 11, cloud 1150 includes a web server 1152 (in some embodiments, shown in FIG. 1 as server 109) which accesses a database 1154. As would be appreciated by those skilled in the relevant art(s) based on the description herein, cloud 1150, as depicted in FIG. 11, is an exemplary illustration and not intended to be limiting. For example, in FIG. 1, cloud 107 is shown as connecting components, as opposed to the depiction in FIG. 11 of cloud 1150 including components. In alternate embodiments, cloud 1150 can include multiple web servers that are, for example, coupled using a network such as the Internet. In such an embodiment, services provided by web server 1152 can be distributed across multiple servers. In further embodiments, one or more of these servers can be coupled to one or more respective databases.

In an embodiment, a management module 1170 remotely controls POS devices 1104 via web server 1152. For example, management module 1170 configures and controls the functionality of POS devices 1104, and dictates the functions POS devices 1104 are allowed to perform. In an embodiment, management module 1170 achieves this control over the functionality of POS devices 1104 by preloading and/or updating software applications on POS devices 1104. As described below, POS devices 1104 are secured (e.g., "hardened"). Accordingly, in embodiments, only management module 1170 has the ability to configure and control the functionality of POS devices 1104. The management module 1170 is external to POS devices 1104.

Figure 29:
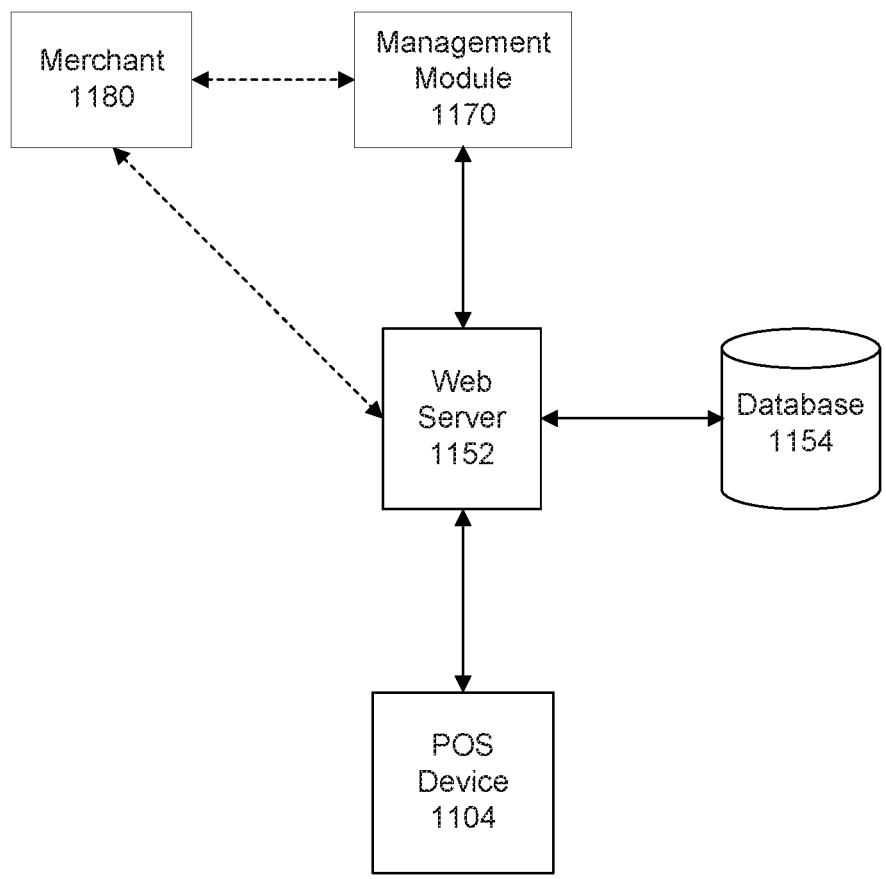
FIGS. 29 and 30 illustrate example relationships of a management module and a merchant in POS environments, according to embodiments.

In an embodiment, a merchant 1180 owns POS device 1104 (alternatively, merchant 1180 could rent, license, etc., POS device 1104), although management module 1170 retains control over POS device 1104 as described above. As further described herein, web server 1152 provides inventory information to POS device 1104. Such inventory information represents inventory the merchant 1180 offers for sale in the store (e.g., merchant premises) in which POS device 1104 is located. In an embodiment, the inventory information is stored in database 1154, and is provided by merchant 1180. The merchant 1180 does not directly save inventory information in database 1154. Instead, in embodiments, the merchant 1180 provides the inventory information to management module 1170 and/or web server 1152, and management module 1170 and/or web server 1152 stores such inventory information in database 1154. This is depicted in FIG. 29.

Figure 30:
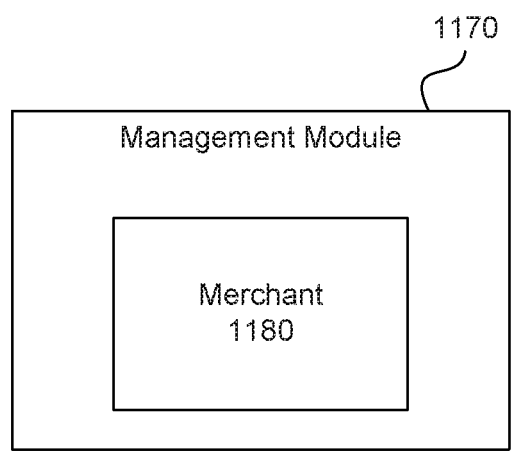

Merchant 1180 and management module 1170 may be the same (FIG. 30) or different entities. Where they are different entities, merchant 1180 may have some rights to configure and control POS devices 1104 through management module 1170. For example, as described below, merchant 1180 may have the ability to add additional stores and/or POS devices, manage inventory, etc. Accordingly, the functionality described herein can be under the control of management module 1170 and/or merchant 1180 through management module, depending on the relationship agreed upon by the entity represented by management module 1170 and the entity represented by merchant 1180.

Figure 12:
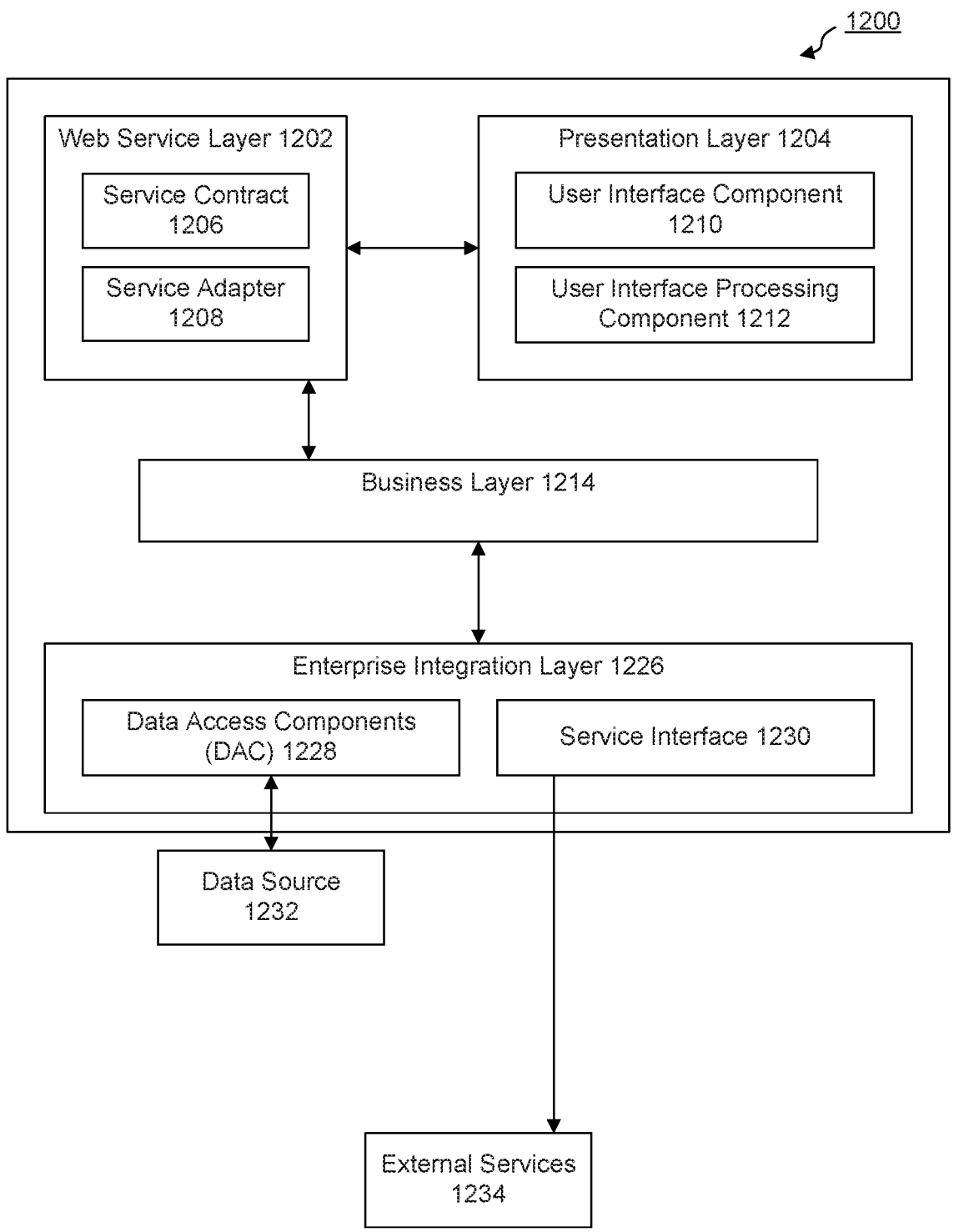
FIG. 12 illustrates an example functional block diagram of an exemplary web server, according to an embodiment.
Figure 13:
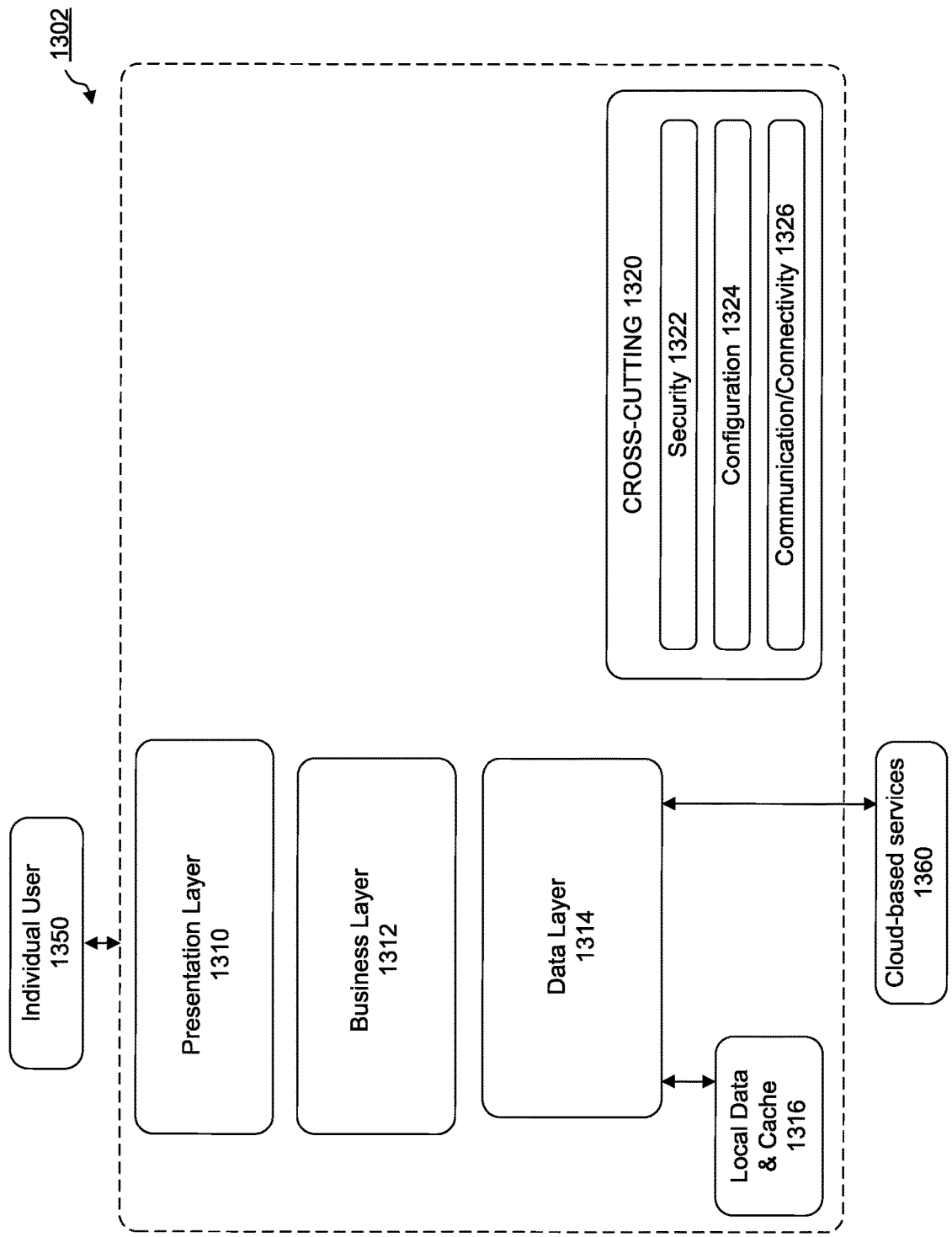
FIG. 13 illustrates an example functional block diagram of an exemplary point of service (POS) device, according to an embodiment.
Figure 15:
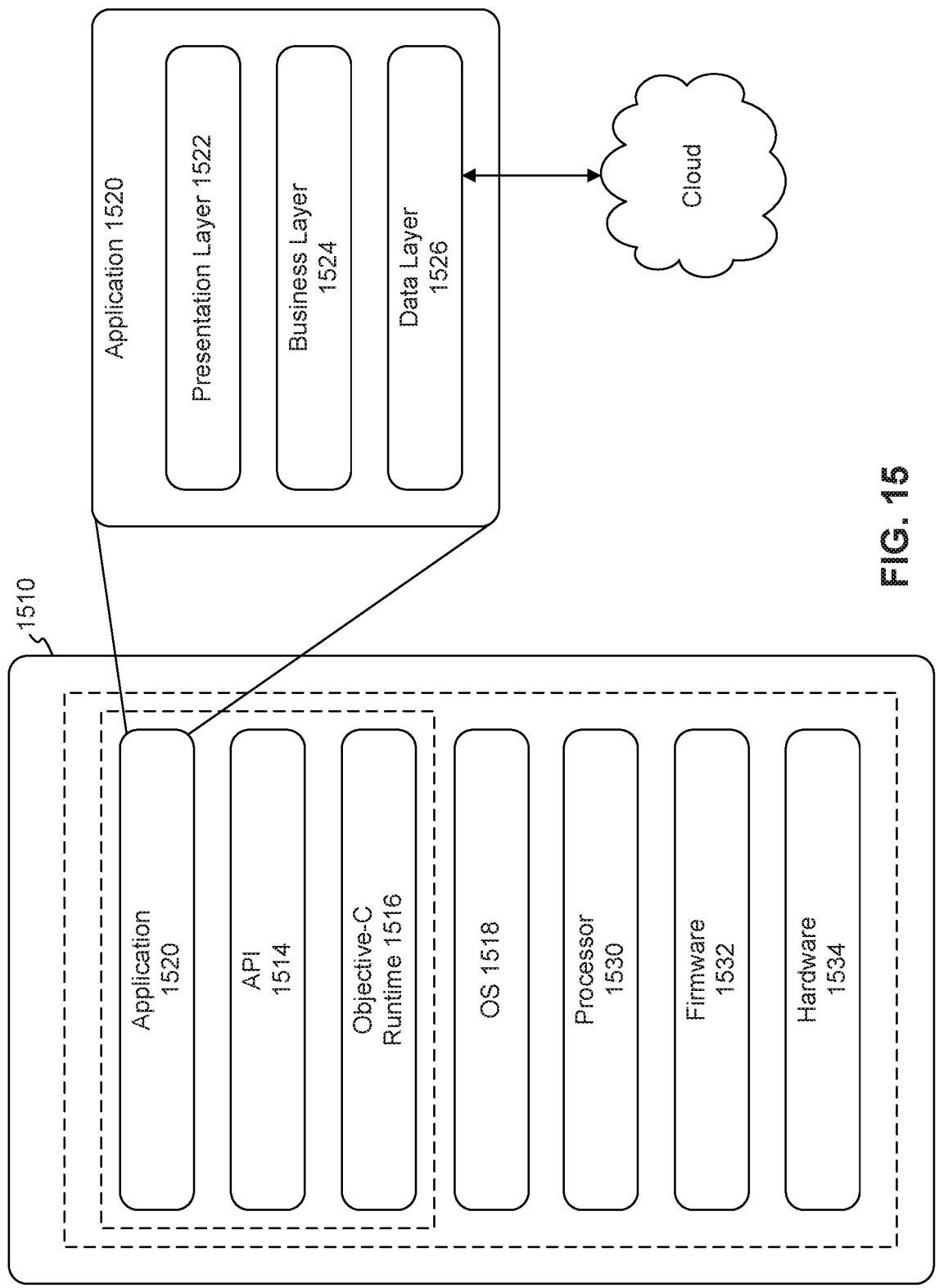
FIG. 15 illustrates an example functional block diagram of an exemplary mobile device, according to an embodiment.

Exemplary embodiments of POS device 1104 and mobile device 1106 are provided in FIGS. 13 and 15, respectively, as well as elsewhere herein. In a further embodiment, POS device 1104 can be implemented as POS device 101, described above with respect to FIG. 1. Moreover, an exemplary architecture of web server 1152 is provided in FIG. 12. In an embodiment, workstation 1102 can be a computer that is connected to the Internet (e.g., a desktop computer, tablet or a laptop computer). Workstation 1102 can interact with web server 1152 (and other aspects of cloud 1150) over a wired and/or wireless network, such as the Internet. For example, and as described in greater detail below, a user using workstation 1102 can use a Web browser running on workstation 1102 to navigate to a website served by web server 1152. Web server 1152 can authenticate the user (e.g., based on a received username and password entered by the user at workstation 1102), and can allow the user to access and/or control various functions including, e.g., inventory, restocking of inventory, notifications, and/or the operation of POS device 1104.

For example, and as described in greater detail herein, in architecture 1100, a primary user (e.g., a clerk, owner, cashier, manager, or other person associated with a merchant) can use workstation 1102 and/or mobile device 1106 to update inventory, receive alerts, and manage the operation of POS device 1104. Moreover, one or more POS devices 1104 can be included in a store of merchant 1180. Workstation 1102 can be used to interact with web server 1152 and database 1154 to update the inventories that are respectively offered to secondary users (e.g., customers) at a given merchant's POS devices 1104 (in an embodiment, different inventories may be offered by a merchant's different POS devices 1104). In a further embodiment, web server 1152 can push notifications to mobile device 1106 to allow primary user(s) to stay apprised of events affecting the merchant. As noted above, the merchant 1180 can be a business entity that sells items, e.g., a retailer.

FIG. 12 shows an example functional block diagram of a web server 1200, according to an embodiment. For example, web server 1152 can be implemented as shown in FIG. 12. As shown in FIG. 12, web server 1200 includes a web service layer 1202, a presentation layer 1204, a business layer 1214, an enterprise integration layer 1226, and a data source 1232. One or more of web service layer 1202, presentation layer 1204, business layer 1214, enterprise integration layer 1226, and data source 1232 can be implemented as a class or an object in an object oriented programming language (e.g., C++ or Java).

Web service layer 1202 includes a service contract module 1206 and a service adaptor module 1208. Service contract module 1206 maintains the details of services provided to different merchants. Service adaptor module 1208 adapts services provided by web server 1200 to the specific processes of the merchant.

Presentation layer 1204 includes a user interface component 1210 and a user interface processing component 1212. In an embodiment, presentation layer 1204 controls how web server 1200 interacts with one or more of a workstation, a POS device, or a mobile device. For example, presentation layer 1204 can control the different types of interfaces or pages presented on a workstation, a POS device, and/or a mobile device. User interface component 1210 can store different user interfaces for different merchants and different devices used by a merchant to access web server 1200. User interface processing component 1212 can process interactions between web server 1200 and a merchant. For example, user interface processing component 1212 can process inputs received from a workstation, a POS device, and/or a mobile device and provide responsive outputs.

Business layer 1214 manages data flow through web server 1200. For example, business layer 1214 can manage security systems of web server 1200, business work flows, business services, and/or business entities associated with web server 1200. For example, business layer 1214 can include a number of classes and/or objects that handle one or more of these functions. Enterprise integration layer 1226 includes data access components 1228 and service interface 1230.

Data access components 1228 manage the interaction between web server 1200 and data source 1232. In an embodiment, database 1154 can be implemented as data source 1232. In an embodiment, data source 1232 can store information such as inventory associated with merchant and/or advertisements to be displayed on POS devices. Service interface 1230 manages services external to web server 1200. For example, service interface 1230 can interact with external services module 1234. External services module 1234 can allow for, e.g., sending push notifications to one or more of a workstation, a POS device, and a mobile device. In a further embodiment, external services module 1234 can include an email interface that allows for web server 1200 to send emails. In another embodiment, external services 1234 can send push notifications when the inventory has fallen below a predetermined threshold or if a notification regarding the status of one or more POS devices has been received at web server 1200.

FIG. 13 shows an example functional block diagram of a POS device 1302, according to an embodiment. In an embodiment, POS device 1104 can be implemented as POS device 1302. POS device 101 shown in FIG. 1 can also be implemented as POS device 1302. As shown in FIG. 13, a POS device 1302 can interact with an individual user 1350 (or multiple users). User 1350 can be a primary user or a secondary user. In an embodiment, POS device 1302 can be a register located within a store of a merchant. For example, POS device 1302 can be implemented according as POS device 101, as described with respect to FIG. 1.

As shown in FIG. 13, POS device 1302 includes a presentation layer 1310, a business layer 1312, a data layer 1314, a local data module 1316, and cross cutting modules 1320. Presentation layer 1310 can control what is shown on a touch screen of a POS device 1302. For example, presentation layer 1310 can include user interaction components and presentation logic components. These components of presentation layer 1310 can control what is shown to users during a scanning phase of a transaction and a purchasing phase of a transaction.

Business layer 1312 manages the flow of data within POS device 1302. For example, business layer 1312 can include a business workflow module that manages the transitions of POS device 1302. Business layer 1312 can also include a business entities module and a business components module that store information relating to the business entity, or merchant, that owns POS device 1302 and components of that business.

Data layer 1314 can manage the access of POS device 1302 to local store data and data stored within a web accessible device, e.g., the cloud. For example, data layer 1314 can manage access to a local data module 1316. For example, local data module 1316 can include a local database and/or a local cache. For example, as will be described in greater detail below, local data module 1316 can store deferred transactions and information about the inventory of the merchant. As shown in FIG. 13, data layer 1314 can also control access to cloud base services 1360. For example, referring to FIG. 11, data layer 1314 can control access to cloud 1150. For example, data layer 1314 can be used to sync the available inventory presented to the user 1350 with the inventory included in database 1154.

POS device 1302 also includes cross-cutting modules 1320. In an embodiment, "cross-cutting" modules generally refer to modules that provide input to multiple different layers or modules of a device (and thus "cross-cut" the device). For example, in the embodiment of FIG. 13, cross-cutting modules 1320 are accessed by one or more of presentation layer 1310, business layer 1312, and data layer 1314. As shown in FIG. 13, cross-cutting modules 1320 include a security module 1322, a configuration module 1324, and a communication/connectivity module 1326. The operation of security module 1322 will be described in greater detail below. Configuration module 1324 includes configuration details relating to POS device 1302. For example, configuration module 1324 can include configuration settings relating to components of POS device 1302, e.g., a cash drawer, a printer, a barcode scanner, a MSR, and/or CFD. Communication/connectivity module 1326 manages the communication between POS device 1302 and the cloud. For example, in an embodiment in which POS device 1104 of FIG. 11 is implemented as POS device 1302, communication/connectivity module 1326 can manage communication between POS device 1302 and cloud 1150.

Figure 14:
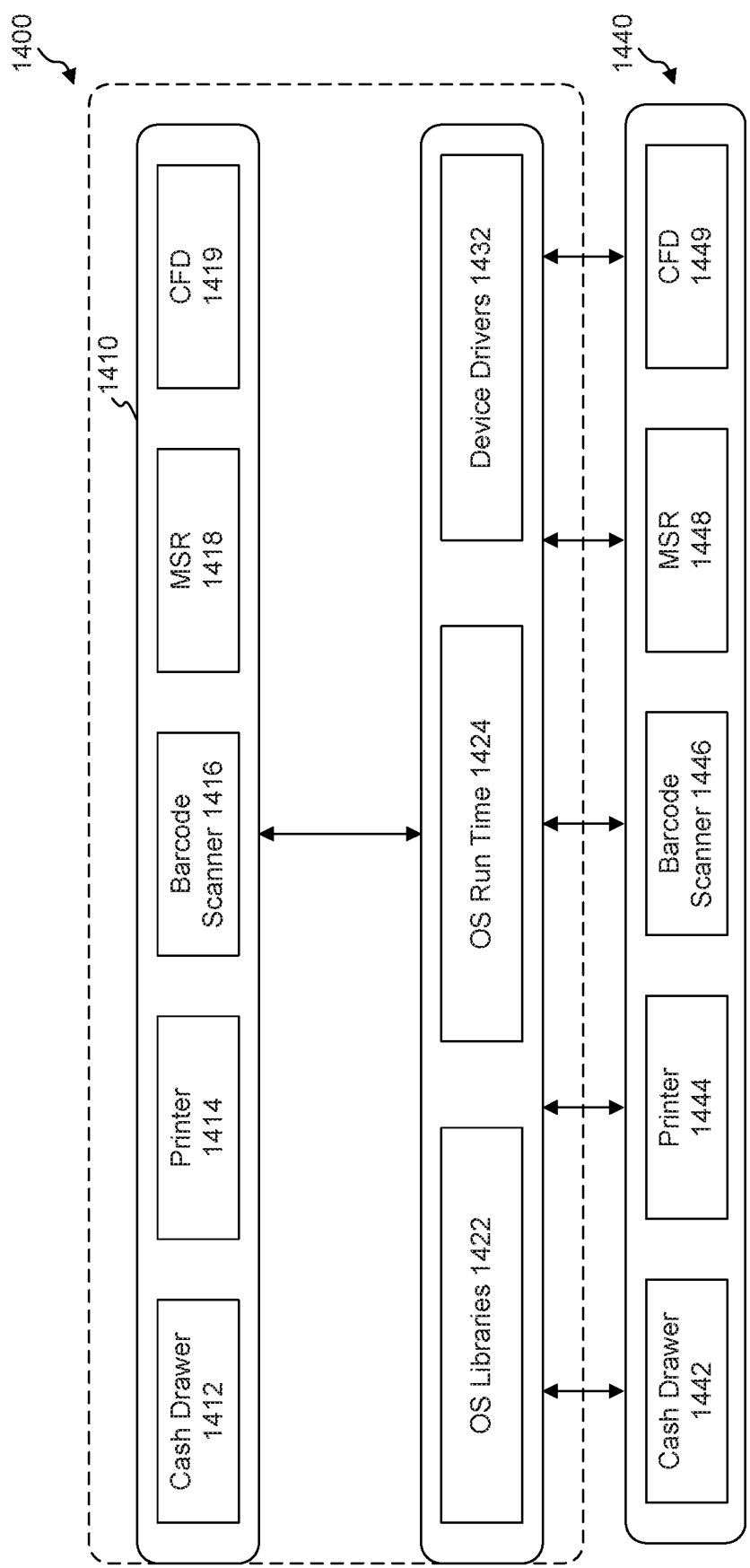
FIG. 14 illustrates an example functional block diagram of an exemplary interface between to peripherals of a POS device, according to an embodiment.

FIG. 14 shows an example functional block diagram of an interface between interface 1400 and various components of a POS device, according to an embodiment. In an embodiment, POS device 1302, shown in FIG. 13, can use interface 1400 to interface to with its components. As shown in FIG. 14, interface 1400 includes application programming interfaces (APIs) 1410, operating system of libraries 1422, operating system runtime 1424, device drivers 1432.

APIs 1410 include an API for each peripheral with which interface 1400 communicates. Thus, in an example embodiment of FIG. 14, APIs 1410 include a cash drawer API 1412, a printer API 1414, a barcode scanner API 1416, a magnetic stripe reader (MSR) API 1418, and a consumer facing device (CFD) API 1419. Each of APIs 1410 allow applications running on a POS device to communicate with respective ones of peripherals 1440. APIs 1410 allow for communication to and from respective peripherals of peripherals 1440. Operating system libraries 1422, operating system runtime module 1424, and device drivers 1432 allow for communication between APIs 1410 and respective ones of peripherals 1440. In an embodiment, one or more of device drivers 1430 can be implemented as kernel mode drivers. It is noted the example of FIG. 14 is provided for illustrative purposes. Other architectures for interfacing may alternatively be used.

FIG. 15 shows an example functional block diagram of a mobile device 1510 that runs an application 1520, according to embodiment. For example, in an embodiment, application 1520 may be an application that interfaces with a cloud processing system. For example, in the embodiment in which mobile device 1106 of FIG. 11 is implemented as mobile device 1510, application 1520 can be an application that interfaces to cloud 1150 to allow for, e.g., management of inventory. As shown in FIG. 15, application layer 1520 includes presentation layer 1522, business layer 1524, and data layer 1526. Presentation layer 1522 can control the presentation of data received from a cloud and/or presentation of forms allowing a user to submit data to the cloud. Business layer 1524 can control the flow of information from application 1520 to the cloud and vice versa. Data layer 1526 can manage communications between application 1520 and the cloud.

As shown in the diagram of mobile device 1510, in an embodiment, application 1520 communicates with other layers of mobile device 1510 through API calls. For example, as shown in FIG. 15, API layer 1514 provides an interface between application 1520 and objective C run time 1516. Objective C run time 1516 operates as an interface between application 1520 and operating system 1518.

Operating system 1518 communicates with hardware aspects of mobile device 1510. For example, as shown in FIG. 15, operating system 1518 communicates with processor 1530. Processor 1530 executes instructions based on, e.g., instructions stored in firmware 1532. Mobile device 1510 communicates with the outside world through hardware 1534. For example, hardware 1534 can include wireless circuitry and/or other types of communication mechanisms.

Figure 16:
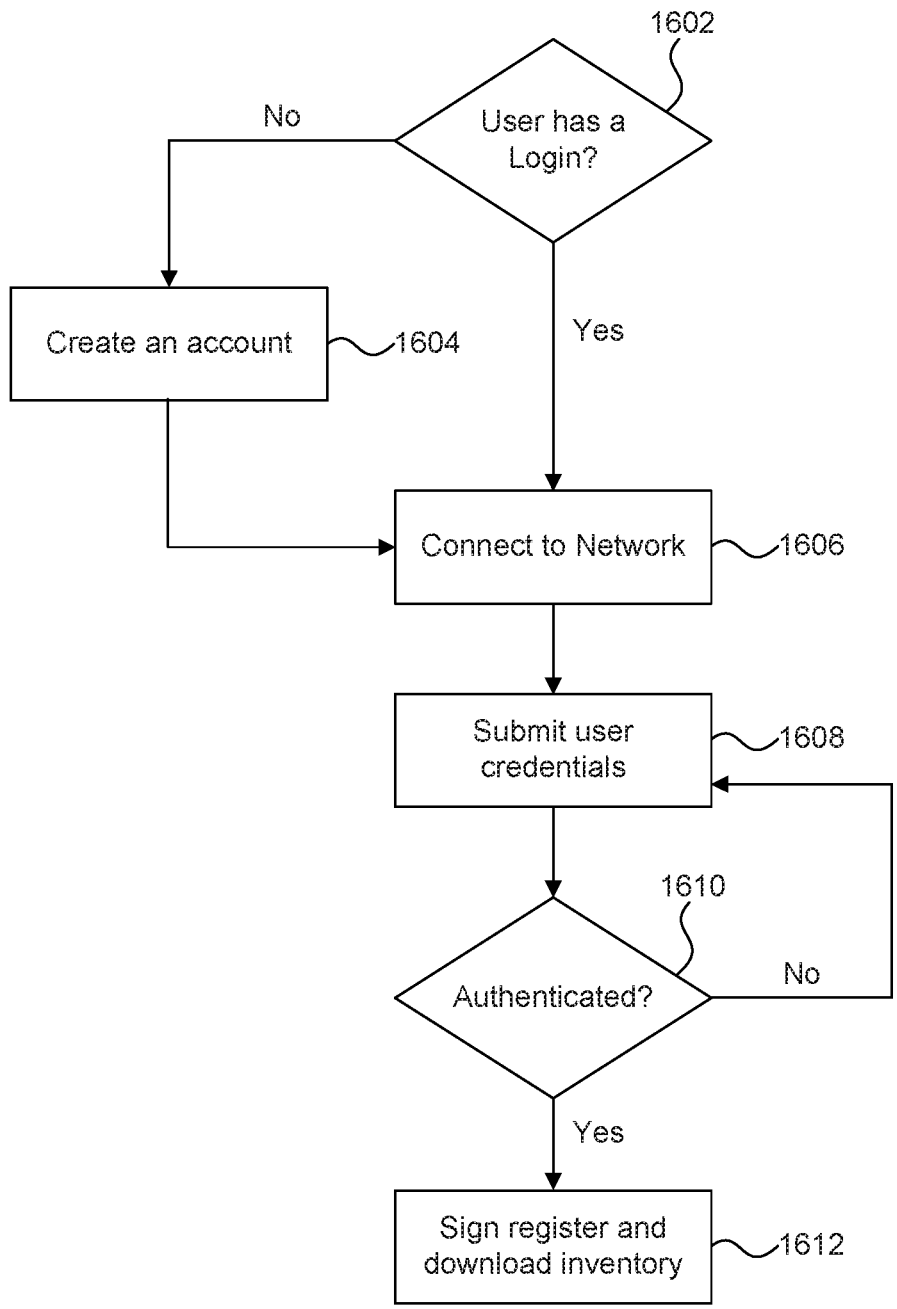
FIG. 16 illustrates a flowchart providing example steps for setting up a POS device, according to an embodiment.

POS device use embodiments will now be discussed. FIG. 16 shows a flowchart of a method 1600 for setting up a POS device, according to an embodiment. Method 1600 is described with reference to the embodiments shown in FIGS. 11 and 13, but is not limited to those embodiments.

In step 1602, it is determined whether a user has login information/credentials. For example, the user can be a primary user, e.g., a store owner, store clerk or another employee or person associated with the merchant to whom the POS device is associated. For example, in the embodiment of FIG. 11, POS device 1104 can query the user to determine whether the user has login credentials that will allow the user to use the POS device.

If not, in step 1604, the user can attempt to create an account. For example, in the embodiment of FIG. 13, presentation layer 1310 can present a screen requesting information from the user needed to create an account. Once that account information is received, data layer 1314 can transmit this data to cloud based services to create the account.

In step 1606, the POS device is connected to a network. For example, in the embodiment of FIG. 13, POS device 1302 can be connected to a network through communication/connectivity module 1326. For example, the network can be the Internet or a private network. For example, connecting to the network can allow the POS device to access cloud-based services (e.g., inventory control and remote configuration).

In step 1608, a user submits his/her credentials. For example, in FIG. 13, presentation layer 1310 can query a user for a user name and password. This information can be temporarily stored in local data module 1316. The credentials can then be transmitted to cloud based services through data layer 1314. For example, in the embodiment of FIG. 11, POS device 1104 can transmit the credentials to cloud 1150.

In step 1610, it is determined whether the user's credentials have been authenticated. For example, in the embodiment of FIG. 11, web server 1152 can access database 1154 to determine whether the submitted user name is a valid user name and whether the password is a valid password.

In step 1612, the user signs into the POS device and inventory can be downloaded to the POS device. For example, in FIG. 11, the user can login into POS device 1104 and download inventory for the store associated with the POS device from cloud 1150, e.g., database 1154.

In an embodiment, when a customer checks out at a store, the POS device (such as 101, 1104, etc.) operates according to an input state and a purchasing state. In the input (or inputting) state, the POS device is operated by a primary user (e.g., a store clerk) to input items that a secondary user (e.g., a customer) wants to purchase. Inputting items can involve scanning the barcode of items that the secondary user wants to purchase. For example, during the input state, the store clerk scans the barcode of the items that the customer has selected and physically brought to the POS device to purchase (such as in a checkout line of a store). It will be appreciated that inputting items for purchase by scanning barcodes is one way of inputting items, but other ways can be used (e.g., the store clerk keying in codes assigned to a particular item).

In the purchasing (or purchase or payment) state, the POS device is operated by the user to enable the user to pay for the items inputted during the input state. For example, the POS device may guide the user through the processing of paying for the items using a credit card.

Figure 17:
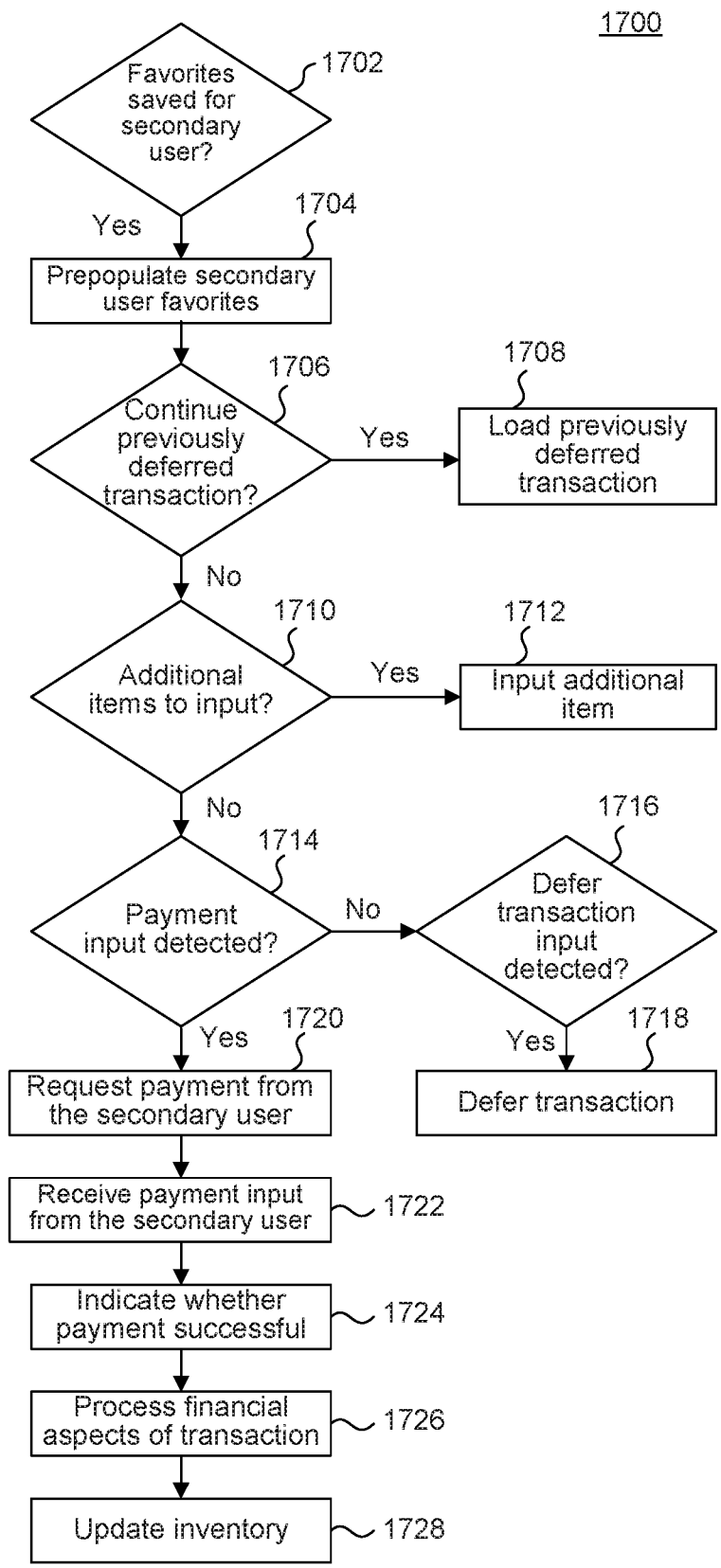
FIG. 17 illustrates a flowchart providing example steps for managing a transaction from a POS device, according to an embodiment.

FIG. 17 shows a flowchart of a method 1700 for managing a purchase transaction, during which time a POS device is used in the input and purchasing states as described above, according to an embodiment. Method 1700 is described with respect to the embodiments shown in FIGS. 11 and 13, but is not limited to those embodiments. In an embodiment, steps 1702-1718 occur while a POS device is in the input state, and steps 1720-1728 occur while the POS device is in the purchasing state.

In step 1702, it is determined whether favorites are saved for a secondary user, e.g., a customer. In an embodiment, repeat customers may buy similar items in different trips to a store of merchant. For example, a customer of a grocery store may buy similar items on a weekly basis from the grocery store. In an embodiment, a user can designate certain items to be favorites. In an alternate embodiment, favorites can be determined based on patterns found in the purchasing behavior of the customer.

For example, in the embodiment of FIG. 11, POS device 1104 can determine whether it has locally-saved favorites for the secondary user. In an alternate embodiment, POS device 1104 can query web server 1152 to determine if favorites are saved for the secondary user. In this manner, favorites may be saved for a given secondary user across POS devices 1104 and across merchants. The query to web server 1152 can include, e.g., a name, email address, phone number, or identification number associated with the user.

If favorites have been saved for the secondary user, then in step 1704, the user's favorites can be pre-populated into a list of items to be purchased. For example, the touch screen of a POS device 1104 can display the pre-populated with favorite items.

In step 1706, it is determined whether a previously deferred transaction should be continued. For example, a secondary user (e.g., a customer) may begin a transaction by bringing a number of items to a POS device for checkout and the primary user (e.g., a cashier) may input one or more of those items. The secondary user may choose to defer rather than provide payment for the input items. Later, shown here at step 1706, the customer can continue the transaction at a POS device without re-inputting items that had be previously input.

In step 1708, the previously deferred transaction is loaded. For example, in FIG. 11, POS device 1104 can load a previously deferred transaction from a locally stored memory. In another embodiment, POS device 1104 can load a previously deferred transaction from cloud 1150. For example, POS device 1104 can interact with web server 1152 to retrieve a previously deferred transaction from database 1154.

Figure 18:
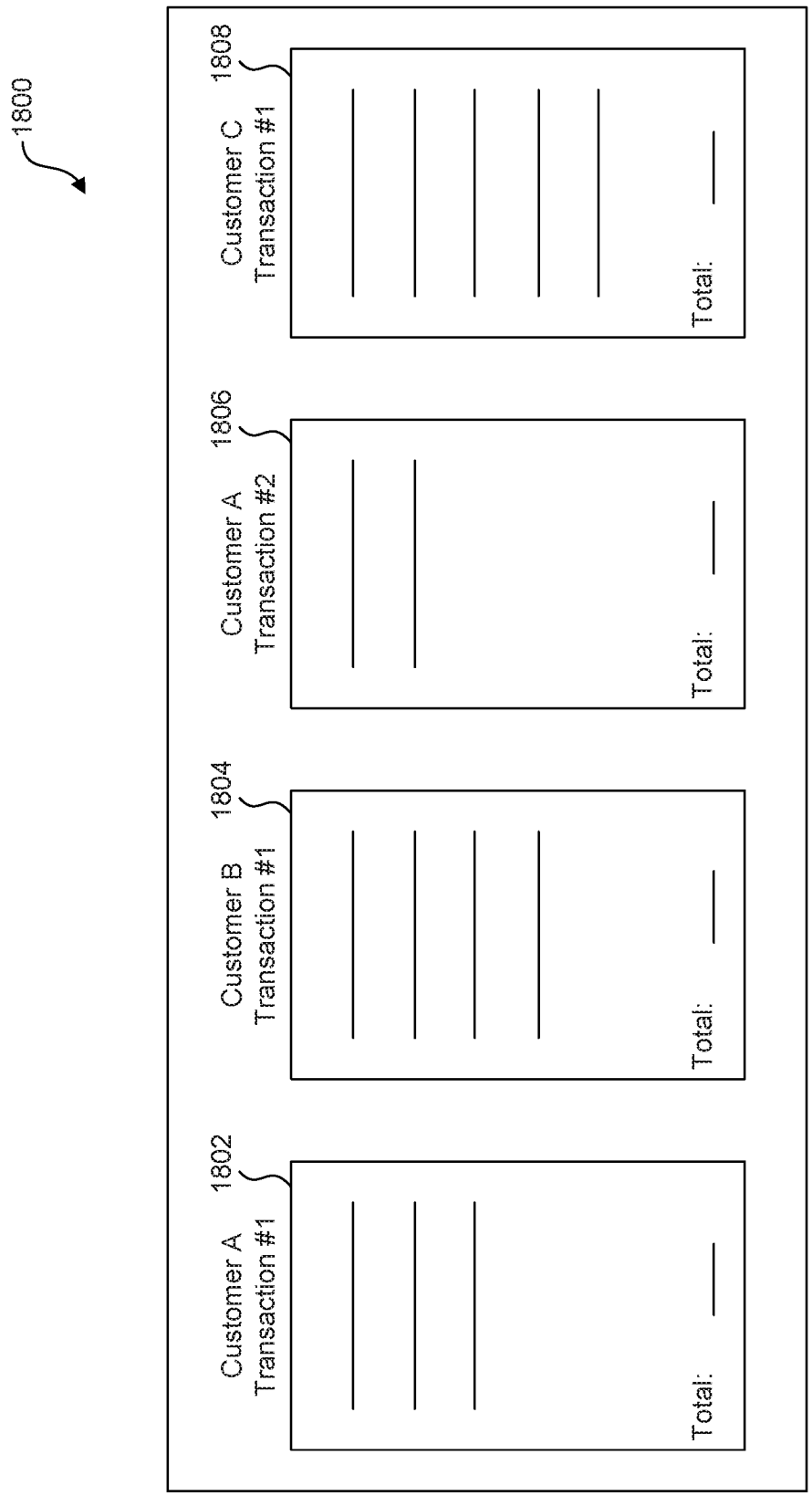
FIGS. 18-20 illustrate exemplary screenshots of a POS touch screen, according to an embodiment.

For example, FIG. 18 shows an exemplary screen shot 1800 of a touch screen of a POS device that allows for previously deferred transactions to be loaded. For example, if the secondary user states that a previously deferred transaction should be loaded, the primary user can push a button to call up deferred transactions available on the POS device. As a result, screen shot 1800 may be displayed on the touch screen of the POS device. The primary user can switch between different deferred transactions by selecting one of transactions 1802-1808. After one of transactions 1802 to 1808 is selected, the items included in that transaction can be loaded and the transaction can continue. For example, the forgotten item can be added to the previously inputted items for purchase.

In step 1710, it is determined whether additional items are needed to be input. For example, if the primary user has not yet scanned an item that the secondary user wants to purchase, the item to be purchased can be input. In a further embodiment, if one or more items have already been input, the secondary user has a pre-populated list of favorites, or the secondary user has loaded a previously deferred transaction, additional items can be input.

If additional items are to be scanned, in step 1712, the additional items are scanned. For example, using a barcode scanner of the POS device, the primary user can scan the barcode of an item that the secondary customer would like to purchase. In another embodiment, the primary user can key, or type, in a code assigned to the item to be purchased. Those skilled in the relevant arts will appreciate that scanning barcodes and keying in codes are two illustrative ways of inputting an item to be purchased. Other ways of inputting items to be purchased can be used.

In step 1714, it is determined whether a payment input has been detected. For example, the primary user can provide an input indicating that the POS device should transition from an inputting state to a purchasing state. For example, in the embodiment of FIG. 11, POS device 1104 can transition from a scanning state to a purchasing state based on input from the primary user. For example, the primary user can push a button on a touch screen of the POS device to instruct the POS device to transition to a purchasing state when all items that the secondary user would like to purchase have been input.

In another embodiment, the primary user can perform a gesture on a touch screen of the POS device that indicates the POS device should transition to the purchasing state. For example, the POS device can be configured such that whenever the primary user swipes from left to right (or right to left) across the face of the touch screen, the POS device transitions to a payment state.

Alternatively, as described above, the POS device can have a hinge that enables the touch screen to "flip" from a position facing the primary user, to a position facing the secondary user. For example, the primary user can apply pressure to the screen so that it flips to face the secondary user. In this embodiment, the flipping of the touch screen can be the input based on which the POS device transitions to the purchasing state.

In step 1716, it is determined whether a transaction should be deferred. For example, as noted above, if a secondary user determines that a transaction should be deferred (e.g., because he or she forgot items to be purchased, as described above), the transaction details including items to be bought, can be stored on the POS device and/or other devices. For example, the primary user based on instructions from the secondary user can push a button on a touch screen of the POS device to indicate that a transaction should be deferred. If in step 1716, it is determined that the transaction should be deferred, in step 1718, a transaction is deferred.

Figure 19:
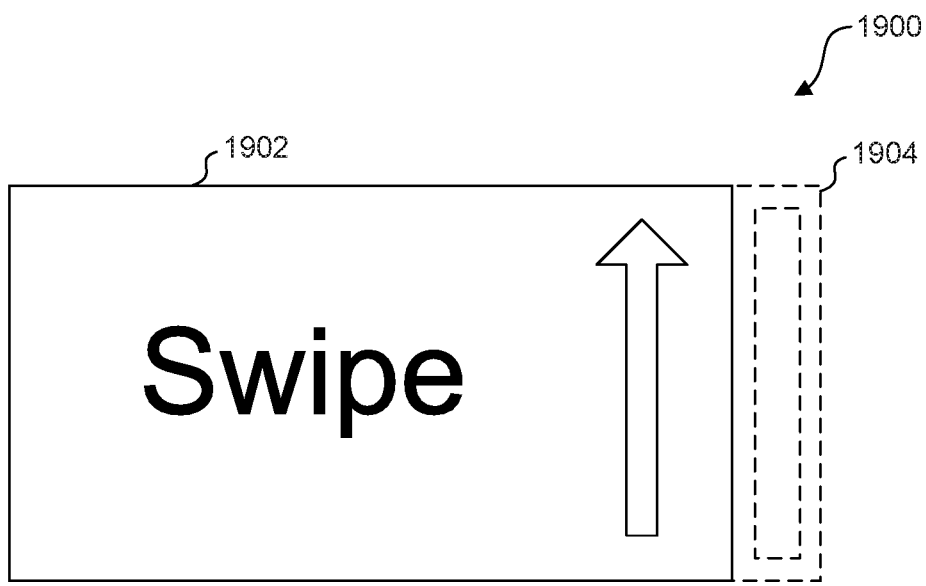

Returning to step 1714, if a payment input is detected, then in step 1720, payment is requested from the secondary user. For example, in FIG. 11, POS device 1104 can request payment in a number of different forms, e.g., cash, check, or credit card. In the embodiment in which the user elects to pay with a credit card, the screen of POS device 1104 can be used to guide the secondary user through the process. For example, FIG. 19 shows a diagram of an exemplary POS device 1900, according to an embodiment. As shown in FIG. 19, a touch screen 1902 of POS device 1900 displays an arrow to show the user the direction with which to swipe his or her credit card in MSR 1904 (or a similar module, e.g., a similar EMV module). As shown in FIG. 19, in embodiments, a substantial portion or even the entire touch screen can be dedicated to providing a user-friendly interface to the secondary user to guide the user through the payment process.

In step 1722, payment input is received from the secondary user. For example, the secondary user can swipe his/her credit card using an MSR device of the POS device. Additionally or alternatively, cash and/or a check and well as other payment option information can be received from the secondary user.

Figure 20:
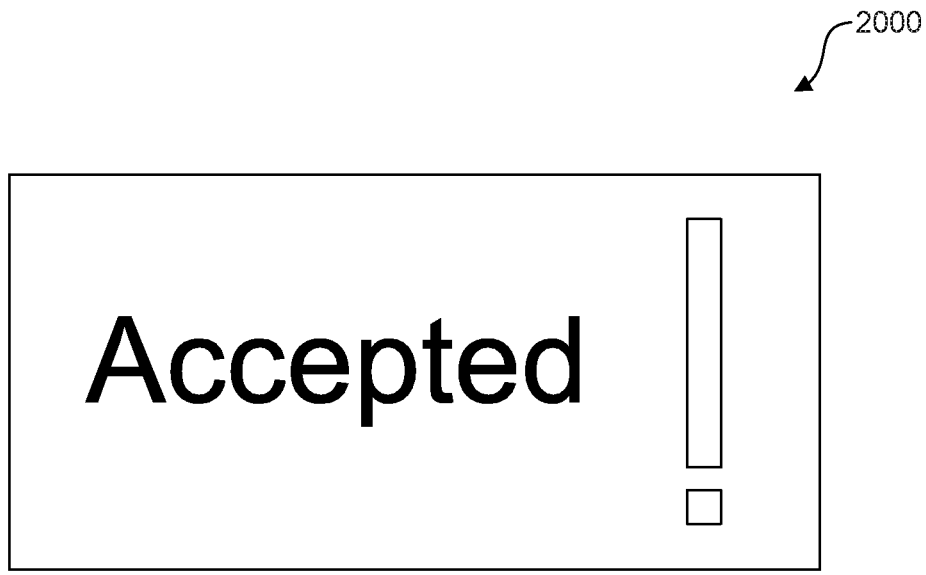

In step 1724, an indication is made of whether the payment was successful. For example, if the secondary user elects to pay with a credit card, the POS device can indicate whether credit card processing was successful. For example, FIG. 20 shows an exemplary screen shot 2000 of a touch screen of a POS device, according to an embodiment. As shown in FIG. 20, a substantial portion or the entire touch screen can be modified to indicate that the payment was successful. As would be appreciated by those skilled in the relevant arts based on the description herein, if the swipe was unsuccessful, screen 2000 can instead indicate that the swipe was not successful.

In an alternate embodiment, steps 1722 and 1724 can be completed using near field communication (NFC). NFC can refer to communication between devices that is established based on the proximity between the devices. For example, mobile devices, e.g., smartphones, can implement NFC such that communication is established when the devices are brought within a certain proximity of each other or when the devices touch. NFC devices can further be configured to interact automatically. Thus, when two NFC-enabled mobile devices are brought within close enough proximity to facilitate NFC, the devices can transmit and receive data among each other. Bluetooth is a non-limiting example of NFC.

Figure 21:
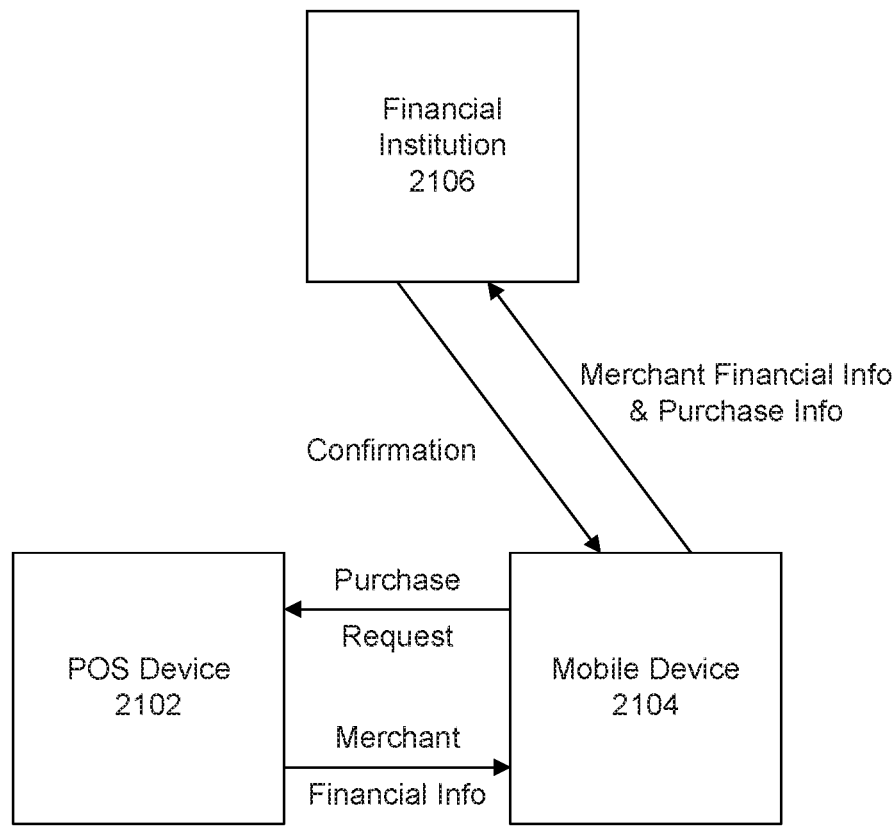
FIG. 21 illustrates an exemplary operation according to an example NFC (near field communication) embodiment.

FIG. 21 shows an NFC embodiment including a POS device 2102, a mobile device 2104, and a financial institution 2106. A secondary user can use mobile device 2104 to interact with POS device 2102 and a financial institution 2106 to provide payment for a transaction. For example, once POS device 2102 has transitioned from the input state to the purchasing state, mobile device 2104 can transmit a purchase request to POS device 2102. For example, mobile device 2104 can automatically transmit the purchase request when it comes within a proximity of POS device 2102 that allows for NFC. In response, POS device 2102 can transmit merchant financial information to mobile device 2104. Mobile device 2104 can then transmit this merchant information along with the purchase information, e.g., the total price of the transaction, to financial institution 2106. Financial institution 2106 can be used to process the transaction. After the transaction is processed, financial institution 2106 can transmit a confirmation to mobile device 2104. In a further embodiment, financial institution 2106 can transmit a confirmation to a cloud associated with POS device 2102. For example, this confirmation can be used to update an inventory associated with a store of POS device 2102. The communication flows shown in FIG. 21 can be implemented using any combination of wired and wireless mediums.

In step 1726, financial aspects of the transaction are processed. For example, a financial institution such as a bank can be used to provide payment to a merchant for the items that are purchased.

In step 1728, an inventory is updated. For example, in the embodiment of FIG. 11, web server 1152 can receive the details of the transaction from POS device 1104. Based on this information, web server 1152 can update database 1154. For example, web server 1152 can decrease the inventory associated with one or more items that have been purchased. Thereafter, web server 1152 can periodically or in real-time provide updated inventory to POS device 1104, or provide updated inventory upon demand by POS device 1104. Accordingly, in an embodiment, the most up to date inventory of items offered for sale by POS device 1104 is maintained remotely at web server 1152 and database 1154, rather than POS device 1104 itself. In the same manor, a purchase history of a secondary user, e.g., a customer, can be recorded.

Figure 22:
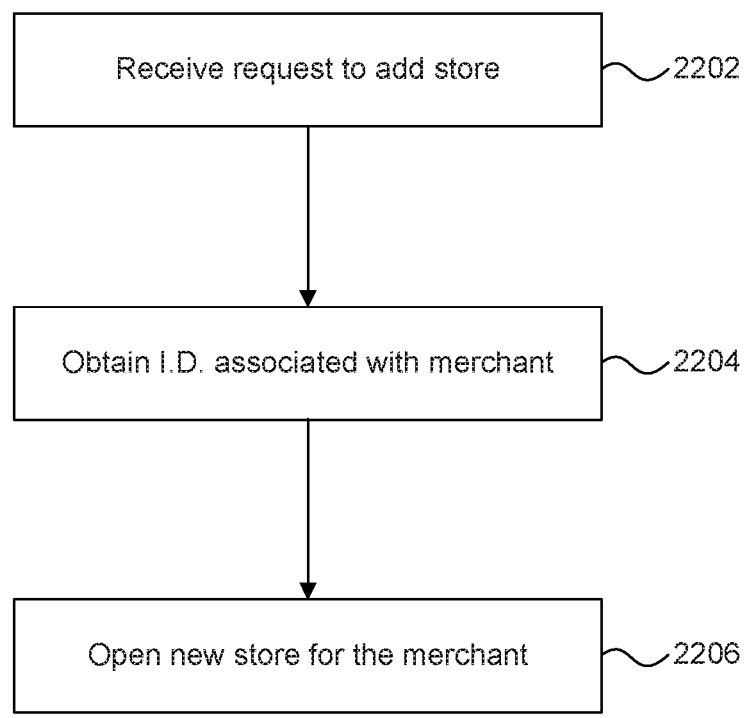
FIG. 22 illustrates a flowchart providing example steps for adding a store for a merchant, according to an embodiment.

FIG. 22 shows a flowchart of a method 2200 for adding a store for an existing merchant, according to an embodiment. Method 2200 is described with respect to the embodiments shown in FIG. 11, but is not limited to those embodiments.

In step 2202, a request to add a new store is received. For example, in FIG. 11, a primary user can log in to an account with web server 1152 through workstation 1102. For example, a primary user can use workstation 1102 to navigate to a website associated with web server 1152. The user can then log in to his or her account with web server 1152. Once logged in, the user can submit a request to add a new store.

In step 2204, an identification number or code is obtained which is associated with a merchant. For example, in FIG. 11, web server 1152 can obtain an identification number or code associated with the merchant for which a new store is to be opened from database 1154.

In step 2206, a new store is opened for the merchant. For example, in FIG. 11, web server 1152 can open a new store for the user using workstation 1102. Once the new store is open, the primary user can add inventory to the store through interaction with web server 1152 with workstation 1102. For example, the user can request to add inventory for specific items through interaction with web server 1152. Adding and updating inventory will be described in greater detail below.

Figure 23:
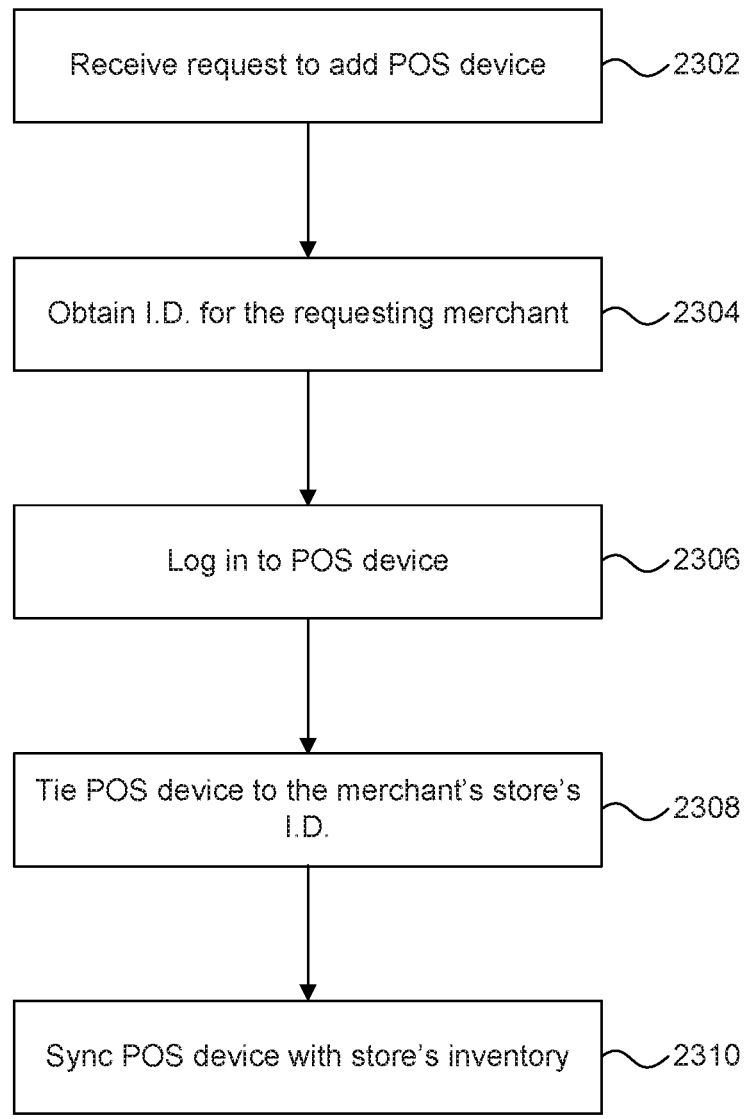
FIG. 23 illustrates a flowchart providing example steps for adding a POS device for a merchant, according to an embodiment.

FIG. 23 shows a flowchart of a method 2300 for adding a POS device to a store of a merchant, according to an embodiment. Method 2300 is described with reference to the embodiments shown in FIG. 11, but is not limited to that embodiment.

In step 2302, a request to add a POS device is received. For example, in FIG. 11, a request can be received at web server 1152 from workstation 1102 to add a POS device 1104.

In step 2304, an identification number or code for the requesting merchant is obtained. For example, in FIG. 11, web server 1152 can use the request received from workstation 1102 to obtain an identification associated with the merchant.

In step 2306, a primary user logs in to the POS device. For example, a primary user can log in to a POS device 1104 to be added to a store. After logging in to POS device 1104, POS device 1104 can send an initialization message to web server 1152.

In step 2308, the POS device is tied to the merchant's identification number or code. For example, in FIG. 11, web server 1152 can tie the added POS register device 1104 to the merchant's identification ("merchant ID"). In a further embodiment, the merchant can specify which store the POS device will be added for. For example, the merchant may have many stores, each with its own respective inventory. Based on input received from workstation 1102, web server 1152 can tie POS device 1104 to a specific store of the merchant.

In an embodiment, the POS device can query a primary user to enter the merchant ID and a code or number for the POS device ("POS device ID"). In an alternate embodiment, the merchant ID and/or the POS device ID can be preprogrammed in a memory of the POS device. In a further embodiment, the merchant ID and/or the POS device ID can be obtained from the financial institution that processes purchase transactions on behalf of the merchant. In such an embodiment, the primary user (e.g., a store clerk) may not need to be aware of the merchant ID and/or the POS device ID.

In step 2310, the POS device is synced with the store's inventory. For example, in FIG. 11, web server 1152 can access database 1154 to obtain inventory associated with the store of the merchant. Web server 1152 can transmit this information to the added POS device 1104.

In an embodiment, POS devices of a store and/or merchant can provide the same inventory. For example, each POS device of a store can offer the same items for purchase. Having each POS device of a store offer the same items for purchase from the same inventory reduces the possibility of conflict among different POS devices of a store. For example, having each POS device of store access the same inventory (e.g., via a cloud-based server and database) can ensure that updates from one POS device are reflected in an inventory provided by another POS device. If a purchase at a first POS device results in the last one of a first type of item being purchased, all other POS devices can subsequently be updated to no longer offer that item for purchase. In an alternative embodiment, POS devices of a given store and/or merchant offer different items for purchase.

Cloud-based services embodiments will now be discussed. As described above with reference to FIG. 11, POS devices can be one aspect of larger, cloud-based environment. For example, POS devices can be coupled to cloud-based services over a network such as the Internet. As a result, a primary user using a network-enabled workstation (or mobile device) can interact remotely with POS devices 1104. For example, a store owner (i.e., merchant 1180) can remotely interact with one or more POS devices 1104 located in one or more stores and/or backend servers to remotely manage the inventory available to be purchased at these POS devices. Also, management module 1170 can remotely interact with one or more POS devices 1104 to load or configure software applications on the POS devices 1104.

Figure 28:
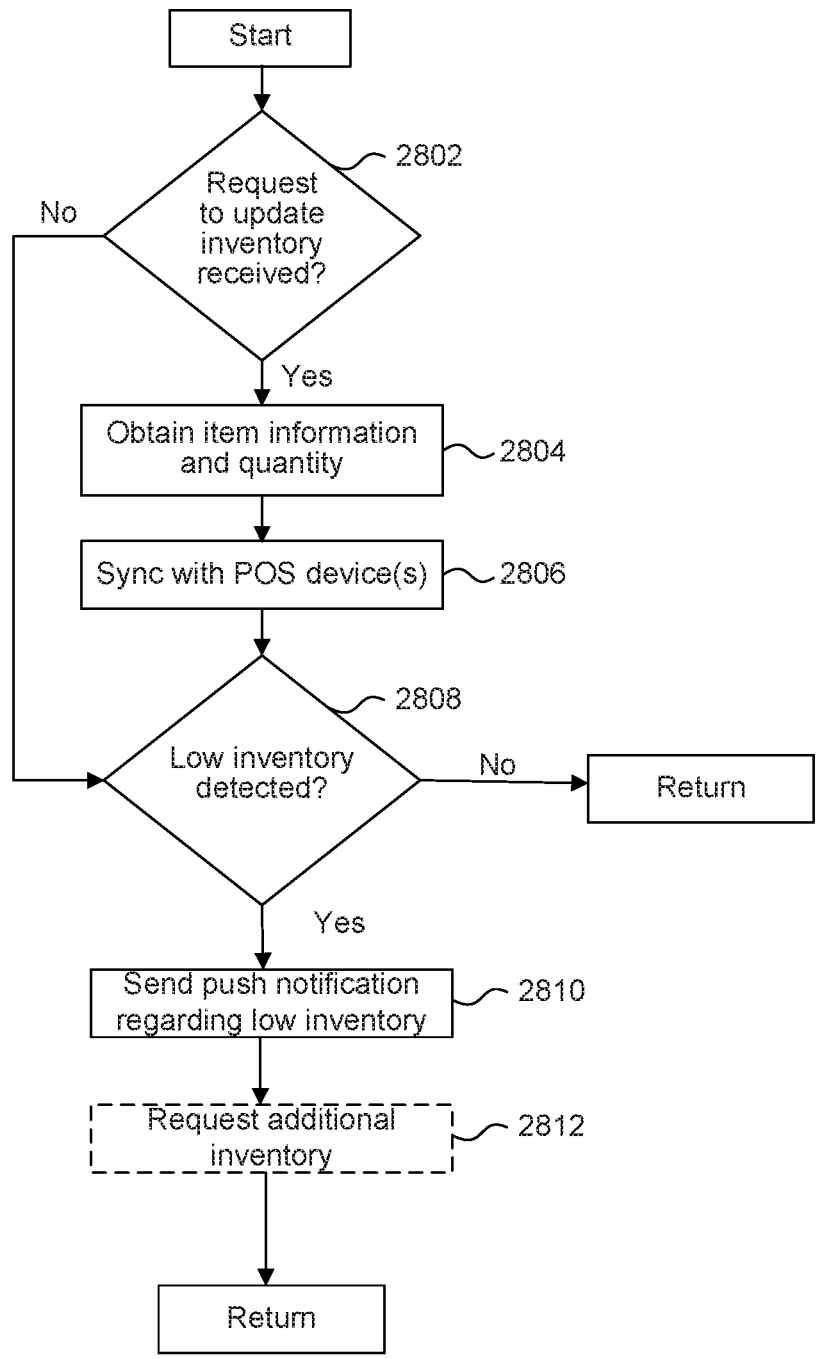
FIG. 28 illustrates a flowchart providing example steps for managing inventory provided by POS devices, according to an embodiment.

As described below in embodiments of FIGS. 24 and 28, these interactions can take on multiple forms. For example, in FIG. 24, these interactions can include one or more of controlling screens presented at the POS devices, receiving notifications regarding the status of the POS devices, and remotely controlling the POS devices based on the notifications. In the embodiment of FIG. 28, these interactions can include receiving notifications regarding inventory accessed by the POS devices, requesting additional inventory that can be purchased using the POS devices, and otherwise updating inventory offered by a store's POS devices. In a further embodiments, the steps shown in FIGS. 24 and 28 can repeat continuously, notifying and allowing the primary user to respond to events such as low inventory or POS device malfunction in substantially real time. In various embodiments, the operations of FIGS. 24 and 28 can be under the control of merchant 1180 and/or management module 1170, depending on the rights respectively assigned to each.

Figure 24:
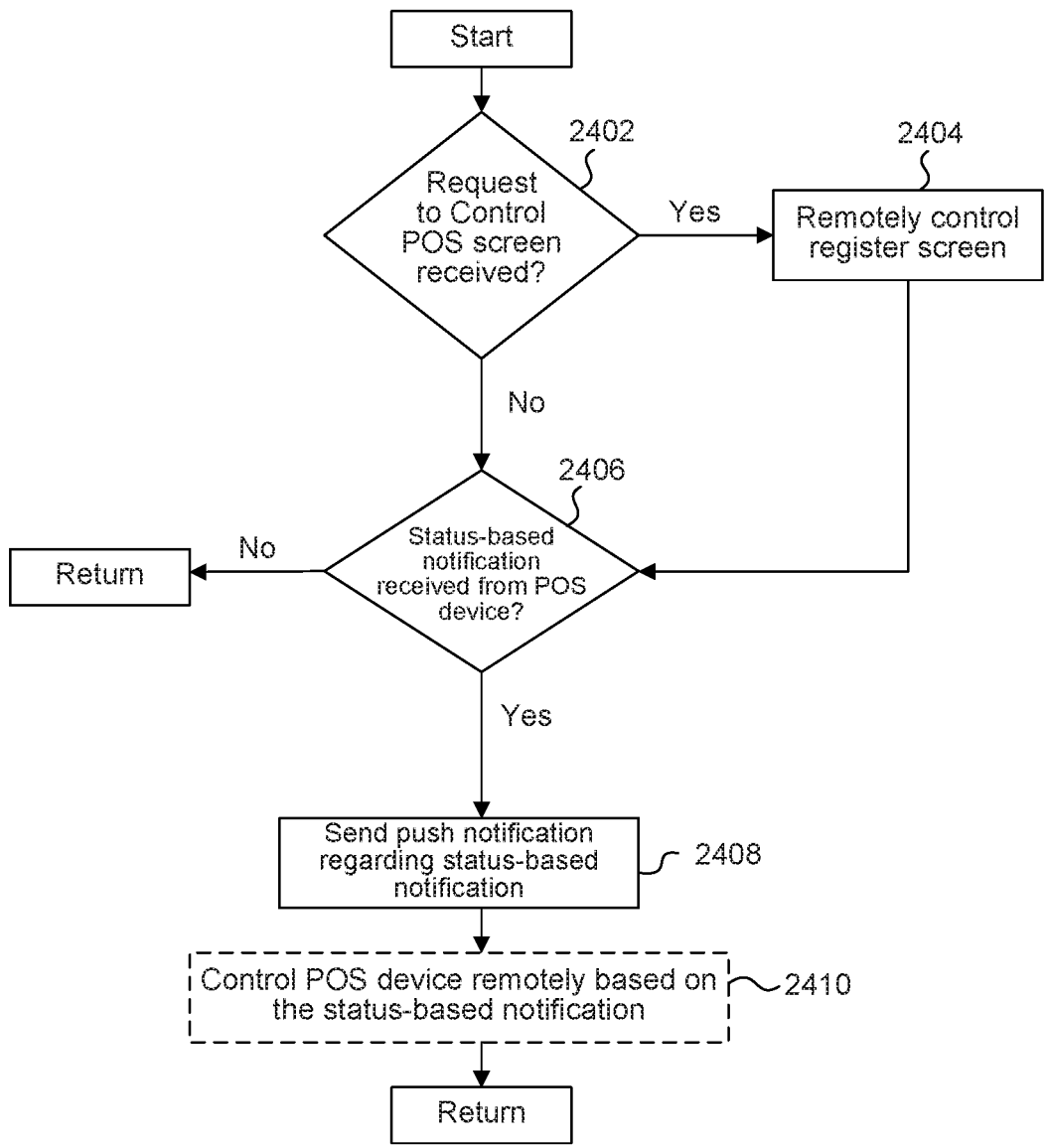
FIG. 24 illustrates a flowchart providing example steps for managing inventory and/or POS device(s), according to an embodiment.

Accordingly, FIG. 24 shows a flowchart of a method 2400 for managing POS devices, according to an embodiment. Method 2400 is described with reference to the embodiments shown in FIGS. 1 and 11, but is not limited to those embodiments. In an embodiment, steps 2402 and 2404 relate to controlling the touch screen of the POS device, and steps 2406-2408 relate to actions performed based on status-based notification(s) received from the POS device.

In step 2402, it is determined whether a request to remotely control a POS touch screen is received. For example, in FIG. 11, web server 1152 can determine whether a request to control a screen of POS device 1104 has been received from workstation 1102. In this example, a primary user, using workstation 1102, can log in to an account for the merchant of the primary user maintained by web server 1152. After logging in, the primary user can request to control the screen of POS device 1104.

If it is determined in step 2402 that a request to remotely control the POS touch screen has been received, then in step 2404, the touch screen of the POS device is remotely controlled by the requesting entity. For example, in FIG. 11, workstation 1102 can remotely control the touch screen of POS device 1104. POS device 1104 may display different items on different screens that are available for purchase. Arranging these items in a customized way allows a primary user using POS device to quickly process items that a secondary user would like to purchase.

Figure 25:
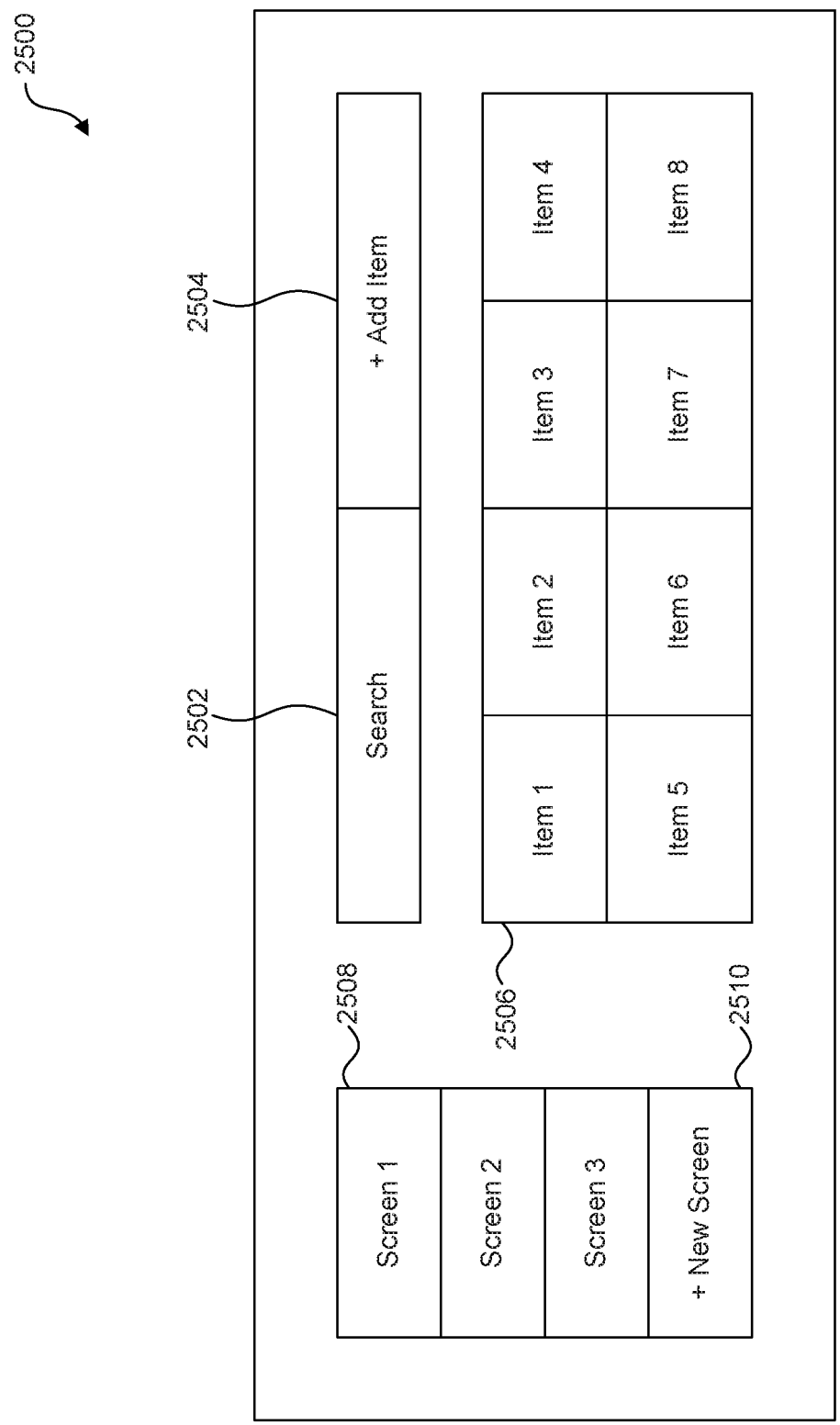
FIG. 25 illustrates an exemplary screenshot of a workstation, according to an embodiment.

FIG. 25 shows a screen shot 2500 of a screen presented to a primary user at workstation 1102. As shown in FIG. 25, the user is shown items 2506 that are displayed on the touch screen of POS device 1104. The primary user is also presented with a search box 2502, an add item box 2504, a menu including accessible screen buttons 2508, and a new screen button 2510. Using the controls presented in screen shot 2500, a merchant can control what items are displayed on POS device 1104 on which screen. In an embodiment, accessible screen buttons 2508 can each relate to a specific category of items for sale (e.g., produce, bakery, dairy, etc.). For example, a primary user can search using search box 2502 and add an item using add item box 2504. The primary user can further change screens to a different screen shown on POS device 1104 using screen buttons 2508. The primary user can add a new screen to be presented using POS device 1104 using the new screen button 2510. Once a new screen is created, the primary user can use search box 2502 and add item box 2504 to add items to the new screen.

In step 2406, it is determined whether a status-based notification has been received from a POS device. For example, in FIG. 11, web server 1152 can determine whether a status-based notification has been received from POS device 1104. The status-based notification events can relate to, for example, whether components of POS device are functional or failing, whether a primary user has logged into the POS device, whether the POS device is overheating, whether the POS device is running low on important supplies (e.g., receipt paper), etc.

For example, POS device 1104 can be configured to transmit notifications to web server 1152 upon the occurrence of predetermined events. If a touch screen of POS device 1104 malfunctions, POS device 1104 can be configured to transmit an appropriate notification to web server 1152. Other examples of events that may trigger a notification from POS device 1104 to web server 1152 can include, e.g., the temperature of POS device 1104 exceeding a threshold, a primary user logging on or logging off a POS device 1104, or a component of POS device 1104.

In an embodiment, POS device 1104 can be configured to automatically transmit notification by detecting one or more of the above events. In alternate embodiments, a primary user can provide input, e.g., through the pushing of appropriate buttons, to POS device 1104 that one or more of the above events has occurred.

If it is determined in step 2406 that a status-based notification has been received from a POS device, in step 2408, a push notification regarding the status-based notification is sent to one or more primary users, to thereby notify such primary users. In the embodiment of FIG. 11, web server 1152 can send a push notification regarding the status-based notification received from the POS device to mobile device 1106 for display for the primary user.

In step 2410, the POS device can be remotely controlled by the primary user based on the status-based notification. For example, the push notification displayed to the primary user on mobile device 1106 can include an option to deactivate the POS device, e.g., if an aspect of the POS device is malfunctioning. In response, web server 1152 can send a message instructing POS device 1104 to power down. As another example, the primary user can be provided with the option to disable specific components of the POS device based on the notification. For example, the push notification sent in step 2408 can provide the option of disabling a specific component POS device, thereby allowing the POS device to remain operational.

In an embodiment, step 2410 is optional. For example, the primary user having received the push notification in step 2408 can elect to take no action. In another embodiment, cloud-based devices can be configured to automatically take certain actions based on the occurrence of an event (e.g., without instruction from a primary user). In such an embodiment, web server 1152 can be configured to transmit a push notification to a primary user if a critical supply for POS device 1104 is running low. Important supplies for POS device 1104 can include ink and paper used to print receipts. After transmitting the notification, web server 1152 can automatically, e.g., without instruction from the primary user, send a request for additional quantities of the supply from an appropriate supplier. In particular, web server 1152 can be configured to automatically, e.g., without input from a primary user, send a request to an appropriate supplier for receipt paper or ink if either supply is running low. The notifications can also be used for manger off site approval using the mobile phone device to approve opening the cash register or approving a transaction over a certain dollar amount as example.

FIG. 28 shows a flowchart of a method 2800 for managing inventory provided by POS devices, according to an embodiment. Method 2800 is described with reference to the embodiments shown in FIGS. 1 and 11, but is not limited to those embodiments.

In step 2802, it is determined whether a request to order additional inventory has been received. Requests for additional inventory can be received from a primary user in a number of different ways. For example, it can be determined whether a request to update inventory was received at web server 1152 from a primary user using workstation 1102. In this example, a primary user can log in to the merchant's account on web server 1152 and request to update inventory. Additionally or alternatively, a merchant can send a request to update inventory from mobile device 1106.

If in step 2802 a request to update inventory was received, in step 2804, item information and quantity for the update are obtained. For example, in FIG. 11, a primary user can use workstation 1102 to provide information regarding items to be added and the quantity of those items to be added to inventory. For example, a primary user can provide a picture of an item to be added to inventory and the quantity of items to be provided in the inventory. The merchant can also provide a barcode, e.g., as a numerical representation, through workstation 1102. Additionally or alternatively, a primary user can use mobile device 1106 to take a picture of an item to be added to inventory and to scan the barcode of that item. The primary user can further use mobile device 1106 to input the number of items to be added in inventory for that item.

In step 2806, POS device(s) are synced with the updated inventory. For example, in FIG. 11, once inventory has been updated, web server 1152 can transmit the new inventory including items and the number of items included in inventory to POS device 1104. In an alternate embodiment, a primary user of POS device 1104 can pull the updated inventory from web server 1152 by requesting the updated inventory.

In step 2808, it is determined whether inventory for an item is below a threshold. For example, in FIG. 11, web server 1152 may maintain threshold values for inventory associated with certain items in database 1154. A primary user may use workstation 1102 to set threshold values for items of interest with web server 1152. Web server 1152 can then monitor inventory stored in database 1154 in real time to determine whether the inventory for an item has fallen below a user-specified threshold.

If in step 2808 it is determined that inventory has fallen below the threshold, in step 2810, a push notification regarding low inventory is sent. For example, in FIG. 11, web server 1152 can send a push notification to mobile device 1106, which is displayed to a primary user. The push notification informs the primary user that inventory for one more items has fallen below the predetermined threshold. In an embodiment, web server 1152 can send the push notification to one, multiple, or all mobile devices associated with primary users of a merchant.

In step 2812, additional inventory is requested. For example, in FIG. 11, when mobile device 1106 displays a push notification, the primary user can be given the option to request additional inventory. If the primary user exercises this option, e.g., by selecting the appropriate box, mobile device 1106 can send a request for additional inventory to web server 1152. Web server 1152 receives this request for additional inventory, and formulates a request to be sent to the relevant supplier. In an embodiment, web server 1152 can generate an email that is transmitted to the supplier requesting additional inventory. In alternate embodiments, web server 1152 can use other ways of requesting inventory from a supplier (e.g., automatically filling out Internet-accessible request forms provided by the supplier).

Advertising embodiments will now be discussed. In an embodiment, POS devices, such as POS device 101, 1104, can be used to display advertisements. For example, if a POS device is idle for at least some period of time (called a "threshold"), the touch screen can be used to display advertisements. Idleness of the POS device can be determined based on the last time a user (e.g., a primary user or a secondary user) interacted with the touch screen of the POS device. To enhance the effect of the advertising, the advertisements can be selected so as to be relevant to items that can be bought at a particular store. For example, if the POS device is included in a store that sells a particular item, the advertisements displayed on the POS device can be chosen so that they advertise that particular item, similar items, complementary items, items that have historically been sold with that particular item, etc.

Figure 26:
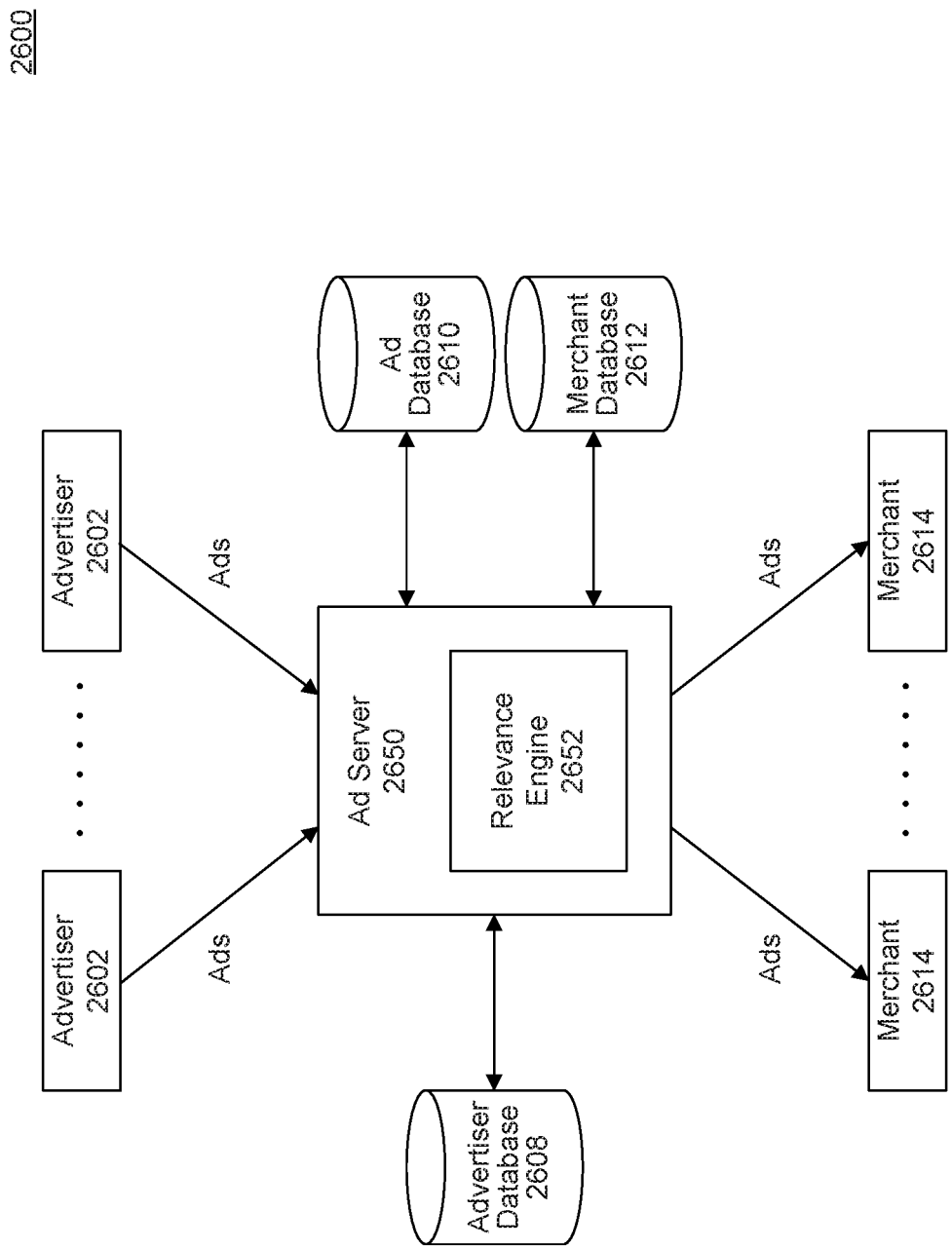
FIG. 26 illustrates a diagram of an exemplary advertising environment, according to an embodiment.

FIG. 26 shows an advertising environment 2600, according to an embodiment. Advertising environment 2600 includes advertisers 2602, ad server 2650, advertiser database 2608, ad database 2610, merchant database 2612, and merchants 2614. In an embodiment, ad server 2650 can be implemented as web server 1152 shown in FIG. 11. In another embodiment, advertiser database 2608, ad database 2610, and/or merchant database 2612 can be implemented as database 1154 as shown in FIG. 11. In an alternate embodiment, ad server 2650, advertiser database 2608, ad database 2610, and/or merchant database 2612 can be implemented as different elements within cloud 1150. The operation of advertising environment 2600 will be described in greater detail with respect to the flowchart shown in FIG. 27.

Figure 27:
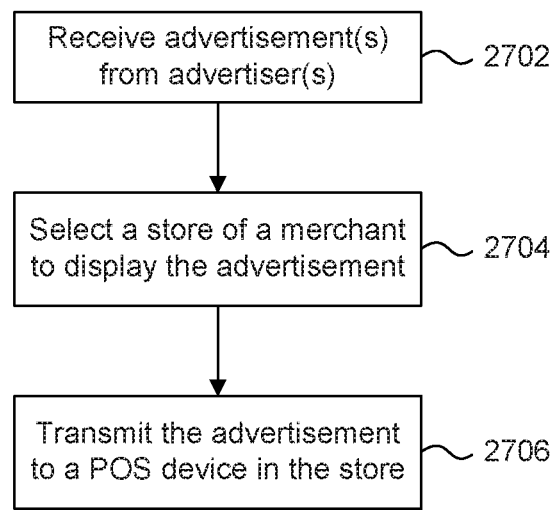
FIG. 27 illustrates a flowchart providing example steps for providing advertisements, according to an embodiment.

FIG. 27 shows a flowchart of a method 2700 for managing advertisement display, according to an embodiment. Method 2700 is described with reference to the embodiment shown in FIGS. 11 and 26, but is not limited to those embodiments.

In step 2702, advertisements are received from advertisers. For example, in FIG. 26, ad server 2650 can receive one or more advertisements from one or more advertisers 2602. Advertisers 2602 can be manufacturers and/or suppliers of different items that can be sold by merchants.

In step 2704, a store of a merchant is selected to display the received advertisements. For example, in FIG. 26, relevance engine 2652 can determine which merchants 2614 has a store that should display received advertisements. For example, relevance engine 2652 can consult advertiser database 2608 to obtain information about the types of goods and services advertised in the received advertisements, and compare these characteristics to characteristics of merchant stores stored in merchant database 2612. Based on this comparison, relevance engine 2652 of ad server 2650 can determine which merchants 2614 has a store where displaying the received advertisements would be relevant.

A number of different algorithms can be used for determining the relevance between a store and an advertisement. For example, when new stores are created, the primary user can be queried for keywords associated with items sold at the store. Similarly, when advertisements are provided by advertisers, they can also provide keywords related to the content of the advertisements. Relevance engine 2652 can compare these keywords and determine that an advertisement is relevant to a store if one or more of the keywords match. The set of keywords used can be augmented by determining complementary items to what is sold in a store. For example, relevance engine 2652 can use the keywords provided by the primary user to find keywords related to complementary items. For example, if one of the keywords provided by the primary user is a particular food or beverage, relevance engine 2652 can map this food or beverage to other foods or beverages that are often consumed along with the particular food or beverage. Other algorithms for determining relevance can also be used.

In step 2704, one or more merchants may be selected, and one or more stores of each selected merchant may be selected.

In step 2706, the received advertisements are transmitted to one or more POS devices in the selected store(s). For example, in FIG. 11, web server 1152 can transmit the advertisement to a POS device 1104.

3. SECURITY FEATURES

Figure 31:
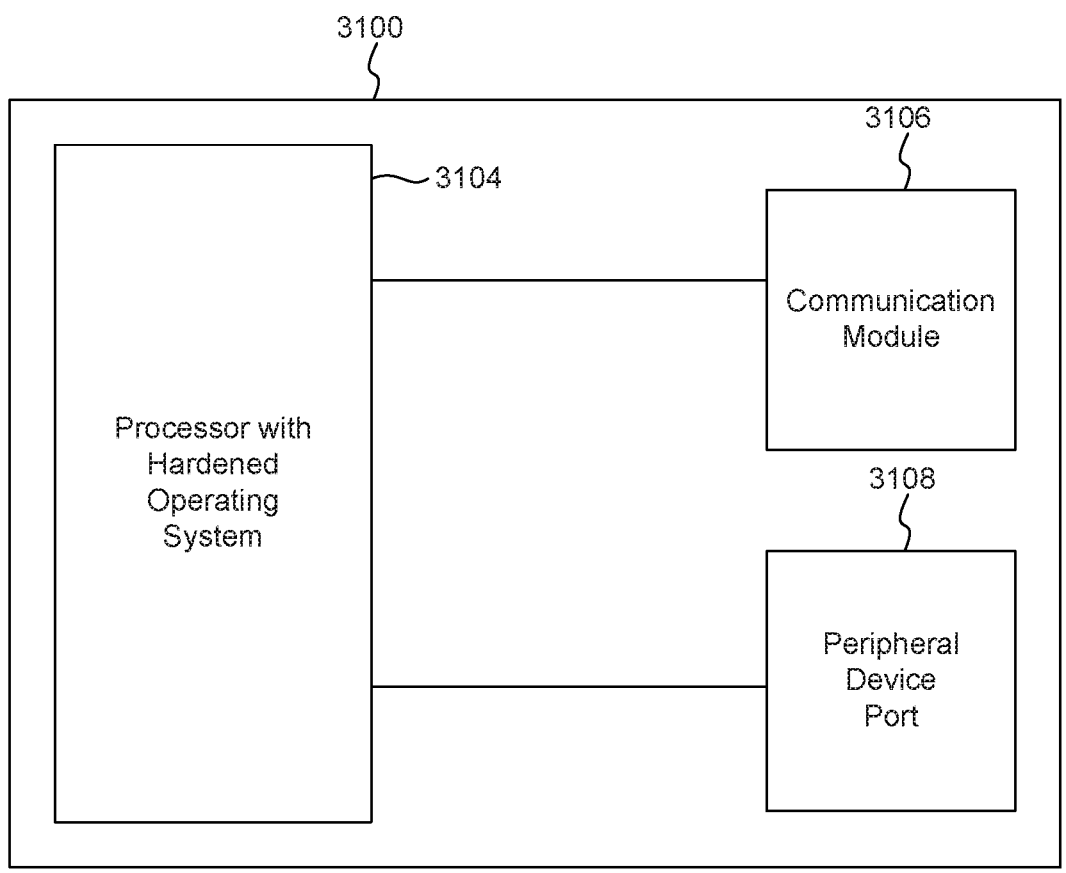
FIG. 31 illustrates a block diagram of a hardened cloud-based point-of-sale device, according to an example embodiment.

FIG. 31 illustrates a point of sale (POS) device 3100, for example the POS device 101 illustrated in FIG. 1, in which embodiments described herein can be implemented. In an embodiment, the POS device 3100 includes a processor with a "hardened" operating system (OS) 3104 that partial or full security of the operating system against alteration coupled to a communication module 3106 and a peripheral device port 3108. The peripheral device port 3108 can be the data interface 211 described above with respect to FIGS. 2B and 3. For ease of discussion, only one peripheral device port 3108 is illustrated in FIG. 31, though embodiments can implement multiple peripheral device ports 3108.

As described above, embodiments of the POS device 3100 can include novel hardware and software, for example the flip screen functionality described above with respect to, for example, FIGS. 7-9. In addition, a manufacturer of the POS device 3100 can take additional steps to render the POS device 3100 secure, as described in further detail below. As referred to herein, a "manufacturer" can be an entity that manufactures, distributes, and/or sells the POS device 3100 to an end-user. The manufacturer can include a third-party entity such as, for example, a web page interface that provides a means for ordering the POS device 3100. The end-user can be, for example and without limitation, a merchant that uses the POS device 3100 during the course of commercial transactions with one or more customers. The merchant can be, for example, the primary user described above with respect to FIGS. 2A and 2B.

In an embodiment, the POS device 3100 includes the processor with the "hardened" OS 3104. The term "hardened" or "hardening" refers to a process of securing a computing system (e.g., POS system 100 of FIG. 1) by reducing the capabilities or functions that the computing system can fulfill. Among other things, the hardening process reduces the computing system's vulnerability to security risks.

Prior to the hardening process, a manufacturer of the POS device 3100 loads an Operating System (OS) onto the POS device 3100. The manufacturer then loads other software (e.g., anti-virus and security programs) and POS applications (e.g., a register application) onto the POS device 3100. The manufacturer can also load device drivers enabling the POS device 3100 to access other elements of the POS device 3100, such as drivers for the communication module 3106 and the peripheral device port 3108. Once the manufacturer has loaded POS device 3100 with the appropriate software and device drivers, the manufacturer can harden POS device 3100, according to an embodiment.

In an embodiment, the POS device 3100 includes a hardened OS. Hardening the system can include modifying a pre-loaded OS so that additional device drivers are unable to be installed in traditional ways, such as by plugging a device into the peripheral device port 3108, according to an embodiment. The pre-loaded OS and associated software can be hardened so that additional programs cannot be downloaded onto the POS device 3100, and that communications to and from the POS device 3100 are limited. For example, the pre-loaded OS can be modified such that it only accepts information in response to a request it has made. It can also be hardened such that it only accepts information from specific addresses (e.g., the back-end server 109 illustrated in FIG. 1) or from sources with specific identifying information (e.g., a product identification (ID) or a vendor ID).

In an embodiment, a security circuit (not illustrated) can be provided. The additional security circuit can be configured to store a certificate, serial number, hardware version identifiers, encryption key, or combination thereof. In an embodiment the security chip can be included within the processor with the "hardened" OS 3104. In another embodiment, the security chip can be separate from the processor 3104. In an embodiment, the security circuit can be a Trusted Platform Module (TMP) chip. In an embodiment, the security circuit can be configured to use EEPROM to store the certificate, serial number, hardware version identifiers, encryption key, or combination thereof. In an embodiment, the security circuit can be configured by a manufacturer of the POS device 3100 to store device specific information, for example the serial number and hardware version number specific to the POS device 3100. In an embodiment, the security circuit can be configured to verify that information or software was received from a trusted source, for example the manufacturer of the POS device 3100.

In an embodiment, the OS may be hardened such that it only allows approved applications, such as register applications, to run on the POS device 3100. Register applications can include, for example, applications related to commercial transactions conducted by merchants with customers for the sale of goods. In an embodiment, all means for exiting the register applications are disabled.

For example, if Google's Android OS is loaded onto the POS device 3100, the OS can be hardened by modifying the OS to operate in a "kiosk" mode operation with the register applications as "launcher applications." Here, the POS device 3100 is locked into the kiosk mode of operation and is only able to run or launch the register applications (e.g., launcher applications). The register applications, which are executed when the POS device 3100 is powered on, have been configured such that all means of exiting the applications have been disabled, according to an embodiment. In an embodiment, hardening may include removing background processes, daemons, and drivers from the kernel. In an embodiment, access requests to local data, for example local databases, can also be disabled. In an embodiment, hardening can include removing some or all of an application's ability to access or modify information or state within the system. In an embodiment, input from peripheral devices can only affect the register application, and does not affect other applications on the POS device 3100. A person skilled in the art would understand that the above examples and embodiments are only some of the ways of hardening a system, and that other methods are possible.

In an embodiment, the security circuit can be used to encrypt an image of the hardened OS and certified applications. In an embodiment, the security circuit can be configured to use a stored certificate to validate an OS image and then encrypt the image using a stored encryption key. In an embodiment, the POS device 3100 can use the security circuit to verify that an application or update (described in more detail below) is from a trust source. In an embodiment, the security circuit can be configured to verify the authenticity of the OS, an application, or an update. In an embodiment, a cloud computing resource can be configured to use the security circuit to verify applications or information prior to allowing access to the cloud computing resources. In an embodiment, the security circuit can be used to verify that applications, for example the register application on the POS device 3100, have not been tampered with.

In addition, other software loaded onto the POS device 3100 can be hardened, according to an embodiment. In an embodiment, applications, for example the register application, can be hardened to restrict the ability to share or copy the data for the application. In an embodiment, the register application can be modified to disable a merchant's ability to exit the application. For example, POS device 3100 can be loaded with a hardened register application. This application may automatically start up when the POS device 3100 is turned on (e.g., launcher application), and may be modified so that the merchant is not able to exit from the application. In an embodiment, the register application can also be modified to prevent acceptance and loading of software or software updates. For example, the POS device 3100 can be designed to accept updates from specific verified sources. In another example, the POS device 3100 can be configured to require a certificate prior to installing software updates. Software updates may instead be verified by a trusted source (e.g., the back-end server 109 of FIG. 1) and sent with the next verified pushed update from the trusted source to the POS device 3100. In an embodiment, specific software modes of operation, for example Android Debug Mode (ADB), fastboot, and Uboot, can also be disabled.

In referring to FIG. 31, the communication module 3106 can be configured to communicate via a wired connection, a wireless connection, or both. In an embodiment, the communication module 3106 can incorporate portions or all of the functionalities associated with wireless transceiver 433 of FIG. 4. Independent of the type of communication, the communication module 3106 can be configured to verify that communications are secure. For example, if the communication module 3106 handles wireless communications, it may only allow secured communications. In an embodiment, the communication module 3106 permits Wi-Fi access, but may require the connection to use secure protocols such as the Wi-Fi Protected Access II (WPA2) security protocol. In another embodiment, the communication module 3106 may only use communication paths that have been Payment Card Industry (PCI) authorized. In an embodiment, the communication module 3106 can be configured to only accept incoming information in response to an outgoing request. For example, the communication module 3106 can be configured to only allow outgoing connections to be established and only accept information initiated by the outgoing connections. Otherwise, all incoming information is blocked by the communication module 3106, thus preventing the POS device 3100 from processing the incoming information. This communication scheme of accepting incoming information into the POS device 3100 in response to an established outgoing connection is described in further detail below.

In an embodiment, for commercial transactions, the POS device 3100 does not store payment information (e.g., provided by a customer to a merchant via the POS device 3100) associated with the transactions. In an embodiment, the communication module 3106 is configured to communicate directly with one or more financial institutions (e.g., the transaction server 111 in FIG. 1). For example, in referring to FIG. 1, the POS device 3100 can communicate with a financial institution at the transaction server 111 via the connection 160. Here, the POS device 3100 can transmit the payment information to the transaction server 111 and, upon processing of the payment information by the transaction server 111, receive an indication of approval or denial of the payment. The POS device 3100 is thus not required to store the payment information beyond transmission of the information to the financial institution at the transaction server 111. The POS device 3100 can thus be configured to verify that a customer's payment is valid and that the customer has authorization to make a purchase without requiring the POS device 3100 or the back-end server 109 in FIG. 1 to store payment information. This provides additional security against unauthorized access to information on the POS device 3100 or the back-end server 109.

In referring to FIG. 31, the POS device 3100 includes the peripheral device port 3108. During the hardening process described above, the peripheral device port 3108 can be modified such that one or more functionalities of the port are disabled. For example, the peripheral device port 3108 can include predefined functionalities such as, for example, providing control signals, providing bi-directional data flow, and providing power. In an embodiment, the hardening process can include removing the ability for control signals and data flow to be provided by peripheral device port 3108 such that, for example, additional device drivers cannot be installed in the POS device 3100. In an embodiment, the POS device's operating system may be configured to disable data input from a peripheral device that would allow a merchant to exit the register application. For example, if the POS device 3100 is configured to accept a keyboard peripheral device via the peripheral device port 3108, the operating system may disable an exit function, for example the "ctrl-alt-del" exit function, for keyboard peripheral devices.

In an embodiment, the peripheral device port 3108 is a Universal Serial Bus (USB) port, where data functions, such as booting from a USB or downloading files, can be disabled but the power functions remain enabled. This would allow a user of POS device 3100 (e.g., merchant) to charge a device (e.g., a mobile phone) using the peripheral device port, but would not allow the user to install malicious software or drivers merely by plugging in a device into the peripheral device port 3108. In other embodiments, the hardening process can include only allowing additional device drivers to be installed using specific mechanisms, such as receiving information from trusted sources such as, for example, the back-end server 109 of FIG. 1 or from validated peripheral devices (e.g., using vendor IDs, product IDs, serial numbers, operating system IDs, hash routines, authentication/handshake routines, etc.). For example, the manufacturer of the POS device 3100 can provide a keyboard that communicates with the POS device 3100 via the peripheral device port 3108. The keyboard can include a vendor ID indicating it is provided by the manufacturer or a product ID indicating it is a trusted input device, thus allowing the system to verify that the data received from the keyboard is secure. In an embodiment, peripheral storage devices, for example USB thumb drives, can be disabled by default for improved security.

Figure 32:
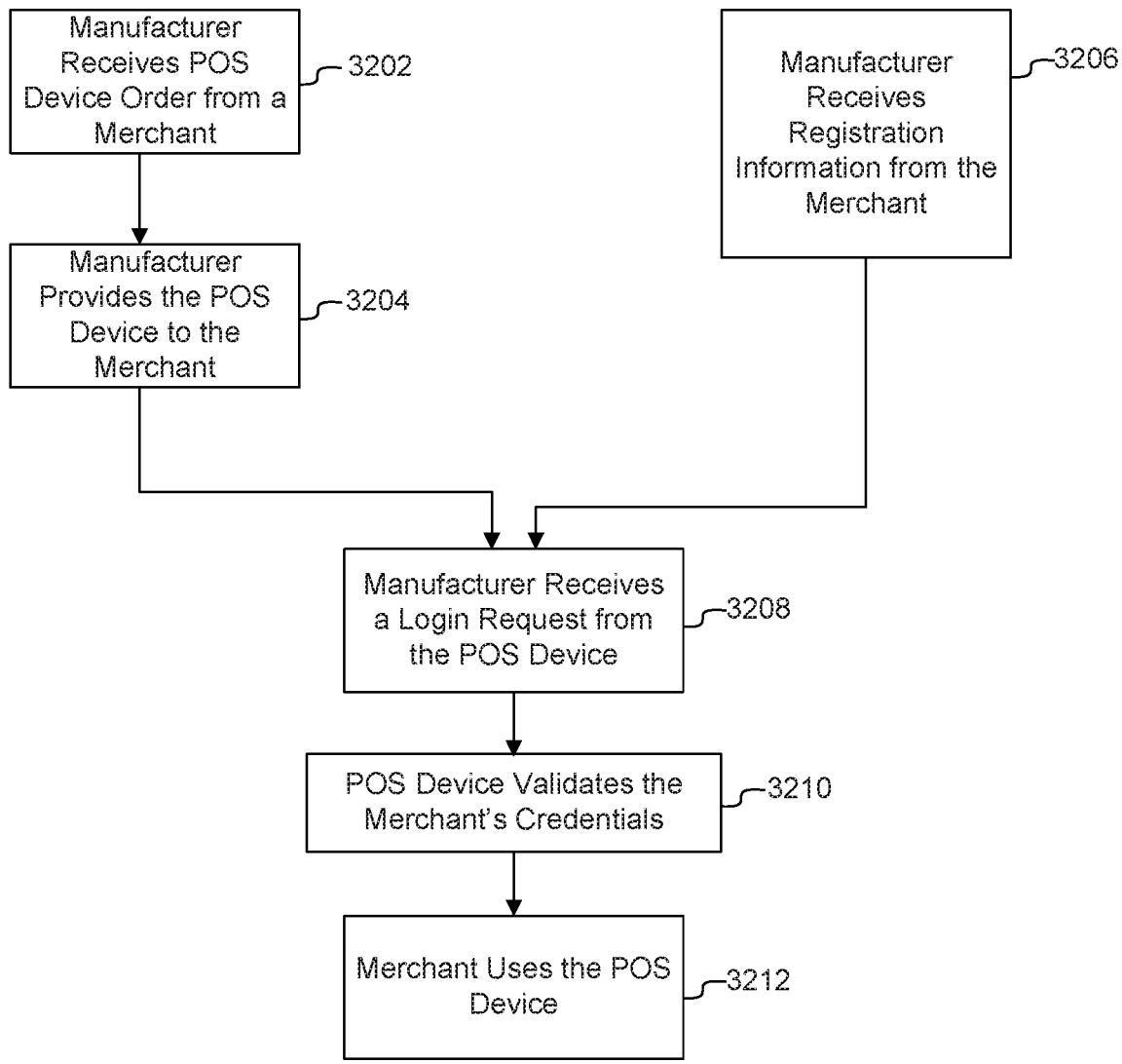
FIG. 32 illustrates a flowchart of a process for ordering and using a cloud-based point-of-sale device, according to an example embodiment

FIG. 32 is a flowchart illustrating a process 3200 for a POS device being ordered and used, according to an example embodiment. FIG. 32 shows an example method for a POS device (e.g., the POS device 3100 in FIG. 31) being ordered, shipped, and used to conduct financial transactions and store transactions.

At step 3202, a manufacturer of the POS device (e.g., an entity that manufactures, distributes, and/or sells the POS device) can receive a request from a merchant ordering the POS device (e.g., the POS device 3100). Here, the merchant can be a person, organization, or entity that uses the POS device to conduct financial transactions such as, for example, the sale of goods and products. A person skilled in the art would recognize that the merchant can order the POS device through many means such as, for example, from a website associated with the manufacturer, through a sales representative associated with the manufacturer or distributor, from a catalog (e.g., provided by a third party), by an in-person visit to the manufacturer, and from a retail store.

At step 3204, the manufacturer provides the POS device to the merchant. This can occur at the time of sale such as, for example, if the merchant purchases the POS device from a retail store. This can also occur after the sale has completed such as, for example if the merchant ordered the POS device through a website.

At step 3206, the manufacturer receives registration information from the merchant. The registration information can include merchant information and merchant login credentials. In an embodiment, step 3206 can occur after step 3202 but before, during, or after step 3204. In an embodiment, the manufacturer can provide the merchant a web address or provide some other means for the merchant to register the POS device with the manufacturer. In an embodiment, the POS device can be registered via the website when the POS device connects to a cloud computing resource or website. The website stores merchant account information such as, for example, a username, password, inventory information, employee information, and bank information. In an embodiment, the merchant's account information can be stored in a cloud computing resource such as, for example, the back-end server 109 illustrated in FIG. 1.

At step 3208, the manufacturer receives a login request from the POS device from the merchant. At this point, the merchant has purchased and the manufacturer has sent the POS device (e.g., the POS device 3100 illustrated in FIG. 31) and set up a merchant account. In an embodiment, the POS device can also be used without the cloud computing resource for non-credit card transactions. In an embodiment, offline transactions do not risk a breach of security because no credit card information is stored on the POS device.

Once powered on, the POS device can wirelessly connect to an available secure connection and establish a secure communication with the cloud computing resource (e.g., the back-end server 109 of FIG. 1) using, for example, a PCI (Payment Card Industry) authorized connection. In another embodiment, the POS device can require a secure wired connection with the cloud computing resource before establishing a secure communication. Once the secure communication has been established with the cloud computing resource, the merchant can log into the POS device.

At step 3210, the POS device validates the merchant's credentials. In an embodiment, the POS device can request the cloud computing resource to validate the merchant by transmitting information identifying the POS device along with the login information provided by the merchant to the cloud computing resource. The cloud computing resource can then compare/validate this information against the corresponding information provided by the merchant in step 3206.

At step 3212, if the cloud computing resource validates the merchant's credentials, the merchant can use the POS device to conduct transactions (e.g., commercial transactions). At this point, the merchant can access, for example, user preferences, inventory information, employee information, bank information associated with the merchant's account. This information can be information that the merchant entered when it initially created the account. This information can also include information added or updated at a later time. For example, a merchant may have only provided the requisite information required to initially create the account, and may have logged on the POS device at a later time to add additional information, such as inventory and employee information. In an embodiment, this information can be communicated in a secure manner. All of this information may be accessible via the POS device at step 3212. The merchant can also execute financial or commercial transactions using the POS device such as, for example, using a credit card to complete a sale for a retail customer.

As discussed above, the manufacturer can harden the POS device (e.g., the POS device 3100 of FIG. 31) prior to be it being shipped to a merchant. In an embodiment, this hardening can include removing the ability for the POS device to receive data from one or more peripheral devices such as, for example a USB flash device, a CD-ROM, and a keyboard. In an embodiment, the POS device may also be configured so that is can only receive data in response to a request it has made, i.e., it will reject all incoming data until it makes a request (e.g., to verify a sale) and receives data from the appropriate source.

But, as will be discussed in more detail below, it may become necessary to make modifications to the POS device over time such as, for example, when installing updated security software. Therefore, in an embodiment, the POS device can be configured to periodically request one or more updates that are available from a trusted source such as, for example, the back-end server 109 in FIG. 1. In an embodiment, the POS device can issue the request when it is powered on, at periodic intervals, at a specific time of each day, or a combination thereof.

If an update is received, the POS device can ask the merchant for permission to install the update on the POS device, according to an embodiment. For example, it may be a busy time during the business day, and the merchant may not want the POS device to install the update at that time. In an embodiment, the POS device can periodically renew the request such as, for example, every hour. In an embodiment, the POS device can renew the requests based on the load on the POS device such as, for example, when the processor load (of the POS device) is relatively light or the processor is entering a sleep state.

Updates can also be classified based on a type of update, according to an embodiment. Update types can include security updates, software feature updates, and bug fix updates. For example, updates addressing known security issues can be tagged as urgent, whereas updates for a graphical user interface (GUI) of the POS device, feature updates, and non-security bug fixes can be tagged as less urgent. Certain tags can also impose requirements regarding installation of the update. In an embodiment, if an urgent update is not installed within a set time period, for example 30 days, the POS device can automatically start the installation process. In another embodiment, if an urgent update is not installed, the POS device can disable its connection to the cloud computing resource (e.g., the back-end server 109 of FIG. 1). In another embodiment, the POS device will automatically start the installation process. A person skilled in the art would understand that other functionalities can also be implemented.

Figure 33:
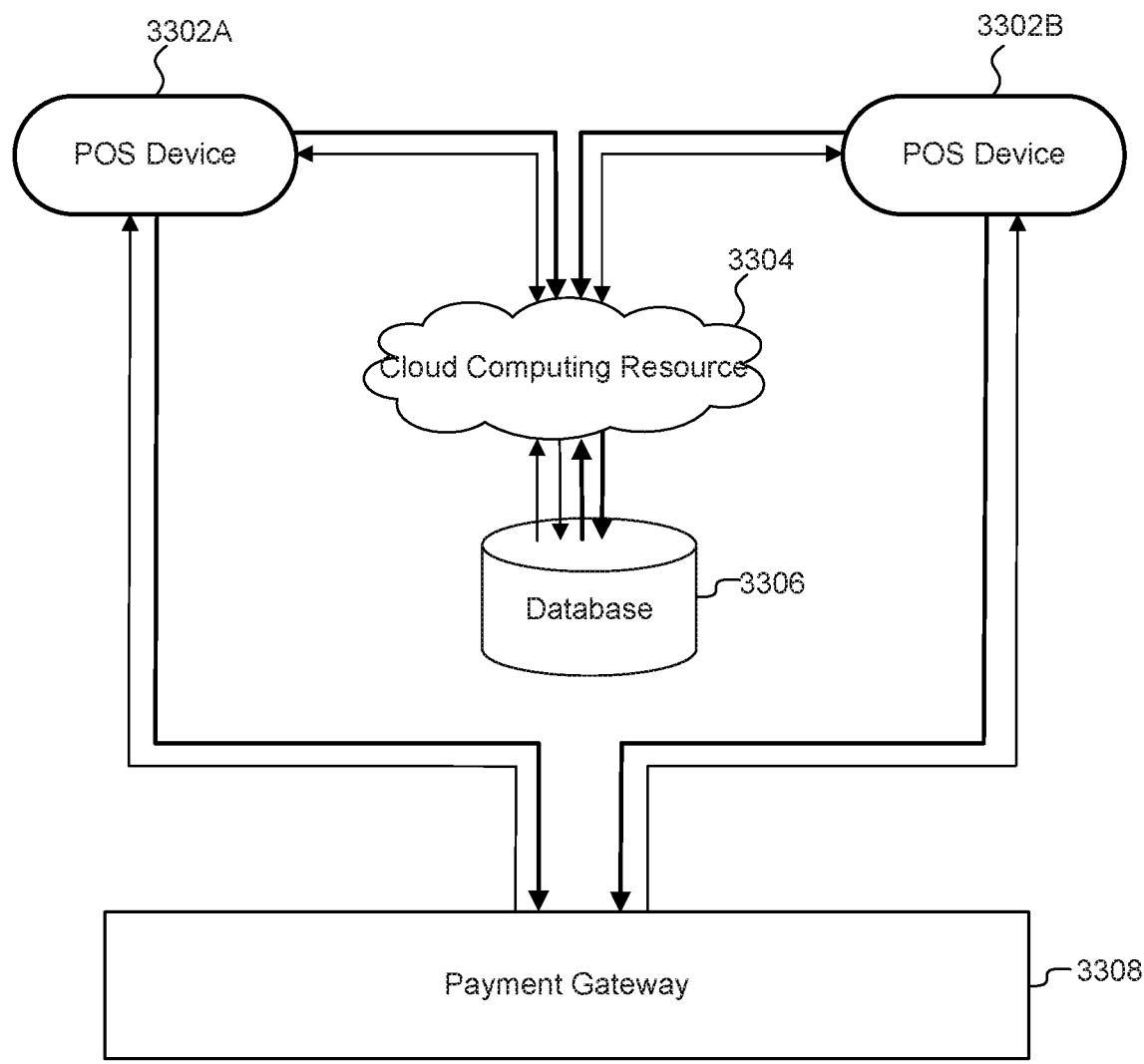
FIG. 33 illustrates a block diagram of a cloud-based point-of-sale system with two cloud-based point-of-sale devices, according to an example embodiment.

FIG. 33 illustrates a POS system 3300 in which embodiments described herein can be implemented. Specifically, FIG. 33 illustrates communications that occur when one or more POS devices, for example POS devices 3302A and 3302B, process a financial transaction, for example a credit card payment. In an embodiment, POS devices 3302A and 3302B are in communication with a cloud computing resource 3304 and a payment gateway 3308. Cloud computing resource 3304 is also in communication with a storage device 3306. POS devices 3302A and 3302B operate in a similar manner as the POS device 101 of FIG. 1 and the POS device 3100 of FIG. 31, according to an embodiment. Also, in an embodiment, the combination of the cloud computing resource 3304 and storage device 3306 operate in a similar manner as the back-end server 109 of FIG. 1.

Initially, a POS device receives a request to process a merchant event, such as a financial transaction, via, for example, a request module. The merchant event can be, for example, a payment for an item, a balance check, or a verification of the authenticity of a credit card. The POS device, for example the POS device 3302A or 3302B, can receive information regarding the merchant event when entered by the merchant. For example, the merchant can swipe a credit card using a magnetic stripe reader (MSR) or a smart card reader also known as a EMV reader, described above, and enter the cost of an item for sale.

At this point, the POS device 3302A or 3302B communicates with the payment gateway 3308, for example transaction server 111 illustrated in FIG. 1, to process the merchant transaction. As discussed above, the POS device 3302A or 3302B can establish a secure connection such as, for example, a PCI secure connection, with the payment gateway 3308. In an embodiment, to improve security, POS device 3302A or 3302B can be configured to establish only a PCI secure connection. The POS device 3302A or 3302B can establish a wired connection, a wireless connection, or both with the cloud computing resource 3304, as described above.

The payment gateway 3308 processes the merchant transaction and responds to the POS device 3302A or 3302B with an indication of whether the transaction was approved or denied. In an embodiment, the response from payment gateway 3308 includes an authorization code. In another embodiment, the response excludes any Primary Account Number (PAN) data or customer privacy information (e.g., expiration date and security code of credit account). In an embodiment, the response includes only an indication of whether the transaction was approved or denied, with no additional information, such as an authorization code.

In an embodiment, the POS devices 3302A and 3302B retain some or all of a customer's financial information such as, for example, the customer's credit card number. In an embodiment, the POS devices 3302A and 3302B and cloud computing resource 3304 do not store customer private financial information, for example credit card numbers, debit card numbers, bank account information, etc. as an additional security measure.

Once the payment gateway 3308 responds to the merchant transaction, indicating the transaction has been approved or denied, the POS devices 3302A and 3302B create a data record of the merchant event, according to an embodiment. In an embodiment, if a data record already exists, the POS devices 3302A and 3302B append the merchant event onto the data record. In an embodiment, a merchant event is recorded whether or not the transaction is approved by the payment gateway 3308. The data record can contain information regarding the merchant event such as, for example, transaction type, amount, date and time, customer identification, inventory affected, and employee associated with the transaction. The POS devices 3302A and 3302B can also be configured to maintain "service data" regarding additional information such as, for example, when employees log into or out of the POS device, updated inventory information, and updated employee information.

As described above, the POS device can receive software updates (e.g., security updates, software feature updates, and bug fix updates). The POS devices 3302A and 3302B can be configured to record events associated with the software updates such as, for example, a date and time of the software update, the type of software update, whether the software update was successfully installed, and other related information. The record of the software update events is also referred to herein as "system software event data."

In an embodiment, the POS devices 3302A and 3302B communicate their data to the cloud computing resources 3304. In an embodiment, the communicated data from the POS devices 3302A and 3302B to the cloud computing resource 3304 can include one or more of the merchant events, the service data, the system software event data, and other data described above. This communicated data is also referred to herein as the "POS device activity data."

In an embodiment, the cloud computing resource 3304 is provided by a manufacturer of the POS devices 3302A and 3302B. In an embodiment, when the POS devices 3302A and 3302B are hardened (as described above), the network address of the cloud computing resource 3304 is hard coded into the software that is loaded onto the POS devices 3302A and 3302B. In an embodiment, the POS devices 3302A and 3302B can communicate the POS device activity data at regular or periodic intervals such as, for example, every hour or every day. In another embodiment, POS devices 3302A and 3302B can communicate the POS device activity data to the cloud computing resource 3304 when they receive a software update (as described above). In an embodiment, the POS devices 3302A and 3302B can communicate the POS device activity data each time a merchant event happens.

At the cloud computing resource 3304, security services store the POS device activity data it receives from the POS devices 3302A and 3302B in a cloud storage area (e.g., database 3306). This can be an enterprise-level storage device that provides both sufficient storage capacity and data access for use by multiple POS devices and multiple merchants.

Figure 34:
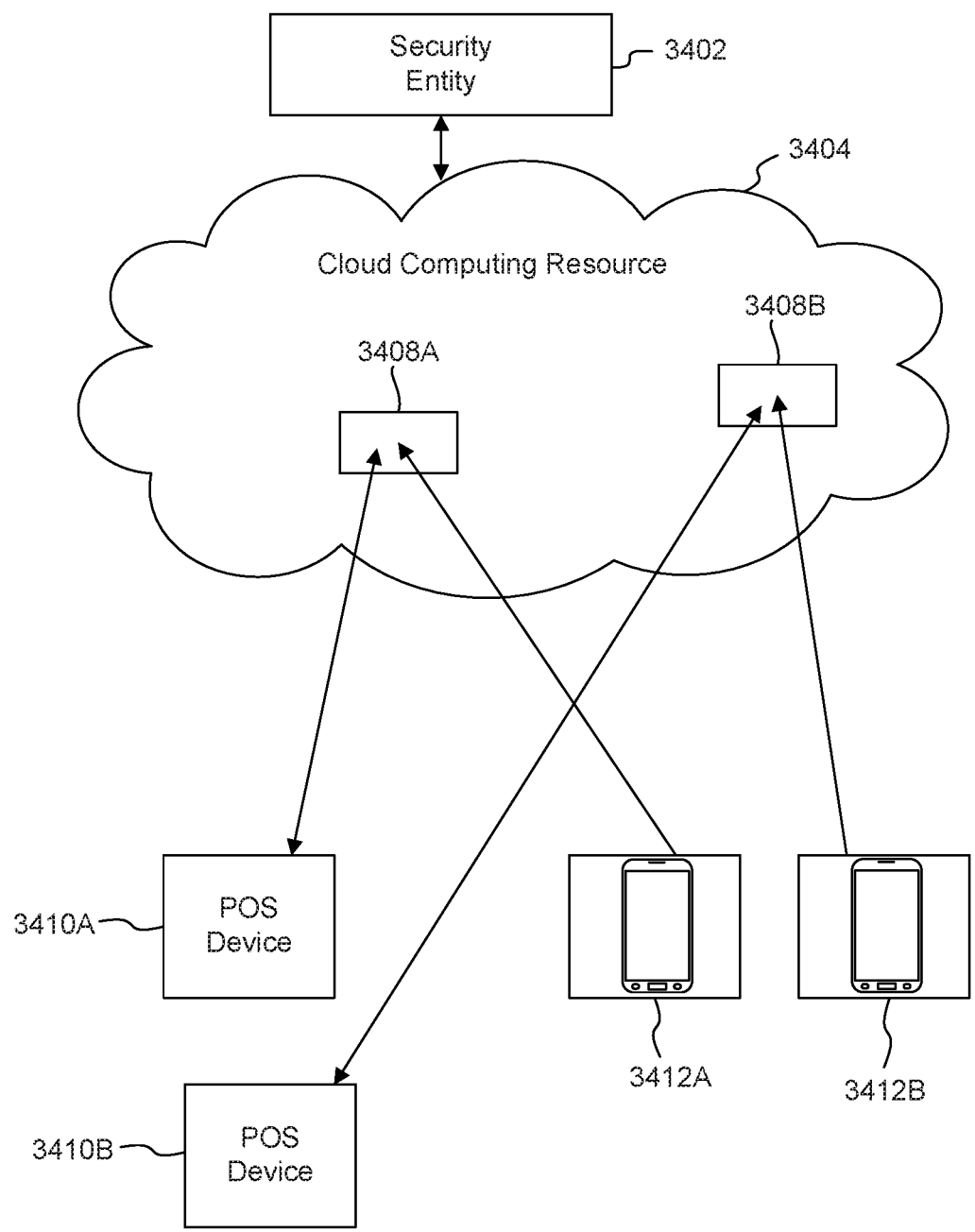
FIG. 34 illustrates a block diagram of a cloud-based point-of-sale system, according to an example embodiment.

FIG. 34 illustrates a POS system 3400 in which embodiments described herein can be implemented. Specifically, FIG. 34 illustrates a cloud computing resource 3404 configured to store POS device activity data received from multiple POS devices 3410A and 3410B and accessible by a security entity 3402. In addition, FIG. 34 illustrates mobile devices 3412A and 3412B, such as the mobile device 105 illustrated in FIG. 1, configured to access the POS device activity data stored on the cloud computing resource 3404. In an embodiment, the cloud computing resource 3404, for example the back-end server 109 illustrated in FIG. 1 or the cloud computing resource 3304 illustrated in FIG. 33, is in communication with the security entity 3402, POS devices 3410A and 3410B, and mobile devices 3412A and 3412B. The security entity 3402 is configured to access POS device activity data stored on the cloud computing resource 3404, analyze the data, and make modifications based on its analysis, as described in more detail below.

In an embodiment, the cloud computing resource 3404 can include one or more databases to store information. These databases can be a networked enterprise storage device such as, for example, the back-end server 109 in FIG. 1. The cloud computing resource 3404 can be configured to store POS device activity data received from one or more of the POS devices 3410A and 3410B, for example POS device activity data 3408A and 3408B.

The security entity 3402 is in communication with the cloud computing resource 3404. The security entity 3402 can be associated with the manufacturer of the POS devices, associated with an entity that maintains the cloud computing resource, or associated with both. The security entity 3402 has access to information stored at the cloud computing resource such as, for example, information from POS devices that send POS device activity data to the cloud computing resource 3404. In an embodiment, the security entity 3402 is configured to collate the POS device activity data stored in the cloud computing resource 3404 to determine one or more trends.

In an embodiment, the security entity 3402 can be configured to identify security threats to one or more POS devices or to the cloud computing resource 3404. For example, when analyzing the POS device activity data, the security entity 3402 can identify that there are three failed attempts to log into a POS device (e.g., POS device 3410A). Based on this information, the security entity 3402 may determine that this is an attempt to hack the username and/or password of the POS device and alert the merchant of the potential security issue.

In another example, the security entity 3402 can determine that the same customer has attempted a failed transaction at multiple POS devices. By analyzing the POS device activity data collected from multiple POS devices, the security entity 3402 may determine the signature of a hacker and implement security updates to protect against this identified threat.

Figure 35:
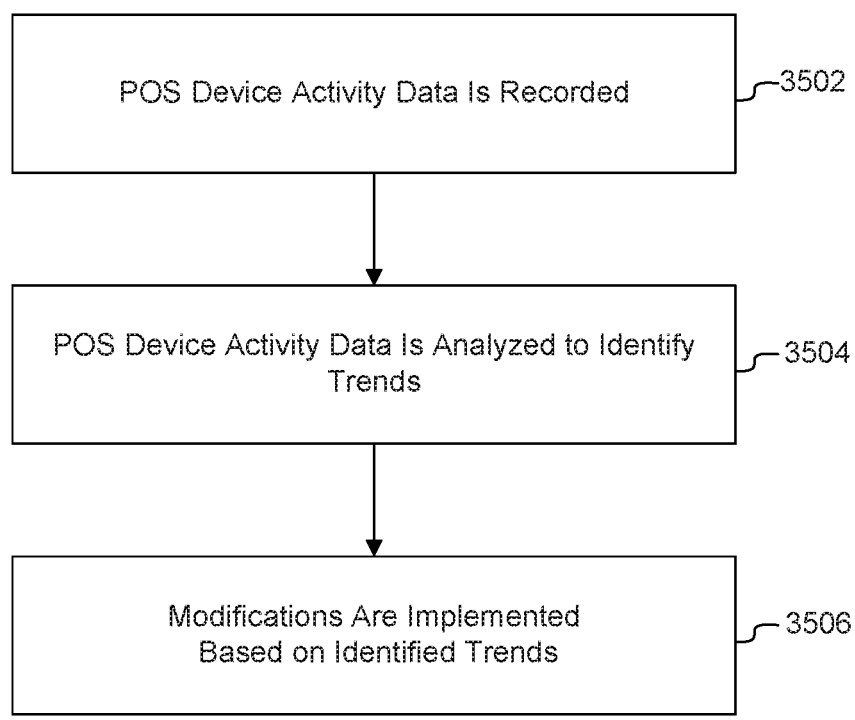
FIG. 35 illustrates a flowchart illustrating a process for analyzing data and performing modifications in a cloud-based point-of-sale system according to an example embodiment

FIG. 35 is a flowchart illustrating a process 3500 for analyzing data uploaded to a cloud computing resource and implementing modifications based on identified trends according to an embodiment. The analyzed data can be, for example, POS device activity data.

At step 3502, POS device activity data is recorded. As described above, each of one or more POS devices can record data regarding different types of activities that occur at the register—e.g., POS device activity data. For example, business events can contain merchant events (e.g., financial transactions such as, for example, sales events), office management transactions (e.g., employees clocking in and out or inventory being stocked or sold), POS events (e.g., successful and failed login attempts), and other types of data. This POS device activity data, as described above, is transmitted from the POS device to the cloud computing resource, for example the back-end server 109 illustrated in FIG. 1, via a secure communication channel.

In an embodiment, a security entity, such as the security entity 3402 described in relation to FIG. 34, can collate the POS device activity data and analyze the data at step 3504. This can occur on a periodic basis such as, for example, once a week, once a month, when the POS device activity data reaches a certain storage size in one or more cloud computing resources, or based on any number of other criteria as would be known to a person skilled in the art. In analyzing this data, the security entity can identify one or more trends in the data. For example, the security entity can identify trends related to the transactions at a specific POS device or trends related to transactions at multiple POS devices. In an embodiment, the multiple POS devices can be associated with different merchants, and this data can be used to identify one or more trends affecting multiple merchants. The security entity can also be configured to identify trends that indicate attacks on one or more cloud computing resources itself.

At step 3506, the security entity determines one or more modifications to be instituted to address the trends. An example modification would be to modify the resource allocation for data storage on the cloud computing resource based on different usage models by the POS devices, e.g., increasing storage resources for an ice cream store during summer months and decreasing storage resources during winter months. Another example would be updating the security software on a POS device, if malicious activity has been detected. This update could then be sent the next time the POS device requests updates from the cloud computing resource. In another example, a security update may be identified for POS devices connected to one or more cloud computing resources, and pushed to each of them when they request updates from the cloud computing resources. Also, modifications to the security of the cloud computing resource may be identified. For example, by analyzing the data uploaded from multiple POS devices, the cloud computing resource may identify a series of attempts to access the cloud computing resources that have a similar signature but originate from different POS devices (e.g., someone may be attempting to log into idle POS devices at different stores). Having access to POS device activity data from multiple POS devices, the security entity can identify such attacks and determine if there is a modification that can be implemented to protect against the perceived threat.

4. EXAMPLE COMPUTER SYSTEM

Figure 36:
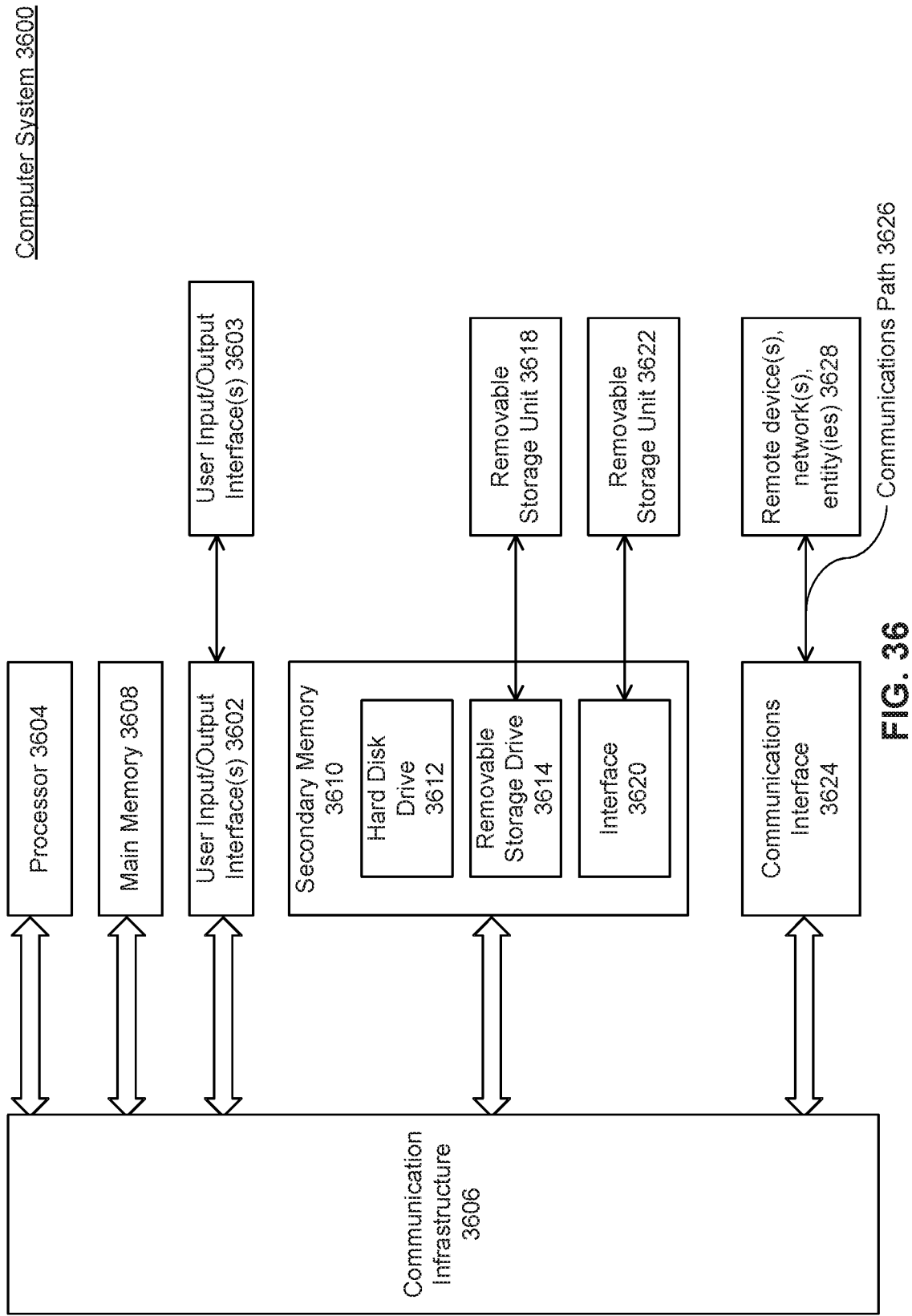
FIG. 36 illustrates an example computer system useful for implementing various embodiments.

Various embodiments can be implemented, for example, using one or more well-known computer systems, such as computer system 3600 shown in FIG. 36. Computer system 3600 can be any well-known computer capable of performing the functions described herein, such as computers available from International Business Machines, Apple, Sun, HP, Dell, Sony, Toshiba, etc. For example, the POS devices 101, 3100, 3302A-B, and 3410A-B, illustrated in FIGS. 1, 31, 33, and 34 respectively, and the multi-mode point-of-sale device illustrated in FIG. 4, or portions thereof, can be implemented using computer system 3600. In addition, network devices such as network 107 illustrated in FIG. 1, Cloud Computing Resource 3304 illustrated in FIG. 33, and Cloud Computing Resource 3404 illustrated in FIG. 34, or portions thereof can be implemented using computer system 3600. Other computing devices, such as Transaction Server 111 illustrated in FIG. 1, Server 109 illustrated in FIG. 1, Server 1001 illustrated in FIG. 10, Database 3306 illustrated in FIG. 33, Payment Gateway 3308 illustrated in FIG. 33, mobile devices 3412A-B illustrated in FIG. 34, Security Entity 3402 illustrated in FIG. 34, or portions thereof can also be implemented using computer system 3600.

Computer system 3600 includes one or more processors (also called central processing units, or CPUs), such as a processor 3604. Processor 3604 is connected to a communication infrastructure or bus 3606.

One or more processors 3604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 3600 also includes user input/output device(s) 3603, such as monitors, keyboards, pointing devices, etc., which communicate with communication infrastructure 3606 through user input/output interface(s) 3602.

Computer system 3600 also includes a main or primary memory 3608, such as random access memory (RAM). Main memory 3608 may include one or more levels of cache. Main memory 3608 has stored therein control logic (i.e., computer software) and/or data.

Computer system 3600 may also include one or more secondary storage devices or memory 3610. Secondary memory 3610 may include, for example, a hard disk drive 3612 and/or a removable storage device or drive 3614. Removable storage drive 3614 may be a floppy disk drive, a magnetic tape drive, a compact disk drive, an optical storage device, tape backup device, and/or any other storage device/drive.

Removable storage drive 3614 may interact with a removable storage unit 3618. Removable storage unit 3618 includes a computer usable or readable storage device having stored thereon computer software (control logic) and/or data. Removable storage unit 3618 may be a floppy disk, magnetic tape, compact disk, DVD, optical storage disk, and/any other computer data storage device. Removable storage drive 3614 reads from and/or writes to removable storage unit 3618 in a well-known manner.

According to an exemplary embodiment, secondary memory 3610 may include other means, instrumentalities or other approaches for allowing computer programs and/or other instructions and/or data to be accessed by computer system 3600. Such means, instrumentalities or other approaches may include, for example, a removable storage unit 3622 and an interface 3620. Examples of the removable storage unit 3622 and the interface 3620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some embodiments, computer system 3600 can be configured such that it does not include one or more secondary storage devices or memory 3610.

Computer system 3600 may further include a communication or network interface 3624. Communication interface 3624 enables computer system 3600 to communicate and interact with any combination of remote devices, remote networks, remote entities, etc. (individually and collectively referenced by reference number 3628). For example, communication interface 3624 may allow computer system 3600 to communicate with remote devices 3628 over communications path 3626, which may be wired and/or wireless, and which may include any combination of LANs, WANs, the Internet, etc. Control logic and/or data may be transmitted to and from computer system 3600 via communication path 3626.

In an embodiment, a tangible apparatus or article of manufacture comprising a tangible computer useable or readable medium having control logic (software) stored thereon is also referred to herein as a computer program product or program storage device. This can include, but is not limited to, computer system 3600, main memory 3608, secondary memory 3610, and removable storage units 3618 and 3622, as well as tangible articles of manufacture embodying any combination of the foregoing. Such control logic, when executed by one or more data processing devices (such as computer system 3600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 36. In particular, embodiments may operate with software, hardware, and/or operating system implementations other than those described herein.

5. CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A register device comprising:
a processing module configured to perform one or more purchase transactions and to operate with an operating system (OS) secured against alteration;
a communication module configured to selectively enable acceptance of data via a secure communications path over a network between a trusted source and the register device, wherein the selectively enabling further comprises:
transmitting a request over the secure communications path to the trusted source;
accepting, over the secure communications path, a response to the request from the trusted source; and
blocking any incoming data that is not responsive to the request; and
a security circuit configured to perform at least one restriction on operations of the register device, wherein the at least one restriction includes verifying an application prior to allowing the application access to the communication module for communicating via the secure communications path and restricting data reception by a peripheral device when the peripheral device is connected to the register device.

2. The register device of claim 1, wherein the communication module is configured to transmit register device activity data via the secure communications path to a back-end system.

3. The register device of claim 2, wherein the processing module is configured to accept a modification from the back-end system to address one or more identified security threats based on the register device activity data.

4. The register device of claim 2, wherein the register device activity data comprises user preferences, software patches, merchant inventory data, employee information, financial transactions, office management transactions, or a combination thereof.

5. The register device of claim 1, further comprising:
a peripheral device port.

6. The register device of claim 5, wherein the peripheral device port comprises a Universal Serial Bus port configured to provide power to, while disabling data input from, the peripheral device.

7. The register device of claim 1, wherein the communication module is further configured to disable the acceptance of data except in response to a request initiated by the register device.

8. The register device of claim 1, wherein the security circuit is further configured to store a certificate and to validate the OS, based on the certificate.

9. A method comprising:
providing an operating system (OS) secured onto a processing module of a register device used to perform one or more purchase transactions, wherein the operating system is secured against alteration;
selectively enabling, with a communication module, acceptance of data via a secure communications path over a network between a trusted source and the register device, wherein the selectively enabling further comprises:
transmitting a request over the secure communications path;
accepting, over the secure communications path, a response to the request over the secure communications path; and
blocking any incoming data that is not responsive to the request;
performing at least one restriction on operations of the register device, wherein the at least one restriction includes verifying an application prior to allowing the application access to the communication module for communicating via the secure communications path and restricting data reception by a peripheral device when the peripheral device is connected to the register device, wherein restricting the data reception by the peripheral device comprises disabling data input from the peripheral device to the register device.

10. The method of claim 9, further comprising:
transmitting register device activity data via the secure communications path to a back-end system to identify one or more security threats based on the register device activity data.

11. The method of claim 9, further comprising:
providing power to a peripheral device via a peripheral device port of the register device.

12. The method of claim 9, wherein the selectively enabling acceptance of data comprises communicating with a back-end system via a wired communication path, a wireless communication path, or a combination thereof.

13. A system comprising:
a back-end system; and
a register device in communication with the back-end system, wherein the register device comprises:
a processing module configured to operate with an operating system (OS) secured against alteration and to perform one or more purchase transactions;
a communication module configured to selectively enable acceptance of data via a secure communications path over a network from the back-end system wherein the selectively enabling further comprises:
transmitting a request over the secure communications path to the back-end system;
accepting, over the secure communications path, a response to the request from the back-end system; and
blocking any incoming data that is not responsive to the request; and
a security circuit configured to perform at least one restriction on operations of the register device, wherein the at least one restriction includes verifying an application prior to allowing the application access to the communication module for communicating via the secure communications path and restricting data reception by a peripheral device when the peripheral device is connected to the register device.

14. The system of claim 13, wherein the back-end system configured to communicate via the secure communications path comprises a networked enterprise storage system configured to store register device activity data accepted from the register device.

15. The system of claim 14, wherein the register device activity data comprises user preferences, software patches, merchant inventory data, employee information, financial transactions, office management transactions, or a combination thereof.

16. The system of claim 14, wherein the back-end system is configured to identify one or more security threats based on the register device activity data.

17. The system of claim 16, wherein the processing module is configured to accept a modification from the back-end system to address the one or more identified security threats.

18. The system of claim 13, wherein the register device further comprises:
a peripheral device port.

19. The system of claim 18, wherein the peripheral device port comprises a Universal Serial Bus port configured to provide power to, while disabling data input from, a peripheral device.

20. The system of claim 13, wherein the security circuit is further configured to store identification data and an encryption key and to verify, based on the identification data and encryption key, that an update is authentic.

* * * * *